United States Patent
Yazawa et al.

(10) Patent No.: US 7,800,788 B2
(45) Date of Patent: Sep. 21, 2010

(54) UPRIGHT IMAGE PROCESSING APPARATUS WITH PIVOTABLE IMAGE READING PORTION

(75) Inventors: Hiroaki Yazawa, Nagoya (JP);
Michifumi Ishigami, Nagoya (JP);
Sakiko Kobayashi, Nagoya (JP);
Kazuma Aoki, Kasugai (JP); Masahiko Furuhashi, Toyoake (JP); Manabu Isshiki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1060 days.

(21) Appl. No.: 11/231,373

(22) Filed: Sep. 21, 2005

(65) Prior Publication Data
US 2006/0083564 A1   Apr. 20, 2006

(30) Foreign Application Priority Data

| Sep. 21, 2004 | (JP) | 2004-272754 |
| Oct. 21, 2004 | (JP) | 2004-306632 |
| Jan. 25, 2005 | (JP) | 2005-016716 |
| Jan. 25, 2005 | (JP) | 2005-017284 |
| Jan. 28, 2005 | (JP) | 2005-020814 |
| Jan. 31, 2005 | (JP) | 2005-022918 |
| Jan. 31, 2005 | (JP) | 2005-023097 |
| Jan. 31, 2005 | (JP) | 2005-023502 |

(51) Int. Cl.
*G03G 15/00* (2006.01)
(52) U.S. Cl. .................... 358/474; 358/498
(58) Field of Classification Search .......... 358/400–498
See application file for complete search history.

(56) References Cited

U.S. PATENT DOCUMENTS 5,103,322 A * 4/1992 Beck et al. ............ 358/496

(Continued)

FOREIGN PATENT DOCUMENTS

CN   1364692   8/2008

(Continued)

OTHER PUBLICATIONS

Office Action issued Jun. 18, 2009 in corresponding Japanese Application No. 2004-272754, together with English translation thereof.

(Continued)

*Primary Examiner*—Benny Q Tieu
*Assistant Examiner*—Qian Yang
(74) *Attorney, Agent, or Firm*—Banner & Witcoff, Ltd

(57) ABSTRACT

An image processing apparatus comprises: an image reading portion which has a box-shaped first housing with a reading surface, and a scanning device displaceable along the reading surface in the first housing, and reads a first image on a document by relatively displacing the document and scanning device; and an image recording portion which includes a recording medium supply device accommodating a recording medium, a feeding mechanism feeding the recording medium fed out of the supply device, a recording device recording a second image on the recording medium, and a second housing incorporating at least the feeding mechanism and recording device. The apparatus is placed on a rest surface in a substantially upright position, and the reading portion is changeable in position between an upright position in which the reading surface is opposed to the recording portion, and a horizontal position in which the reading surface faces upward.

12 Claims, 57 Drawing Sheets

U.S. PATENT DOCUMENTS

| | | | |
|---|---|---|---|
| 5,528,344 A | 6/1996 | Yamaguchi et al. | |
| 5,548,417 A * | 8/1996 | Sekimoto et al. | 358/474 |
| 5,680,204 A | 10/1997 | Ferrara | |
| 6,002,605 A | 12/1999 | Iwasaki et al. | |
| 6,137,710 A | 10/2000 | Iwasaki et al. | |
| 6,160,642 A * | 12/2000 | Mui et al. | 358/498 |
| 6,233,064 B1 * | 5/2001 | Griffin | 358/474 |
| 6,286,934 B1 | 9/2001 | Sakanobe et al. | |
| 6,408,161 B1 | 6/2002 | Minowa et al. | |
| 6,661,539 B1 * | 12/2003 | Nee | 358/474 |
| 7,133,169 B2 | 11/2006 | Terashima et al. | |
| 7,154,642 B2 * | 12/2006 | Lichtfuss | 358/497 |
| 7,196,828 B2 * | 3/2007 | Rubner et al. | 358/497 |
| 7,221,488 B2 * | 5/2007 | Khovaylo et al. | 358/497 |
| 7,379,218 B1 * | 5/2008 | Terashima et al. | 358/498 |
| 2002/0036807 A1 | 3/2002 | Terashima et al. | |
| 2002/0089555 A1 | 7/2002 | Kobayashi et al. | |
| 2003/0043095 A1 * | 3/2003 | Silverbrook | 345/87 |
| 2003/0043353 A1 | 3/2003 | Oka et al. | |
| 2003/0076399 A1 | 4/2003 | Matsuo et al. | |
| 2003/0081270 A1 | 5/2003 | Hoshino et al. | |
| 2003/0081272 A1 * | 5/2003 | Chen | 358/488 |
| 2005/0189424 A1 | 9/2005 | Izumi | |
| 2006/0274382 A1 * | 12/2006 | Yang | 358/474 |

FOREIGN PATENT DOCUMENTS

| | | |
|---|---|---|
| EP | 0 272 870 | 6/1988 |
| EP | 0 840 494 | 5/1998 |
| EP | 1 014 675 | 6/2000 |
| EP | 1 175 082 | 1/2002 |
| JP | 58-185453 | 12/1983 |
| JP | 62-201281 | 9/1987 |
| JP | 3-132157 | 6/1991 |
| JP | 466669 U | 6/1992 |
| JP | 04-185355 | 7/1992 |
| JP | 04-339678 | 11/1992 |
| JP | 05-004420 | 1/1993 |
| JP | 05-027489 | 2/1993 |
| JP | 05-026402 | 4/1993 |
| JP | 06-233026 | 8/1994 |
| JP | 7312672 A | 11/1995 |
| JP | 8101578 A | 4/1996 |
| JP | 08-206016 | 8/1996 |
| JP | 08-276576 | 10/1996 |
| JP | 02-521546 | 12/1996 |
| JP | 09-131927 | 5/1997 |
| JP | 10-016205 | 1/1998 |
| JP | 10134163 A | 5/1998 |
| JP | 10302030 A | 11/1998 |
| JP | 11-138846 | 5/1999 |
| JP | 2000148287 A | 5/2000 |
| JP | 2000232545 A | 8/2000 |
| JP | 2000347319 A | 12/2000 |
| JP | 2001036680 A | 2/2001 |
| JP | 2001053918 A | 2/2001 |
| JP | 2001083754 A | 3/2001 |
| JP | 2001083755 A | 3/2001 |
| JP | 2001083756 A | 3/2001 |
| JP | 2001188883 A | 7/2001 |
| JP | 2001249419 A | 9/2001 |
| JP | 3084232 U | 12/2001 |
| JP | 2002067403 A | 3/2002 |
| JP | 2002-103717 | 4/2002 |
| JP | 2002111935 A | 4/2002 |
| JP | 2002304034 A | 10/2002 |
| JP | 2003-001891 | 1/2003 |
| JP | 2003-001902 | 1/2003 |
| JP | 2003-500248 | 1/2003 |
| JP | 2003-078683 A | 3/2003 |
| JP | 2003-115963 | 4/2003 |
| JP | 2003-136786 | 5/2003 |
| JP | 2003127484 A | 5/2003 |
| JP | 2003134285 A | 5/2003 |
| JP | 2003-274073 | 9/2003 |
| JP | 2003270738 A | 9/2003 |
| JP | 2003-334942 | 11/2003 |
| JP | 2004230708 A | 8/2004 |
| JP | 2005-007770 | 1/2005 |
| JP | 2005227895 A | 8/2005 |
| JP | 2005301534 A | 10/2005 |
| JP | 2004252715 A | 9/2009 |
| WO | 00/71455 | 11/2000 |

OTHER PUBLICATIONS

Office Action issued Jul. 21, 2009 in corresponding Japanese Application No. 2004-306632.
Office Action issued Oct. 13, 2009 in corresponding Japanese Patent Application No. 2005-023097, and partial English translation thereof.
Notification of Reasons for Refusal for Japanese application 2005-022918 dated May 11, 2010.
Notification of Reasons for Refusal for Japanese application 2005-023502 dated May 11, 2010.
Notification of Reasons for Refusal for Japanese application 2005-020814 dated May 11, 2010.
Notification of Reasons for Refusal for Japanese application 2005-017284 dated May 11, 2010.
Office Action for Chinese Application 200910161856.6 dated Mar. 31, 2010.
Notification of Reason for Refusal for Japanese Patent Application 2005-016716 mailed Jun. 8, 2010.

* cited by examiner

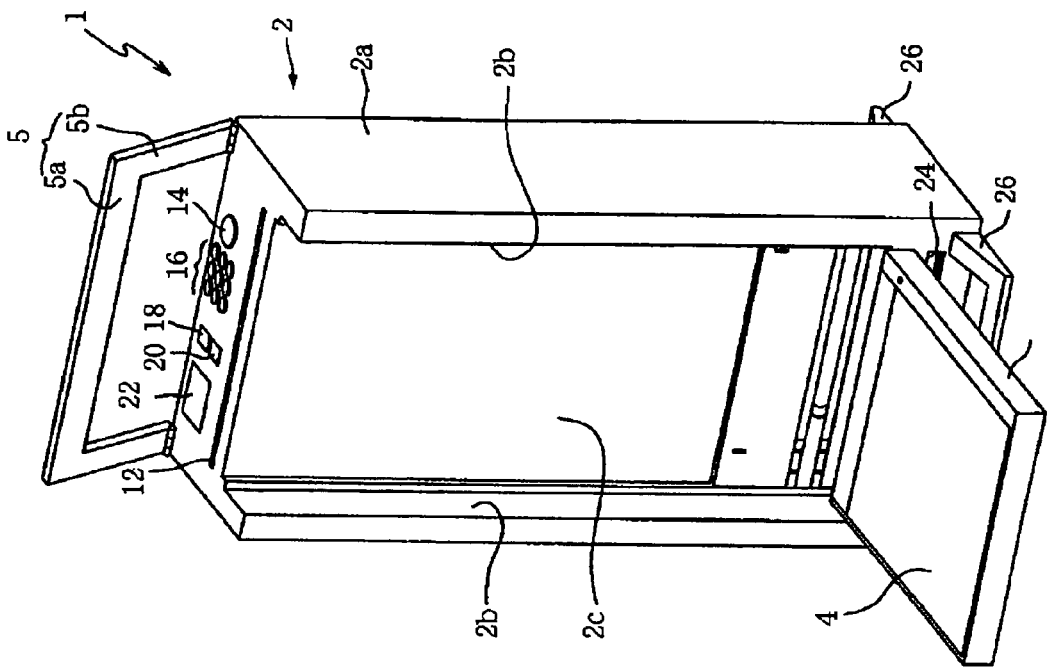
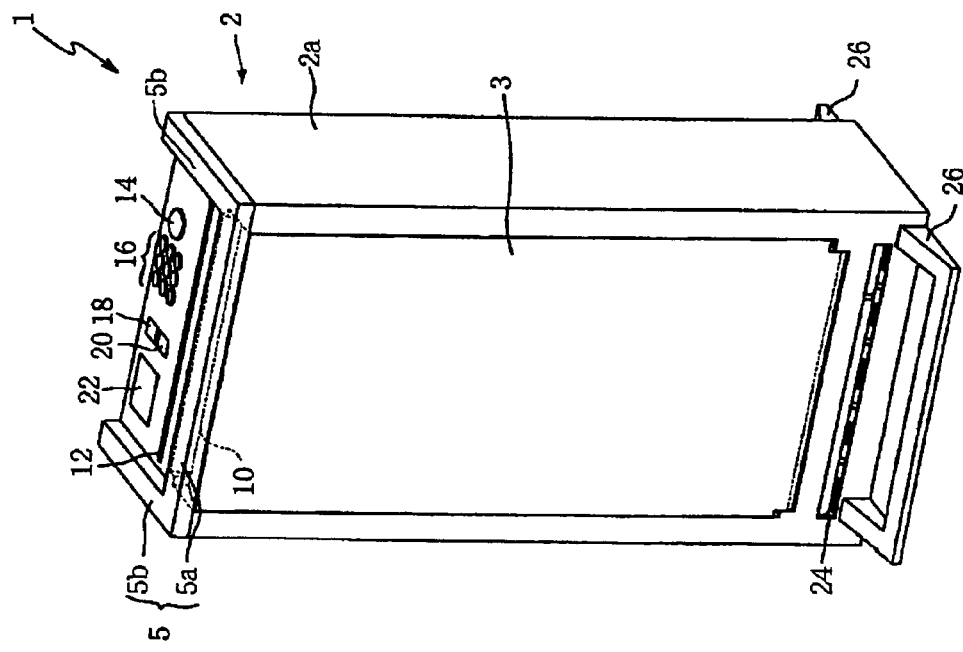

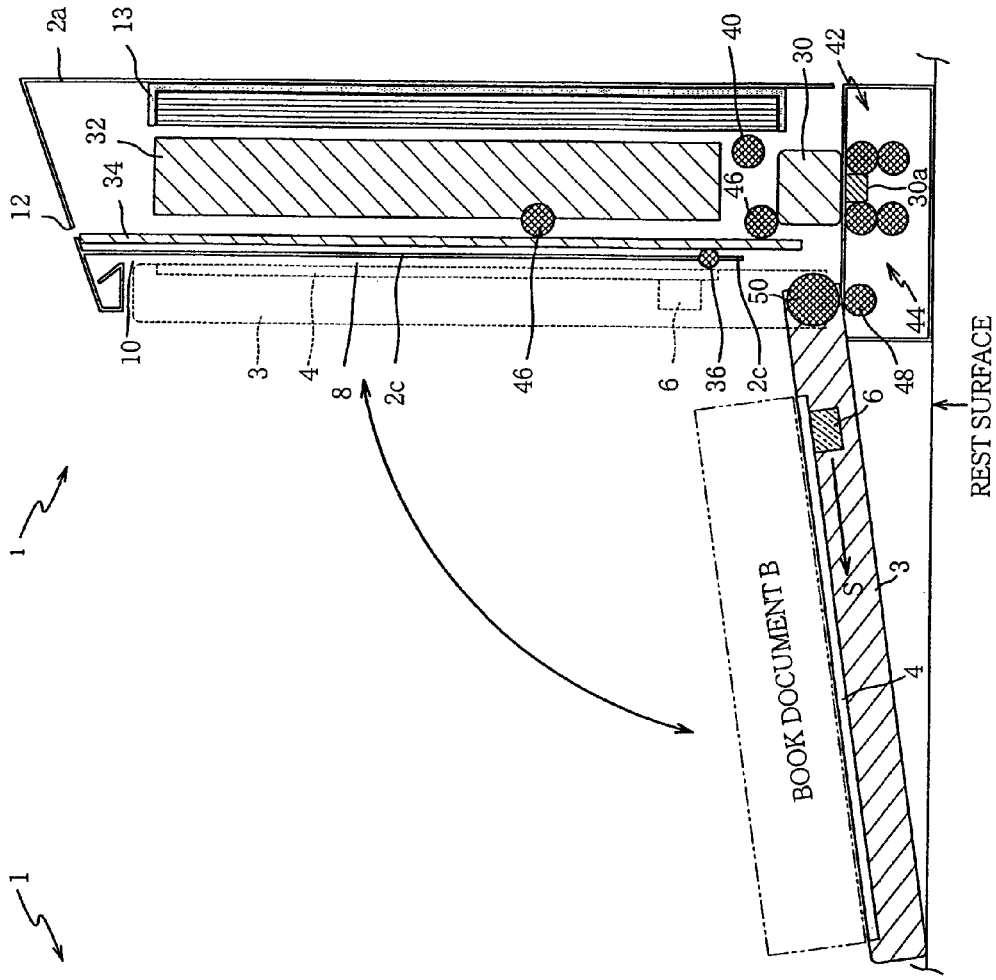
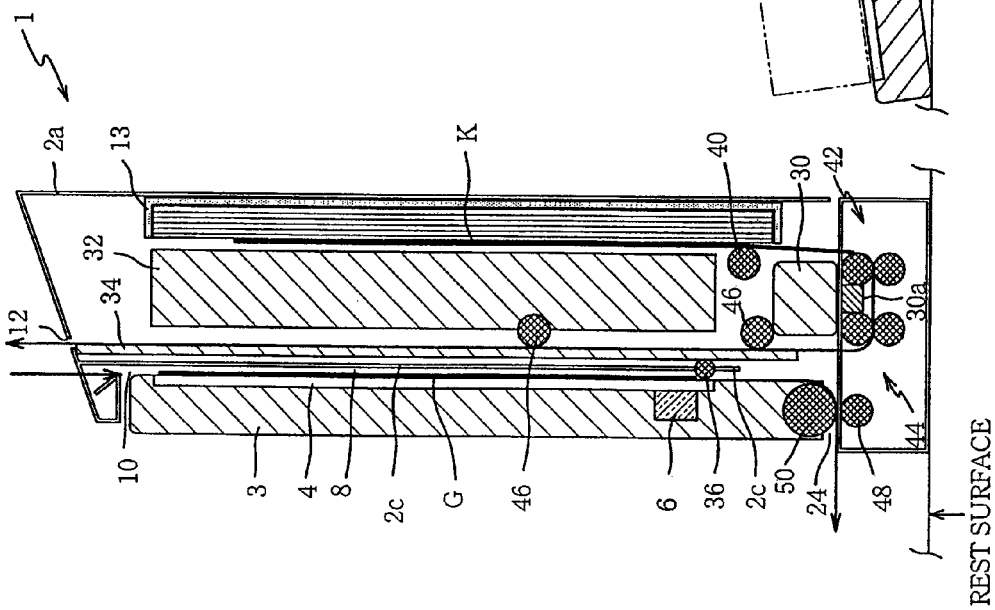

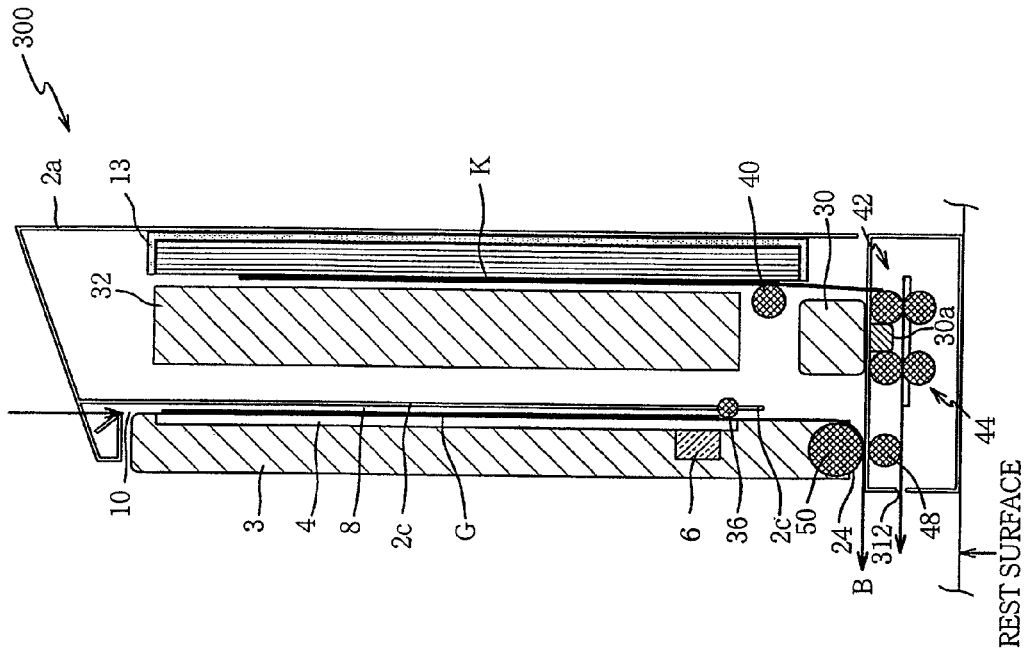
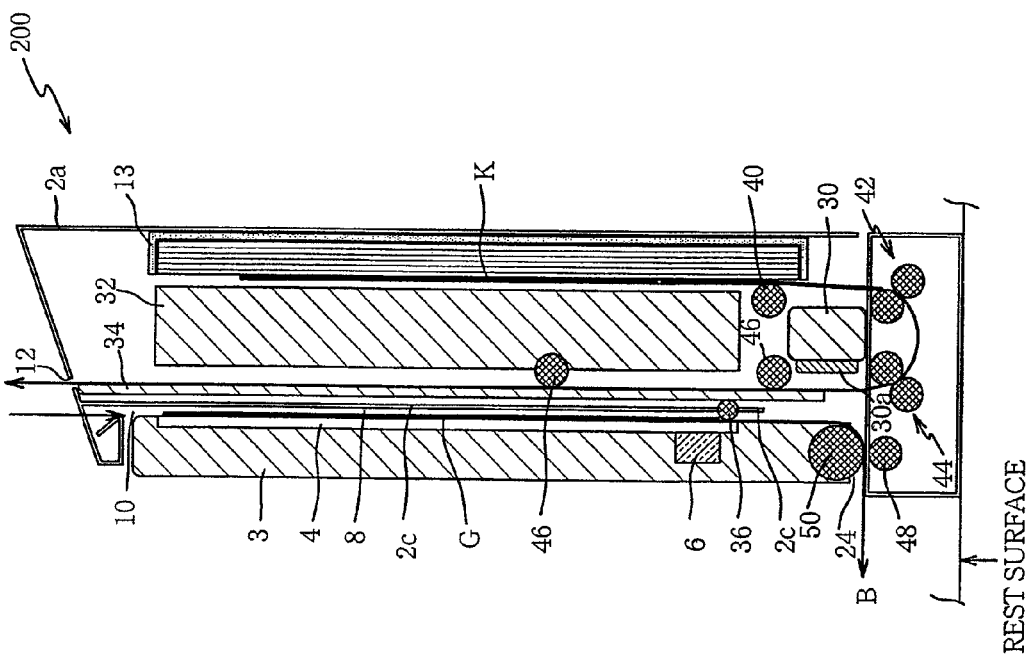

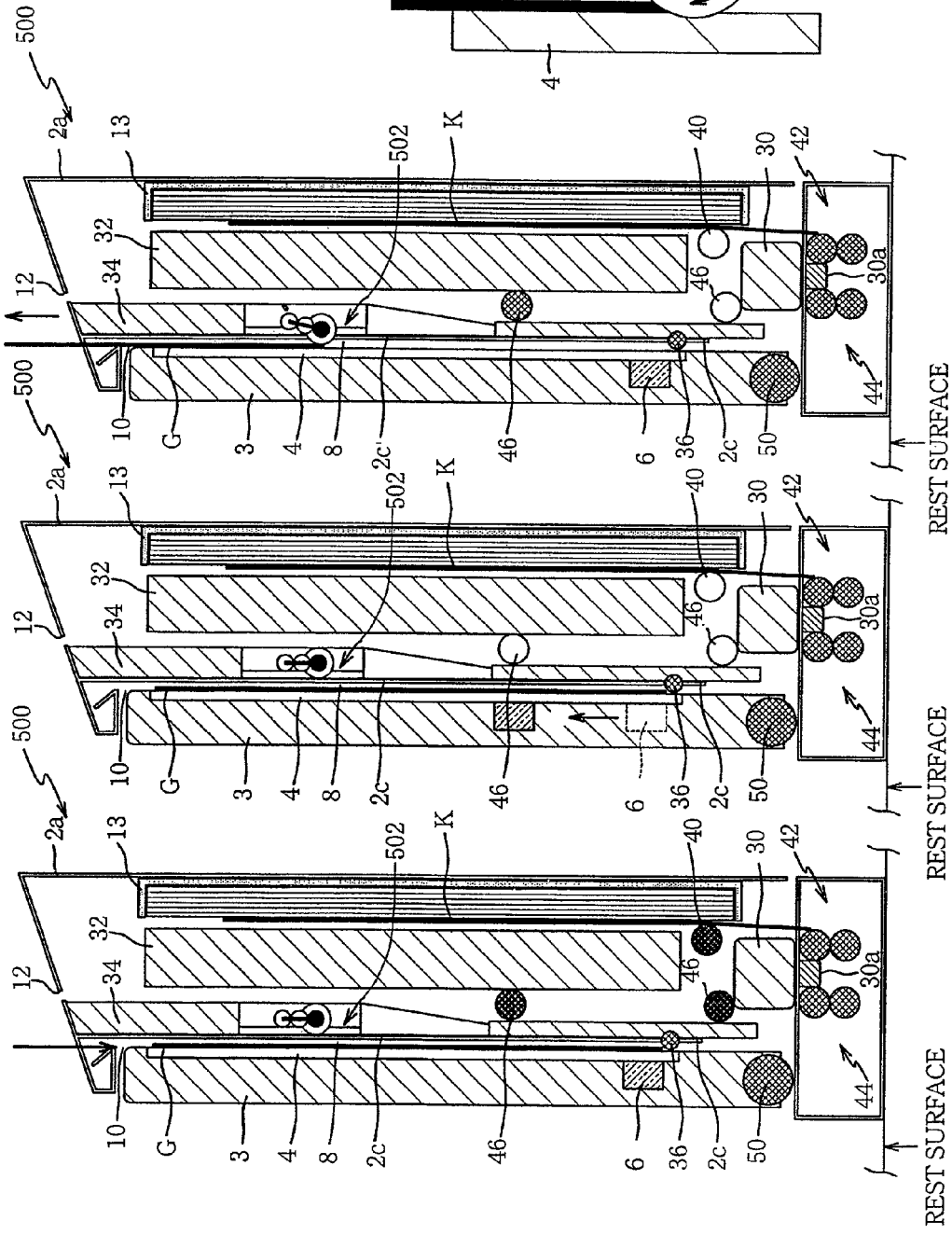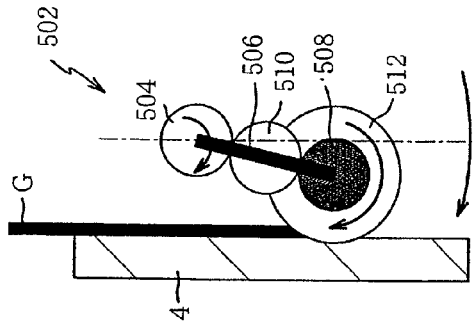

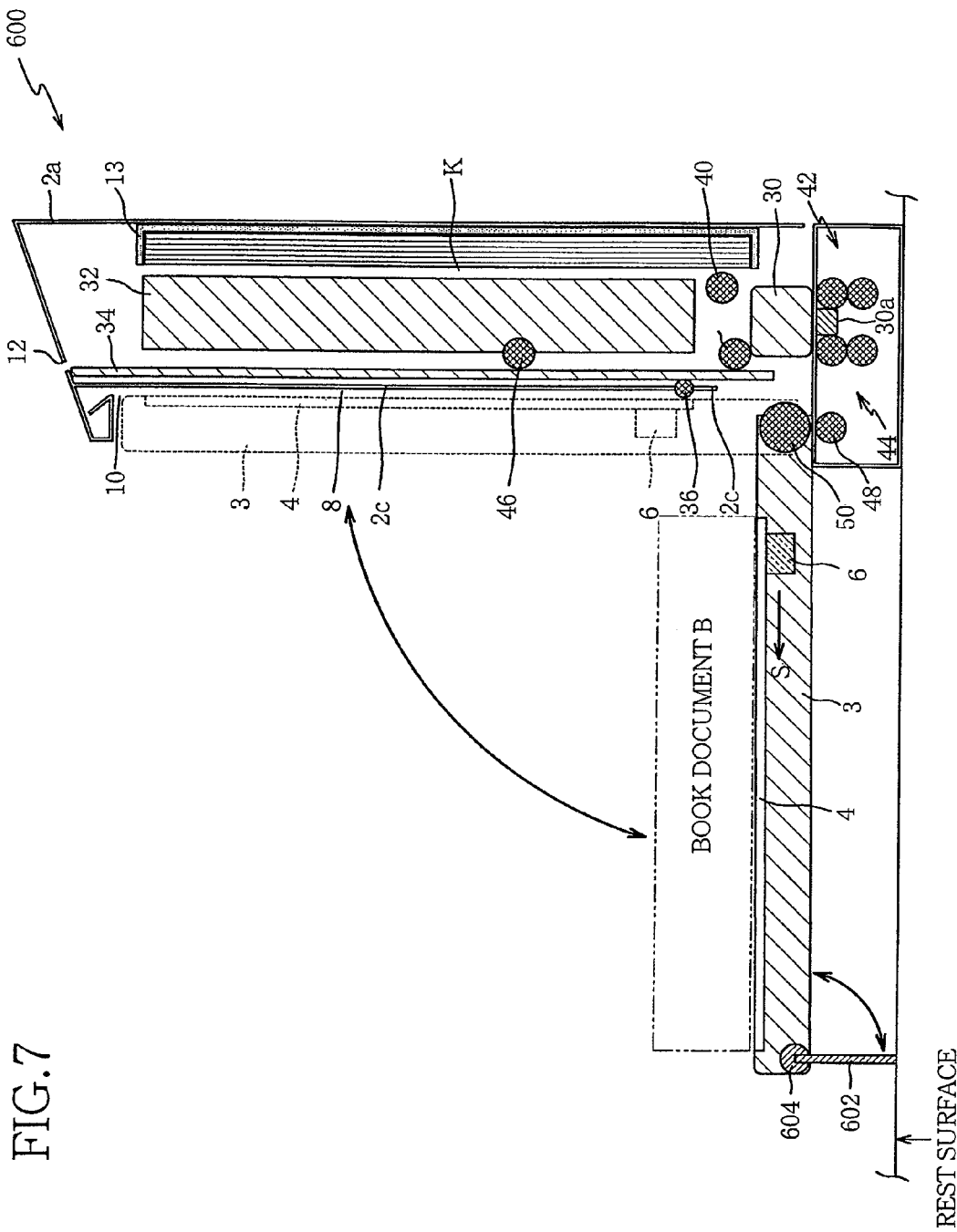

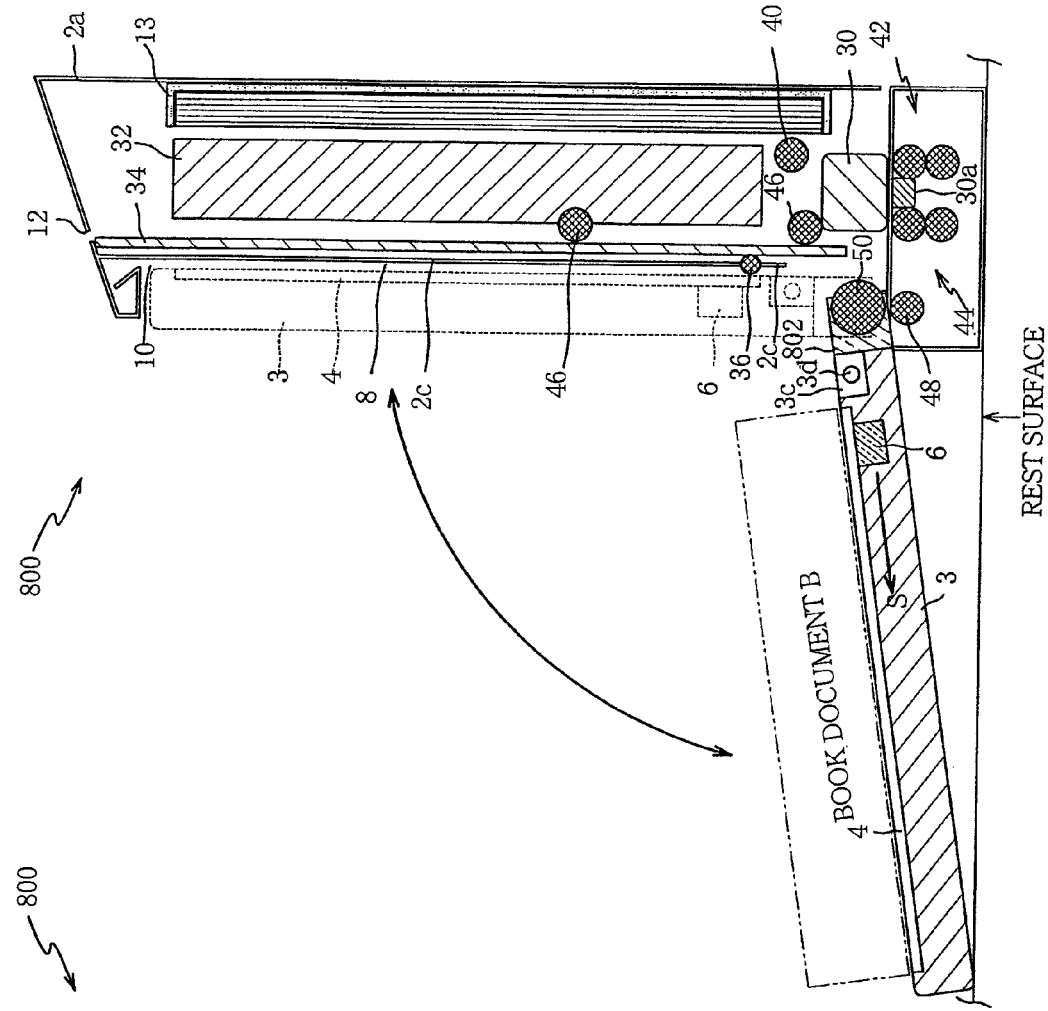
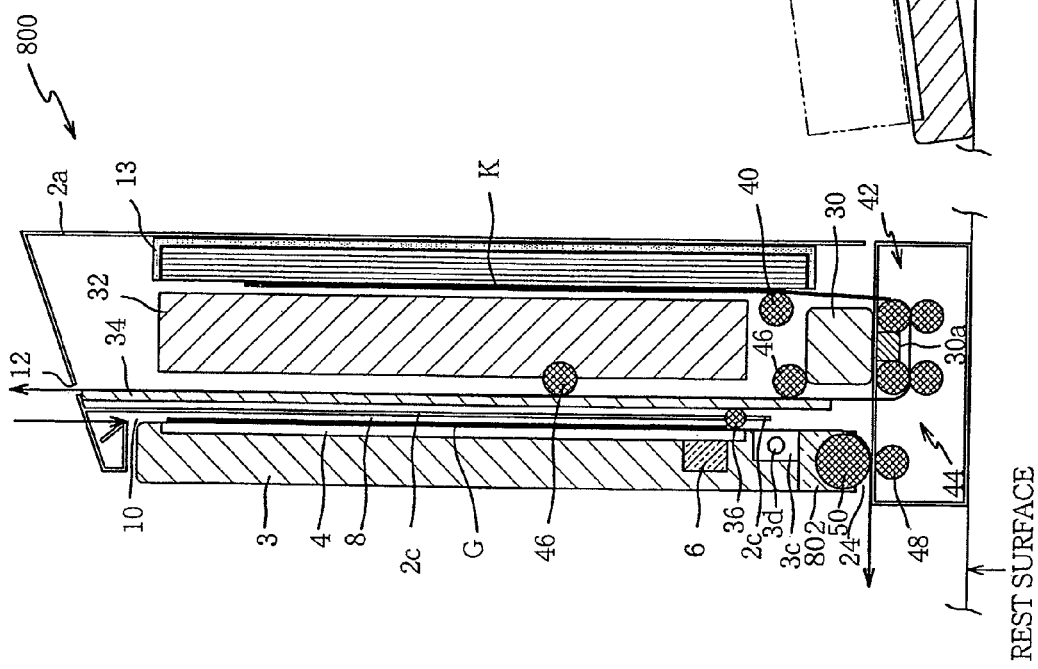
FIG.10A
FIG.10B

UPRIGHT IMAGE PROCESSING APPARATUS WITH PIVOTABLE IMAGE READING PORTION

INCORPORATION BY REFERENCE

The present application is based on Japanese Patent Applications No. 2004-272754, filed on Sep. 21, 2004, No. 2004-306632, filed on Oct. 21, 2004, Nos. 2005-016716 and 2005-017284, both filed on Jan. 25, 2005, No. 2005-020814, filed on Jan. 28, 2005, and Nos. 2005-022918, 2005-023502 and 2005-023097 that are filed on Jan. 31, 2005. The contents of these Japanese Patent Applications are incorporated herein by reference.

BACKGROUND OF THE INVENTION

1. Field of the Invention

The invention relates to an image processing apparatus which is capable of reading a document in the form of a sheet of paper while the apparatus is in an upright position, and can be placed by a simple manipulation in a position to read a document in the form of a book.

2. Description of Related Art

There is known multifunctional apparatuses having a scanner function and changeable in position as desired, between an upright position where the apparatus stands substantially upright, and a horizontal position where the apparatus lies down substantially horizontally, thereby enabling to save space. For instance, JP-A-2003-115963 (especially paragraph [0006] and FIG. 3) discloses a multifunctional apparatus having a box-shaped printer portion as a base and a scanner portion placed on the printer portion to stand therefrom in a tilted position.

When a document in the form of a sheet (which will be hereinafter referred to as "the sheet document") is to be read by this multifunctional apparatus, the sheet document is fed along the scanner portion in the upright position. On the other hand, when a document in the form of a book (which will be hereinafter referred to as "the book document") is read, the multifunctional apparatus as a whole is laid down such that the scanner portion is placed in the horizontal position, namely, the scanner portion extends low, substantially horizontally and along a surface on which the multifunctional apparatus is placed (which will be hereinafter referred to as "the rest surface"), and the book document is placed on the scanner portion to be scanned.

The technique disclosed in the above-mentioned publication suffers from the very bothersome manipulation that when the book document is to be read, the entirety of the multifunctional apparatus needs to be laid down so as to place the scanner portion in the horizontal position to be parallel to the rest surface.

SUMMARY OF THE INVENTION

The present invention has been developed in view of the above situations, and therefore it is an object of the invention to provide an image processing apparatus capable of reading a document in the form of a sheet (or "a sheet document") while the image processing apparatus is in the upright position, and can be placed by a simple manipulation in a position to read a document in the form of a book (or "a book document").

To attain the above object, this invention provides an image processing apparatus comprising:

an image reading portion having a box-shaped first housing with a reading surface, and a scanning device disposed inside the first housing and displaceable along the reading surface, the image reading portion reading a first image on a document by displacing the document and the scanning device relatively to each other;

an image recording portion including:

a recording medium supply device which accommodates a recording medium;

a feeding mechanism which feeds the recording medium fed out of the recording medium supply device;

a recording device which records a second image on the recording medium fed by the feeding mechanism; and a second housing which incorporates at least the feeding mechanism and the recording device;

the apparatus being placed on a rest surface in a substantially upright position; and the image reading portion being changeable in position relatively to the image recording portion, between an upright position in which reading of the image on the document is performed with the image reading surface opposed to the image recording portion, and a horizontal position in which reading of the image on the document is performed with the image reading surface facing upward.

In this invention, the "upright position" of the image reading portion does not necessarily mean an exactly upright position thereof, but may be a substantially upright position, namely, when the image reading portion is in its upright position, the image reading portion may be inclined with respect to a surface of the image recording portion to which the image reading surface is opposed. Similarly, the "horizontal position" of the image reading portion does not necessarily mean an exactly horizontal position, but may be a substantially horizontal position, namely, when the image reading portion is in its horizontal position, the image reading portion may not be exactly parallel to the rest surface.

According to the image processing apparatus, the image reading portion is movable relatively to the image recording portion between the horizontal position in which the image reading portion can read a book document as well as a sheet document, and the upright position in which the image reading portion can read a sheet document but not a book document. When the image reading portion is in the horizontal position, the reading surface of the image reading portion faces upward. When a book document is to be read, the image reading portion is placed in the horizontal position and a book is put on the reading surface with a surface or at least one page of the book which constitutes the book document is opposed to the reading surface. That is, unlike the conventional apparatus, it is not necessary to bring down an entirety of the multifunctional apparatus, thereby simplifying the manipulation required when the book document is to be read. On the other hand, when a sheet document is to be read, the image reading portion is placed in the upright position in which the multifunctional apparatus occupies a relatively small space, thereby enabling to save space when reading a sheet document.

In this apparatus, the first image and the second image may or may not be a same image. That is, an image may be read by the image reading portion so as to be recorded by the image recording portion, but the image recording portion may record an image based on image data not read by the image reading portion.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIGS. 1A and 1B are perspective views of a multifunctional apparatus according to a first embodiment of the invention, in which FIG. 1A shows a state where a scanner portion and a lid member are closed relatively to a housing of a printer portion of the apparatus, while FIG. 1B shows a state where the scanner portion and the lid member are open relatively to the housing of the printer portion;

FIGS. 2A and 2B are schematic cross-sectional views of the multifunctional apparatus, in which FIG. 2A shows a state where the scanner portion is closed while FIG. 2B shows a state where the scanner portion is open;

FIG. 3 is a schematic cross-sectional view of a multifunctional apparatus according to a second embodiment of the invention;

FIG. 4 is a schematic cross-sectional view of a multifunctional apparatus according to a third embodiment of the invention;

FIGS. 6A, 6B and 6C are schematic cross-sectional views of a multifunctional apparatus according to a fifth embodiment of the invention, and show in time series how a sheet document is fed by a document ejecting mechanism, while FIG. 6D is an enlarged cross-sectional view of a fourth document ejecting roller of the document ejecting mechanism;

FIG. 7 is a schematic cross-sectional view of a multifunctional apparatus according to a sixth embodiment of the invention, in a state where a scanner portion is open;

FIGS. 9A and 9B are perspective view of a multifunctional apparatus according to an eighth embodiment of the invention, in which FIG. 9A shows a state where a scanner portion and a lid member are both closed relatively to a housing of a scanner portion of the multifunctional apparatus, and FIG. 9B shows a state where the scanner portion and the lid member are and FIG. 9B shows a state where the scanner portion and the lid member are both open;

FIGS. 10A and 10B are schematic cross-sectional views of the multifunctional apparatus, in which FIG. 10A shows the sate where the scanner portion is closed, and FIG. 10B shows the state where the scanner portion is open;

DETAILED DESCRIPTION OF PREFERRED EMBODIMENTS

Figures 5A, 5B, 5C:
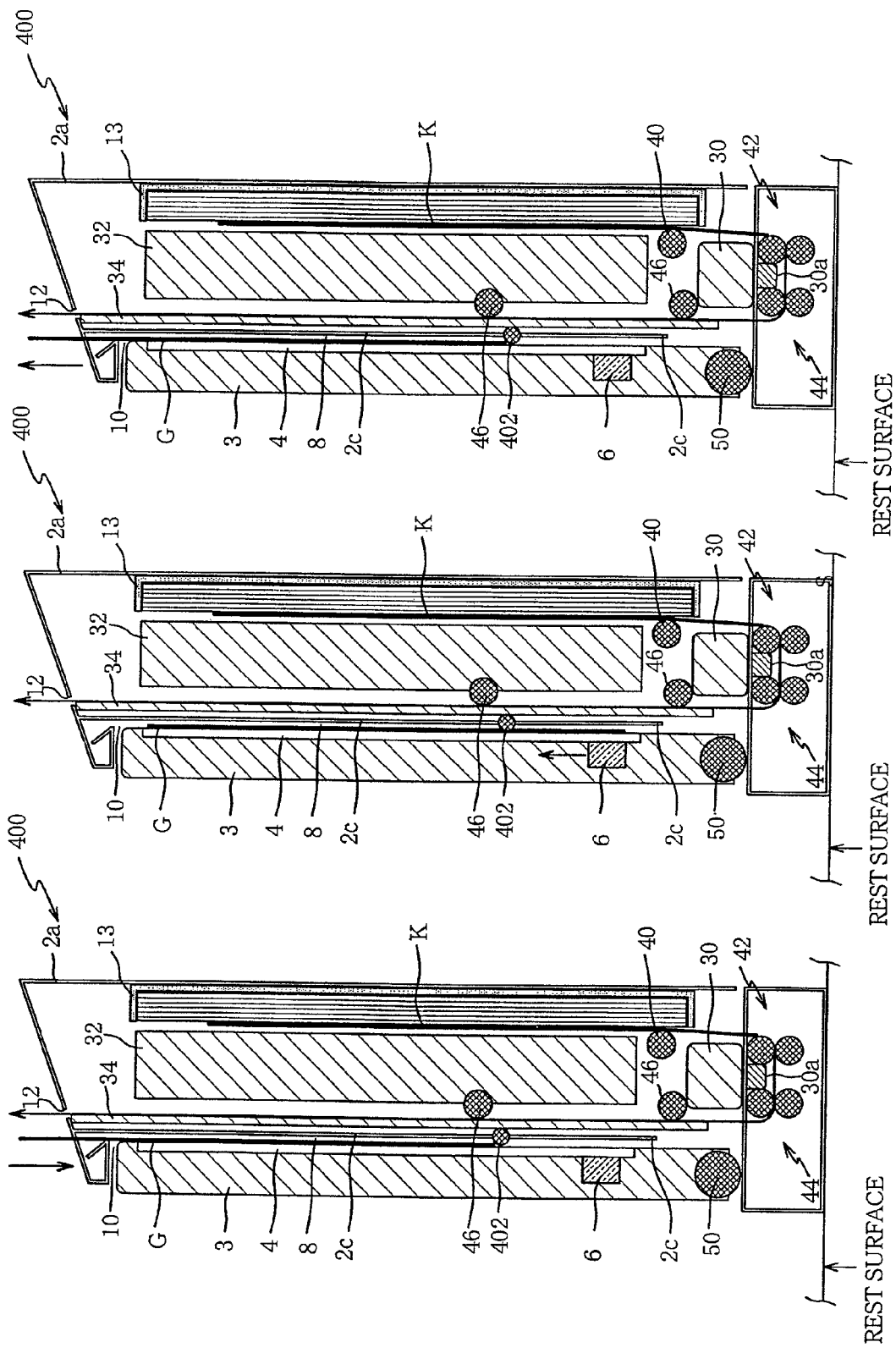
FIGS. 5A, 5B and 5C are schematic cross-sectional views of a multifunctional apparatus according to a fourth embodiment of the invention, and show in time series how a sheet document is fed by a document ejecting mechanism.

Hereinafter, there will be described presently preferred embodiments of the invention, by referring to the accompanying drawings.

First, there will be described a multifunctional apparatus according to a first embodiment of the invention, by referring to FIGS. 1A, 1B, 2A and 2B.

In FIGS. 1A and 1B, reference numerals 1, 2, 3 and 4 respectively denote a multifunctional apparatus according to the first embodiment, and a printer portion, a scanner portion, and a lid member of the apparatus. FIG. 1A shows a state of the multifunctional apparatus 1 where the scanner portion 3 and the lid member 5 are closed relatively to a housing 2a of the printer portion 2, while FIG. 1B shows a state where the scanner portion 3 and the lid member 5 are open relatively to the housing 2a. The state of FIG. 1A corresponds to an upright position of the scanner portion 3 in which the multifunctional apparatus 1 can read a sheet document but not a book document, while the state of FIG. 1B corresponds to a horizontal position of the scanner portion 3 in which the multifunctional apparatus 1 can read a book document as well as a sheet document.

It is noted that in this invention, the "upright position" of the scanner portion may mean either an exactly upright or substantially upright position of the scanner portion, and similarly, the "horizontal position" of the scanner portion may mean either an exactly horizontal or substantially horizontal position thereof. However, in this embodiment, when the scanner portion 3 is placed in its upright position, the scanner portion 3 stands exactly upright, and when the scanner portion 3 is placed in its horizontal position, the scanner portion 3 is not exactly horizontal but inclined downward with respect to a plane exactly parallel to the rest surface, as shown in FIG. 2B.

That is, the multifunctional apparatus 1 has a scanner function, and is capable of reading a sheet document, which is a document in the form of a sheet of paper or other suitable materials, while the scanner portion 3 is placed in the upright position, and can be changed by a simple manipulation into a posture or position to read a book document, which is a document in the form of a surface of or at least one page of a book. The multifunctional apparatus 1 is mainly constituted by the printer portion 2 which stands substantially upright on a surface (which will be referred to as "the rest surface"), and the scanner portion 3 pivotally supported by the housing 2a of the printer portion 2 to be openable/closable relatively to the housing 2a, or toward and away from the housing 2a.

The housing 2a is substantially a rectangular parallel piped with six faces among which the one having the smallest area is a bottom face thereof and incorporates a recording device for recording information, an image or others on a recording medium. Among the six faces, a side face has a largest area, and a recess 2b is formed in the largest side face, to have a size capable of accommodating the scanner portion 3 therein, as shown in FIG. 1B.

Thus, the area occupied by the housing 2a in the rest surface is minimized, enabling to place the multifunctional apparatus 1 on the rest surface by occupying a relatively small area. Further, in the state where the scanner portion 3 is closed relatively to the housing 2a, the scanner portion 3 is accommodated in the recess 2b of the housing 2a, thereby making the multifunctional apparatus 1 compact as a whole. This facilitates carrying of the multifunctional apparatus 1.

The scanner portion 3 reads an image on a document, and has a flat shape with a considerable thickness. The scanner portion 3 incorporates a reading device 6 which optically reads the image on the document, and has a transparent glass plate 4 on a side to be opposed to the housing 2a when the scanner portion 3 is closed relatively to the housing 2a, that is, a side facing upward when the scanner portion 3 is open relatively to the housing 2a.

The scanner portion 3 is pivotally supported by the housing 2a. More specifically, the scanner portion a is supported at a part thereof which is on the lower side of the glass plate 4, by the housing 2a and at a position inside the recess 2b, such that a clearance 8 (shown in FIGS. 2A and 2B) is formed between the glass plate 4 and a surface of the recess 2b to be opposed to the glass plate 4 when the scanner portion 3 is closed relatively to the housing 2a. The surface of the recess 2b opposed to the glass plate 4 constitutes a document support surface 2c.

In the state where the scanner portion 3 is closed relatively to the housing 2a, a sheet document is supplied to the clearance 8 through a document inlet 10 (described later), and the sheet document is scanned by the scanner portion 3. On the other hand, in the state where the scanner portion 3 is open relatively to the housing 2a, an external surface of the glass plate 4 faces upward, and a book document is placed on the surface of the glass plate 4 to be scanned by the scanner portion 3.

Thus, the multifunctional apparatus 1 is constructed such that while the scanner portion 3 is closed, a sheet document is read by being fed in to be opposed to the glass plate 4, and while the scanner portion 3 is open, a book document is read by being placed on the glass plate 4 which faces upward.

In this way, a sheet document is readable while the printer portion 2 and the scanner portion 3 are kept standing substantially upright. On the other hand, when a book document is to be read, only the scanner portion 3 is brought down onto the rest surface while the printer portion 2 is kept standing on the rest surface, and the book document is placed on the scanner portion 3 as laid low. Thus, it is made possible to read the book document by a simple manipulation, unlike the conventional apparatus where the entirety of the multifunctional apparatus needs to be laid down on the rest surface.

This arrangement is advantageous in that a space occupied by the multifunctional apparatus as standing substantially upright is relatively small compared to the conventional arrangement where the multifunctional apparatus stands in a tilted position.

A construction of the multifunctional apparatus 1 will be described in more detail.

In an upper surface of the housing 2a, which is slant upward from the front side, there are arranged the document inlet 10, a recording medium outlet 12, various operating members 14-20, and a liquid crystal panel 22, in this order from the front side.

The document inlet 10 is an opening through which a sheet document is supplied to the clearance 8, when a sheet document is desired to be read. The document inlet 10 is an open end of the clearance 8, and takes the form of a slit communicating the clearance 8 with the space outside the apparatus 1. When a sheet document is inserted through the document inlet 10, the sheet document freely falls into the clearance 8.

The recording medium outlet 12 is an opening through which a recording medium on which an image, which may or may not be the image as read by the scanner portion 3, has been recorded is ejected to the outside of the apparatus 1, and takes the shape of a slit. A recording medium holder 13 in the form of a tray, in which one or more recording media is accommodated, is incorporated in the housing 2a. Each of the recording media is fed by a recording medium feeding mechanism and ejected through the recording medium outlet 12.

The operating members include various switches 14-20 which are push-button switches, namely, a start switch 14, a tenkey pad 16, a copy-mode switch 18, and a fax-mode switch 20, arranged in this order from right to left as seen from the front side. When one of these switches 14-20 is pressed down by an operator, processing corresponding to the switch is implemented.

When the start switch 14 is pressed, an operation of the multifunctional apparatus 1 is started in a currently selected mode, that is, in either COPY mode or FAX mode. The tenkey pad 16 comprises ten switches to which FIGS. 0 to 9 are respectively allocated. Through the tenkey pad, a FAX number, the number of copies the operator desires to obtain, and others, are inputted. The copy-mode switch 18 is pressed to select the COPY mode in which an image is recorded on the recording medium, and the fax-mode switch 20 is pressed to select the FAX mode in which image data representative of an image is transmitted to a designated FAX number.

The liquid crystal panel 22 displays details of manipulation of the switches 14-20, the operating state of the multifunctional apparatus 1, and other information, and is constituted by a general-purpose LCD (Liquid Crystal Display).

To the upper surface of the housing 2a, the lid member 5 is attached such that the lid member 5 is pivotally supported to be openable/closable relatively to the upper surface of the housing 2a. The lid member 5 comprises a bar-like handle portion 5a covering the document inlet 10 when the lid member 5 is in its closing state, and two connecting portions 5b respectively extending straight from opposite longitudinal ends of the handle portion 5a so as to be connected to the housing 2a at respective ends thereof such that the lid member 5 is turnable relatively to the housing 2a as described above. The recording medium outlet 12, the various operating members 14-20, and the liquid crystal panel 22 are not covered by the lid member 5. Thus, the lid member 5 has a generally U-like shape in plan view.

When the lid member 5 is closed, the document inlet 10 is covered by the handle portion 5a, preventing introduction of foreign matter such as dust and dirt into the multifunctional apparatus 1 through the document inlet 10. Thus, malfunction of the multifunctional apparatus 1 which may be otherwise caused by the introduction of the foreign material is prevented. Since the operating members 14-20 are exposed to the outside and not covered by the lid member 5 even when the lid member 5 is closed or folded down, it is not necessary to bother to open the lid member 5 when a user desires to manipulate the operating members 14-20. Thus, fax data received can be easily outputted on the recording medium at any time.

With the lid member 5 open relatively to the housing 2a, the user can lift and carry the multifunctional apparatus 1 by gripping the handle portion 5a. That is, the lid member 5 serves as a handle also.

In one of side faces of the housing 2a, namely, a front face thereof, there is formed a document outlet 24 below the recess 2b, and a leg 26 is disposed below the document outlet 24.

Through the document outlet 24, a sheet document as has been supplied from the document inlet 10 is ejected to the outside, by means of a document ejecting mechanism incorporated in the housing 2a.

The leg 26 supports the housing 2a, and another leg 26 is disposed on a rear surface of the housing 2a. The legs 26 are retractable into the housing 2a.

Accordingly, the multifunctional apparatus 1 can stably rest on the rest surface, and be made compact when the legs 26 are retracted into the housing 2a. With the leg 26 on the rear side retracted into the housing 2a, the rear surface of the multifunctional apparatus 1 is flat, thereby enabling to place the multifunctional apparatus 1 with the rear surface in contact with a wall surface or the like.

Referring next to FIGS. 2A and 2B which are schematic cross-sectional views of the multifunctional apparatus 1, there will be described an internal structure of the multifunctional apparatus 1.

FIG. 2A shows the state where the scanner portion 3 is closed, while FIG. 2B shows the state where the scanner portion 3 is open. In FIGS. 2A to 8, the lid member 5 is omitted for simplicity.

First, the internal structure of the housing 2a will be described. Inside the housing 2a, a line head 30 as a recording device is disposed in a lower portion. Inside the housing 2a and above the line head 30 are disposed, among others: an arranging space 32 in which various members are arranged; the recording medium holder 13 which is on the right-hand side of the arranging space 32 as seen in FIGS. 2A and 2B; a flat guide plate 34 disposed on a side of the arranging space 32 opposite to the recording medium holder 13 and extending vertically from a top plate of the housing 2a downward; and a first document ejecting roller 36 which is disposed at a position corresponding to a lower portion of the guide plate 34, and partially protrudes from the document support surface 2c so that while the scanner portion 3 is closed as shown in FIG. 2A, the first document ejecting roller 36 is in contact with the glass plate 4.

The line head 30 records an image on a document which is read by the scanner portion 3 or an image whose data is otherwise obtained, by ejecting ink droplets onto a recording medium K. The line head 30 has a nozzle surface 30a in which nozzles for ejecting ink droplets are formed across a width range not smaller than a width range across which an image is to be recorded on the recording medium K. The line head 30 is disposed with the nozzle surface 30a facing downward.

That is, the recoding is performed onto the recoding medium K during the recording medium K is passing under the line head 30.

By arranging the line head 30 in the lower portion in the housing 2a, the center of gravity of the multifunctional apparatus 1 is located at a lower position. Hence, the multifunctional apparatus 1 rests on the rest surface with an enhanced stability; which leads to improvement in the quality of an image recorded by the apparatus 1.

In the arranging space 32, there are disposed an ink cartridge storing the ink to be supplied to the line head 30, a substrate where a CPU, a RAM, and a ROM are implemented, and others. In FIGS. 2-8, the arranging space 32 is shown merely as a block and detailed description of the members arranged therein is omitted.

The recording medium holder 13 accommodates recording medium or media, and can be inserted into and pulled out of the housing 2a. When accommodated in the recording medium holder 13, the recording medium is in a vertical position with a surface thereof substantially perpendicular to the rest surface. By disposing the recording medium holder 13 inside the housing 2a, the profile of the multifunctional apparatus 1 is simplified compared to the case where the recording medium holder 13 is attached to an external surface of the multifunctional apparatus 1, thereby facilitating carrying of the multifunctional apparatus 1.

The guide plate 34 constitutes a part of the recording medium feeding mechanism for ejecting the recording medium as has been supplied from the recording medium holder 13, through the recording medium outlet 12 to the outside of the apparatus 1. The guide plate 34 supports the recording medium as being fed upward and toward the recording medium outlet 12.

In addition to the guide plate 34, the recording medium feeding mechanism further comprises a pickup roller 40 disposed adjacent to the recording medium holder 13, two pairs 42, 44 of first recording-medium ejecting rollers which are disposed below the line head 30 and on two opposite sides of the line head 30, and two second recording-medium ejecting rollers 46 which are disposed adjacent to the guide plate 34.

The pickup roller 40 separates the topmost or nearest one of the recording media in the recording medium holder 13, from the other recording media, and feeds the picked recording medium downward and toward the line head 30. The two pairs of first recording-medium ejecting rollers 42, 44 are rollers for further feeding the recording medium K as fed from the upper side by the pickup roller 40 such that the recording medium K passes under the line head 30 from right to left in FIGS. 2A and 2B, and then go upward. Thus, the recording medium K makes a U-turn. The two second recording-medium ejecting rollers 46 are rollers for feeding the recording medium K to the recording medium outlet 12, by pinching the recording medium K between each of the rollers 29 and the guide plate 34.

Although not shown, the recording medium feeding mechanism further comprises other members including a guide which is disposed between the pickup roller 40 and the pair 42 of first recording-medium ejecting rollers so as to guide the recording medium as fed downward from the pickup roller 40 to the pair 42 of first recording-medium ejecting rollers, and another guide which guides the recording medium as fed leftward from the pair 44 of first recording-medium ejecting rollers to the second recording-medium ejecting rollers 46.

By the recording medium feeding mechanism, the recording medium K accommodated in the recording medium holder 13 is fed inside the housing 2a along a substantially U-shaped pathway and via the line head 30, as indicated by arrow A in FIG. 2A, and eventually ejected through the recording medium outlet 12 to the outside of the multifunctional apparatus 1.

In this way, the direction in which the sheet document is fed in to be read by the scanner potion 3, and the direction in which the recording medium is ejected from the housing 2a, are parallel and opposite, in other words, ejection of a sheet document and supply of a recording medium are both made on a same side of the apparatus. Thus, the usability is enhanced.

The first document ejecting roller 36 constitutes a part of the document ejecting mechanism, and is operated when a sheet document G is supplied or fed in through the document inlet 10 while the scanner portion 3 is closed relatively to the housing 2a as shown in FIG. 2A.

The first document ejecting roller 36 partially protrudes from the document support surface 2c, and is in contact with the glass plate 4 opposed and adjacent to the first document ejecting roller 36. A position of the first document ejecting roller 36 in the vertical direction is set to be remote from the document inlet 10 by a distance not smaller than a length or a vertical dimension of a sheet document having a largest vertical dimension among all the sheet documents the scanner portion 3 can read. The first document ejecting roller 36 is rotatable in two opposite directions.

That is, the first document ejecting roller 36 holds the sheet document G as supplied through the document inlet 10 by pinching the document G between the first document ejecting roller 36 and the glass plate 4, and ejects the sheet document G through the document outlet 24.

Since the clearance 8 extends linearly downward from the document inlet 10, the sheet document G fed in through the document inlet 10 falls freely to be caught at the first document ejecting roller 36, which is at this time rotating clockwise as seen in FIG. 2A. A lower end of the sheet document G is thus trued up by the first document ejecting roller 36.

The rotation of the first document ejecting roller 36 is then reversed, that is, the first document ejecting roller 36 is rotated counterclockwise as seen in FIG. 2A, to feed downward the sheet document G which the first document ejecting roller 36 holds.

In addition to the first document ejecting roller 36, the document ejecting mechanism further comprises a second document ejecting roller 48 disposed on the inner or rear side of the document outlet 24, and a generally L-shaped guide (not shown) which guides the sheet document as has passed the first document ejecting roller 36 to the second document ejecting roller 48. Thus, the document fed downward by the first document ejecting roller 36 is bent along the generally L-shaped guide to the front side, and ejected through the document outlet 24 by means of the second document ejecting roller 48.

That is, the sheet document G supplied through the document inlet 10 is fed by the document ejecting mechanism along the generally L-shaped pathway as indicated by arrow B shown in FIG. 2A, and ejected through the document outlet 24.

There will be described an internal structure of the scanner portion 3. As stated above, the scanner portion 3 incorporates the reading device 6 for reading an image of a document, optically. The reading device 6 optically reads the image of the document. That is, the reading device 6 emits light onto the document through the glass plate 4, and receives the light as reflected by the document, to convert the received light into an electrical signal.

The reading device 6 is capable of reciprocating in a longitudinal direction of the glass plate 4. More specifically, at two longitudinal opposite ends of the glass plate 4 are disposed a pair of pulleys (not shown) around which is entrained an endless belt (not shown), and the reading device 6 is coupled with the endless belt to be reciprocated in the longitudinal direction.

Thus, when a sheet document G is fed in through the document inlet 10 while the scanner portion 3 is closed relatively to the housing 2a as shown in FIG. 2A, the reading device 6 is fixed at a predetermined position and reads an image on the sheet document G as passing the reading device 6 by being fed by the document ejecting mechanism.

On the other hand, when a book document B is placed on the glass plate 4 while the scanner portion 3 is open relatively to the printer portion 2 as shown in FIG. 2B, the reading device 6 reads an image on the book document B by being displaced along a surface of the glass plate 4 in a direction indicated by arrow S.

There will be described a connecting structure between the scanner portion 3 and the printer portion 2. The scanner portion 3 is pivotally supported, at a part below the glass plate 4 when the scanner portion 3 is in the upright position, by a shaft 804 or a pivot support 802 therearound (fully described below) disposed inside the recess 2b in the housing 2a.

Hence, the scanner portion 3 is capable of turning toward the rest surface around a rotational axis or the shaft 804. When it is desired to have the scanner portion 3 read an image on a book document B, the operator holds an upper end portion of the scanner portion 3 and turns the scanner portion a around the shaft 804 toward the rest surface, to place the scanner portion 3 in the horizontal position. With the scanner portion 3 in this horizontal position, the glass plate 4 faces upward, enabling the operator to place the book document B on the glass plate 4 to have the scanner portion 3 read the image on the book document B.

An angle formed between the scanner portion 3 in the horizontal position and the housing 2a standing substantially upright is about 70 to 120 degrees, and preferably about 80 to 110 degrees, to have a project area as seen from the upper side of the apparatus 1 relatively large.

There will be now described a multifunctional apparatus according to a second embodiment of the invention, by referring to a schematic cross-sectional view of the multifunctional apparatus in FIG. 3.

It is noted that in the following description related to embodiments of the invention other than the first embodiment, the elements or parts corresponding to those in the first embodiment will be referred to by the same reference numerals used in the first embodiment, and description thereof is omitted.

In FIG. 3, reference numeral 200 generally denotes the multifunctional apparatus according to the second embodiment, which is different from the multifunctional apparatus 1 of the first embodiment in the direction in which the ink droplets are ejected from the line head 30. That is, although the line head 30 of the multifunctional apparatus 1 is disposed such that the ink droplets are ejected downward, a line head 230 of the multifunctional apparatus 200 according to the second embodiment is disposed such that the ink droplets are ejected sidewise, namely, leftward in FIG. 3.

More specifically, the line head 230 is disposed at the same position as the line head 30 in the first embodiment, but such that a nozzle surface 230a of the line head 230 faces sideward or leftward in FIG. 3. Accordingly, ink droplets are ejected toward a recording medium K which is on the way upward and toward a recording medium outlet 12.

In the multifunctional apparatus 1 of the first embodiment, the recording medium K on which the ink droplets have landed is afterward bent about 90 degrees, and thus the ink droplets still wet on the recording medium K may be flowed or otherwise affected by the bending, causing degradation in the quality of the recorded image.

On the other hand, in the multifunctional apparatus 200 of the second embodiment, the recording medium K on which the ink droplets have landed is fed linearly upward and not bent. Hence, the degradation in the image quality caused by the bending of the recording medium K after landing of the ink droplets is prevented. The nozzle surface 230a is constituted by one surface of a nozzle arming part which is indicated by hatching in FIG. 3 and fixed on the line head 230. Since the assembly of the line head 230 and the nozzle forming part has a smaller dimension in a direction of ejection of ink droplets, than its widthwise dimension, which is a vertical dimension thereof as seen in FIG. 3, the orientation in which the assembly of the line head 230 and the nozzle forming part is disposed is advantageous to reduce the thickness of the housing 2a.

There will be now described a multifunctional apparatus according to a third embodiment of the invention, by referring to FIG. 4 which is a schematic cross-sectional view of the multifunctional apparatus.

In FIG. 4, reference numeral 300 generally denotes the multifunctional apparatus of the third embodiment, which is different from the multifunctional apparatus 1 of the first embodiment in the pathway along which the recording medium is fed by the recording medium feeding mechanism. That is, in the multifunctional apparatus 1 the recording medium is ejected after fed along the generally U-shaped pathway, but in the multifunctional apparatus 300 of the present embodiment, the recording medium is ejected after fed along a generally L-shaped pathway.

Hence, a recording medium outlet 312, which corresponds to the recording medium outlet 12 in the multifunctional apparatus 1, is open in one of side faces, namely, a front face, of the housing and at a position below a document outlet 24, in the third embodiment.

Accordingly, a recording medium K fed downward by a pickup roller 40 is bent along a guide plate (not shown) toward the front face in which the recording medium outlet 312 is open, and ejected through the recording medium outlet 312 by being fed under a line head 30 by means of two pairs of first recording-medium ejecting rollers 42, 44.

Compared to the generally U-shaped pathway of the first and second embodiments, the length of the generally L-shaped pathway is relatively short, enabling to reduce the time taken to eject the recording medium. The generally L-shaped pathway is advantageous also in that the recording medium K and the sheet document G are ejected from the same side face, enhancing the usability.

There will be described a multifunctional apparatus according to a fourth embodiment of the invention, by referring to FIGS. 5A, 5B and 5C which are schematic cross-sectional views of the multifunctional apparatus, showing in time series how a sheet document is fed by a document feeding mechanism.

In FIGS. 5A, 5B and 5C, reference numeral 400 generally denotes the multifunctional apparatus 400 of the fourth embodiment, which is different from the multifunctional apparatus 1 of the first embodiment in the pathway along which the sheet document is fed by the document ejecting mechanism. That is, although in the multifunctional apparatus 1 the sheet document G is fed along the generally L-shaped pathway, the multifunctional apparatus 400 is constructed to feed a sheet document G in a reciprocating manner, namely, a sheet document G as fed in through a document inlet 10 is then ejected again through the document inlet 10.

The multifunctional apparatus 400 comprises a third document ejecting roller 402 as a part of a document ejecting mechanism. The third document ejecting roller 402 partially protrudes from a document support surface 2c to contact a glass plate 4 while a scanner portion 3 is closed relatively to a housing 2a of a printer portion 2. The third document ejecting roller is remote from the document inlet 10 by a distance smaller than a length or a vertical dimension of a sheet document having a minimum length among all the sheet documents that the scanner portion 3 can read, so that the sheet document of the minimum length can be properly fed and ejected. The third document ejecting roller 402 is rotatable in two opposite directions.

When a sheet document G is fed in through the document inlet 10 as shown in FIG. 5A, the sheet document G is first caught by the third document ejecting roller 402, which is at this time rotating clockwise as seen in FIGS. 5A, 5B and 5C, thereby truing up a lower end of the sheet document G.

Since the third document ejecting roller 402 is remote from the document inlet 10 by the distance smaller than the length of the sheet document of the minimum length, an upper end portion of the sheet document G as fed in is located outside the multifunctional apparatus 1.

Then, as shown in FIG. 5B, the rotation of the third document ejecting roller 402 is reversed, that is, the third document ejecting roller 402 is rotated counterclockwise, so as to pull in the sheet document G downward, and the reading device 6 is displaced in a direction indicated by arrow S to read an image on the sheet document G.

Thereafter, the rotation of the third document ejecting roller 402 is reversed, that is, the third document ejecting roller 402 is rotated again clockwise. Hence, the upper end portion of the sheet document G projects from the document inlet 10 like the state shown in the FIG. 5A. The operator pulls out the sheet document G as protruding from the document inlet 10 from the multifunctional apparatus 1.

As described above, in the multifunctional apparatus 400 of the fourth embodiment, the document inlet 10 through which the sheet document G is fed in also serves as a document outlet through which the sheet document G is ejected, thereby simplifying the document feeding mechanism, reducing the cost of the apparatus, and enhancing the usability, compared to the arrangement where the sheet document G is fed along a generally L-shaped pathway.

There will be described a multifunctional apparatus 500 according to a fifth embodiment of the invention, by referring to FIGS. 6A, 6B, 6C and 6D, in which FIGS. 6A, 6B and 6C are schematic cross-sectional views of the multifunctional apparatus, showing in time series how a sheet document is fed by a document ejecting mechanism. FIG. 6D is an enlarged cross-sectional view of a fourth document ejecting roller in the multifunctional apparatus.

In FIGS. 6A to 6D, reference numeral 500 generally denotes the multifunctional apparatus of the fifth embodiment. Similar to the multifunctional apparatus 400 of the fourth embodiment, a sheet document G fed in through a document inlet 10 is transferred in a reciprocating manner and ejected back through the document inlet 10.

The multifunctional apparatus 500 comprises a fourth document ejecting roller 502 as a part of a document ejecting mechanism. The fourth document ejecting roller 502 is located above the first document ejecting roller 36.

As shown in FIG. 6D, the fourth document ejecting roller 502 comprises a first gear 504, an arm 506 coupled with the first gear 504 to be capable of swinging, a second gear 508 connected to an end of the arm 506, a third gear 510 interposed between the second gear 508 and the first gear 504, and a roller 512 rotatably coupled with the second gear 508.

When a sheet document G is fed in through the document inlet 10 as shown in FIG. 6A, the sheet document G falls freely to the first document ejecting roller 36, since the fourth document ejecting roller 502 is retracted from a clearance 8 extending from the document inlet 10 and not in the way of the free fall of the sheet document G. Thus, the sheet document G is initially held by the first document ejecting roller 36.

Then, a reading device 6 is displaced in a direction indicated by arrow S, as shown in FIG. 6B, so as to scan an image on the sheet document G.

Thereafter, as shown in FIG. 6C, the first gear 504 starts rotating clockwise as seen in FIG. 6C, and the arm 506 coupled with the first gear 504 swings toward a glass plate 4, thereby having the sheet document G pinched between the roller 512 and the glass plate 4. Thus, the rotation of the first gear 504 is transmitted to the second gear 508 via the third gear 510, and the roller 512 rotates clockwise with the rotation of the second gear 508. Hence, the sheet document G is pushed upward to be ejected again through the document inlet 10.

The thus constructed multifunctional apparatus 500 of the fifth embodiment can handle or scan a wider range of sheet documents G in terms of sheet size, than the multifunctional apparatus 400 of the fourth embodiment.

There will be described a multifunctional apparatus according to a sixth embodiment of the invention, by referring to FIG. 7, which is a schematic cross-sectional view of the multifunctional apparatus in a state where a scanner portion thereof is open. In FIG. 7, reference numeral 600 generally denotes the multifunctional apparatus, which comprises a support 602 disposed on the scanner portion 3.

The support 602 is for supporting the scanner portion 3 as opened to be opposed to a rest surface. The support 602 is supported to be pivotable around a support shaft 604 disposed on a side surface of the scanner 3, and has a length to make a glass plate 4 horizontal when the scanner portion 3 is opened and supported by the support 602. In this embodiment, when the scanner portion 3 is in its open position, the scanner portion 3 is exactly parallel to the rest surface, as long as the support 602 is placed on a plane place in the rest surface.

By provision of the support 602, the glass plate 4 is held parallel to the rest surface when the scanner portion 3 is opened or laid down. Hence, a book document B can stably rest on the glass plate 4 even without the operator holding down the book document B onto the glass plate 4, thereby enhancing the usability.

An area at which the support 602 contacts the rest surface is smaller than that when the support 602 is not provided and the scanner portion 3 is laid down directly on the rest surface. Hence, even where the rest surface is not smooth, the glass plate 4 is little affected by the nonsmoothness of the rest surface, and can be held parallel to the rest surface. When the scanner portion 3 is closed, the support 602 is turned toward the scanner portion 3 to be accommodated in the scanner portion 3.

Figure 8:
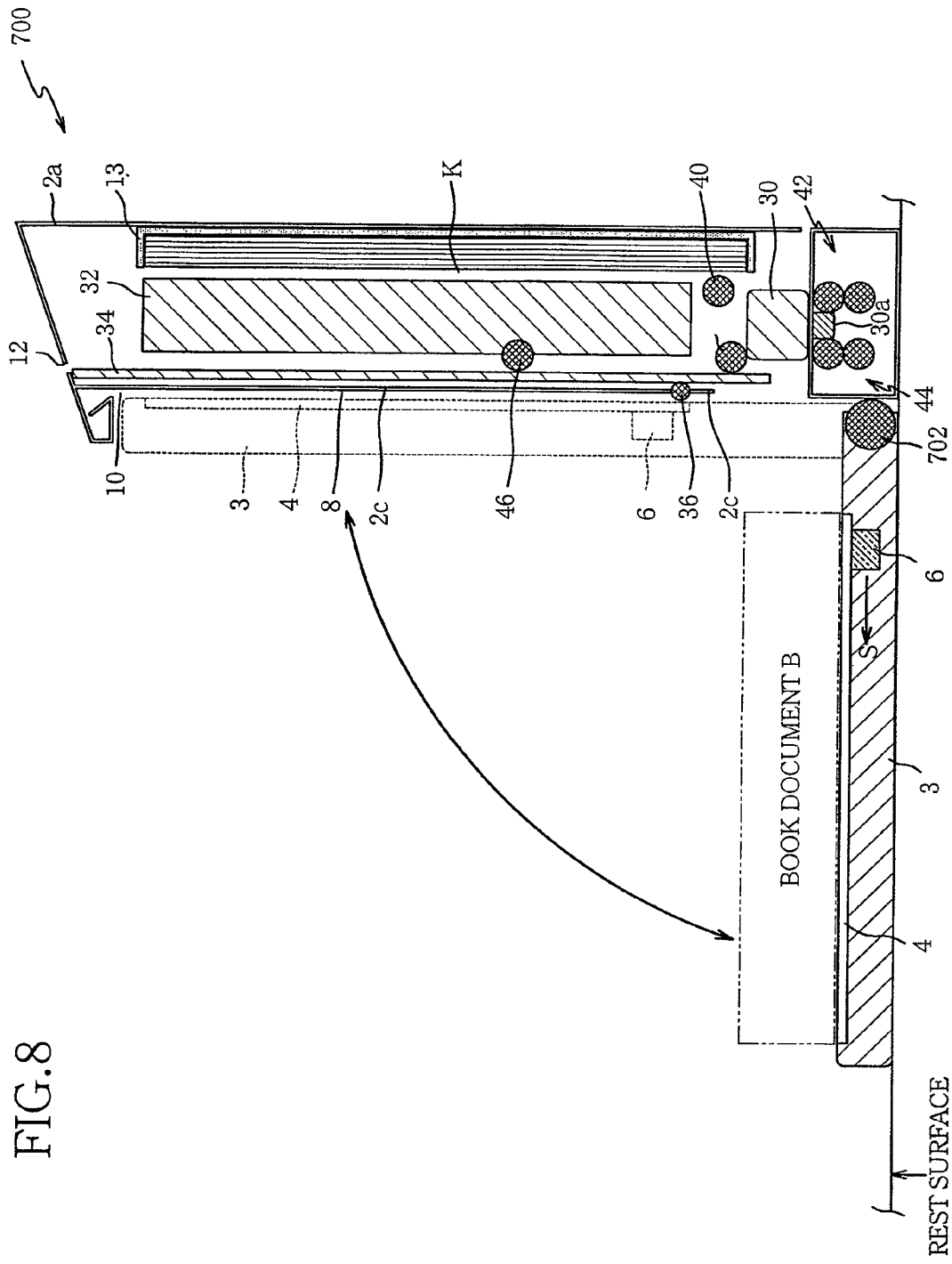
FIG. 8 is a schematic cross-sectional view of a multifunctional apparatus according to a seventh embodiment of the invention in a state where a scanner portion is open.

There will be described a multifunctional apparatus according to a seventh embodiment of the invention, by referring to FIG. 8, which is a schematic cross-sectional view of the multifunctional apparatus in a state where a scanner portion thereof is open. In FIG. 8, reference numeral 700 generally denotes the multifunctional apparatus, in which the scanner portion is pivotally connected to a housing of a printer portion such that when the scanner portion is open, an entirety of a surface of the scanner portion which is opposite to a glass plate 4 is in contact with a rest surface.

More specifically, in the multifunctional apparatus 1 of the first embodiment, a lower end surface of the recess 2b is located above or spaced from a bottom surface of the housing 2a by a certain distance. In the multifunctional apparatus 700 of the seventh embodiment, however, a recess 2b is formed to extend to a bottom surface of the housing 2a, and the scanner portion 3 is pivotally supported at a lower end portion thereof by a shaft 804 which is disposed inside the recess 2b and immediately above the rest surface.

Accordingly, when the scanner portion 3 is opened by being turned around the shaft 804, the entirety of the surface of the scanner portion 3 which is opposite to the glass plate 4 is brought into contact with the rest surface. Thus, in this embodiment, when the scanner portion 3 is in the open position, the scanner portion 3 is exactly parallel to the rest surface. This arrangement ensures stability in reading an image on a book document placed on the glass plate 4, even where the book document is a dictionary or other thick and heavy books.

Figure 9A:
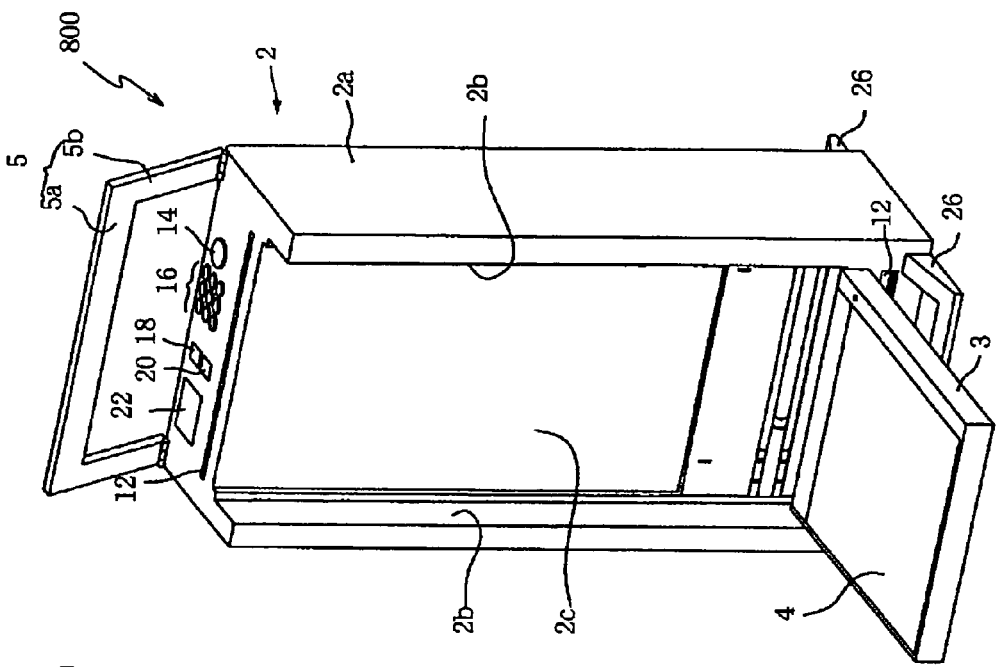
Figure 9B:
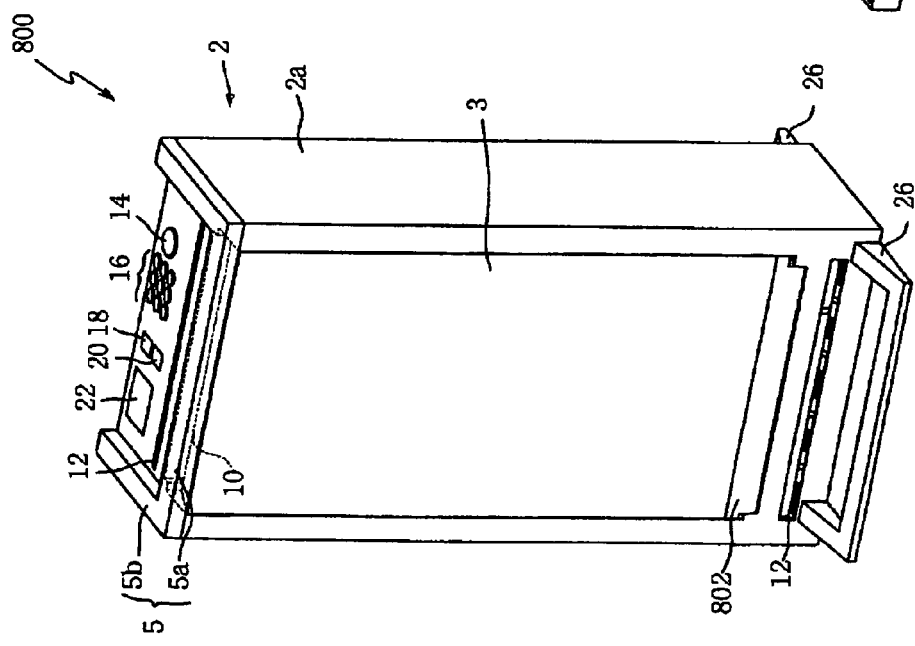

There will be described a multifunctional apparatus according to an eighth embodiment of the invention, by referring to FIGS. 9 to 13. FIGS. 9A and 9B are perspective views of the multifunctional apparatus in which FIG. 9A shows a state where a scanner portion and a lid member are closed relatively to a housing, and FIG. 9B shows a state where a scanner portion and a lid member are open.

Figure 13:
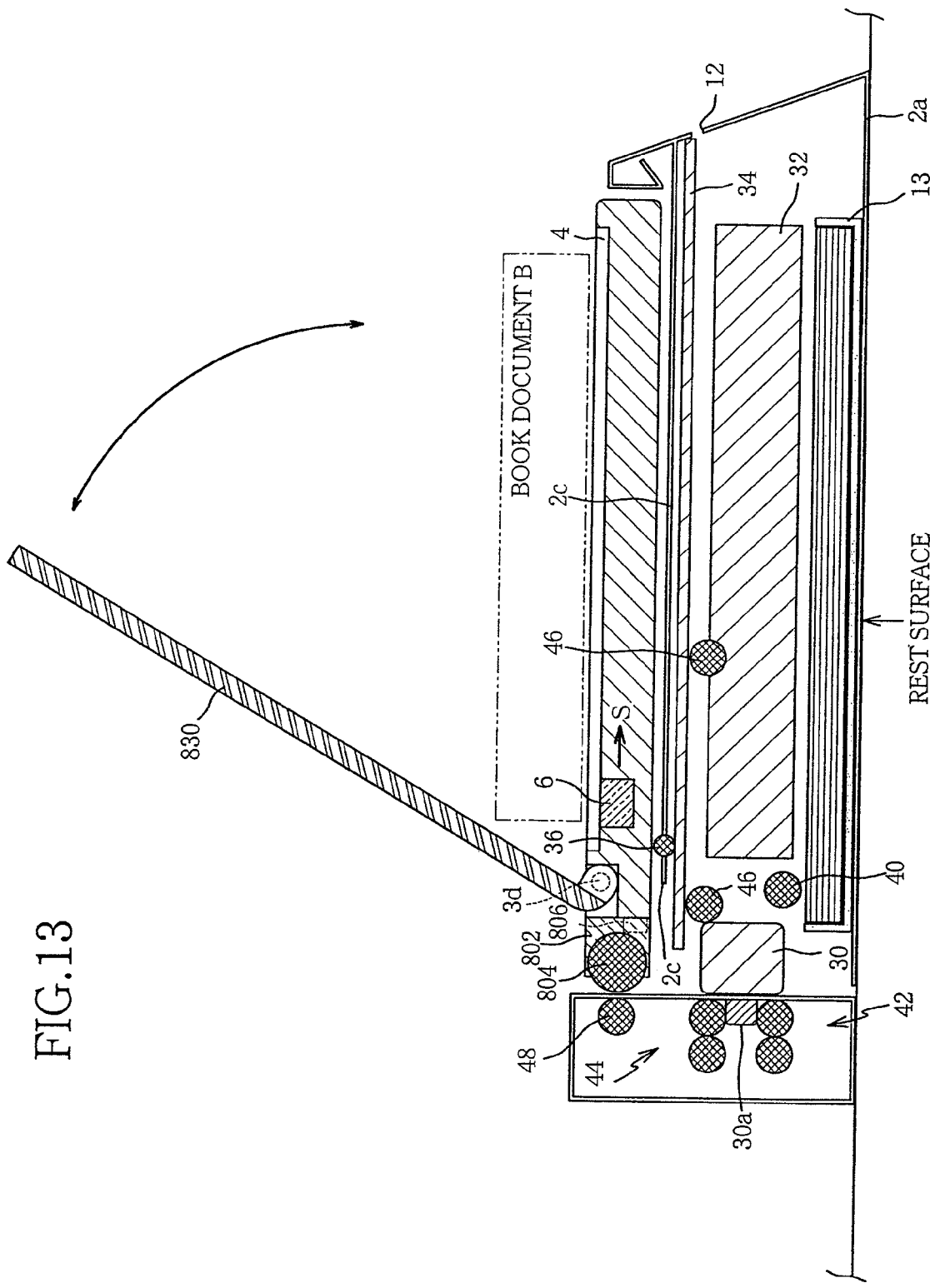
FIG. 13 is a schematic cross-sectional view of the multifunctional apparatus as laid down.

In FIGS. 9A and 9B, reference numeral 800 denotes the multifunctional apparatus of the eighth embodiment, which is changeable in posture between a standing posture where both a printer portion 2 and a and a lying posture where the printer portion 2 is laid down and the scanner portion 3 is also laid down on the printer portion as shown in FIG. 13. When the multifunctional apparatus 800 is in the standing posture, the scanner portion 3 can be placed in either an exactly upright position shown in FIG. 9A in which a sheet document is readable but a book document is not readable, or a substantially horizontal position (namely, a position slightly inclined downward with respect to a plane exactly parallel to the rest surface) shown in FIG. 9B in which both the sheet document and book document are readable.

Thus, when the multifunctional apparatus 800 is in the standing posture, the area occupied by the housing 2a of the printer portion 2 in the rest surface is minimized, enabling to reduce an area occupied by the multifunctional apparatus 800 on the rest surface. Further, in the state where the scanner portion 3 is closed relatively to the housing 2a, the scanner portion 3 is accommodated in a recess 2b of the housing 2a, thereby making the multifunctional apparatus 800 compact as a whole.

According to the multifunctional apparatus 800, the book document can be read without laying down the entirety of the multifunctional apparatus 800, but by only placing the scanner portion 3 in the substantially horizontal position while the printer portion 2 is kept standing upright. Thus, a manipulation required when the book document is to be read is relatively easy.

The scanner portion 3 reads an image on a document, and has a flat shape with a considerable thickness. The scanner portion 3 incorporates a reading device 6 which optically reads the image on the document, and has a transparent glass plate 4 in a surface thereof which faces upward when the scanner portion 3 is open relatively to the housing 2a while the multifunctional apparatus 800 is in the standing posture. That is, the scanner portion 3 is separably connected to a pivot support 802 disposed in the housing 2a, such that the surface in which the transparent glass plate 4 is disposed is opposed to the housing 2a when the scanner portion 3 is closed relatively to the housing 2a while the multifunctional apparatus 800 is in the standing posture. The connecting structure between the scanner portion 3 and the printer portion 2 or its pivot support 802 will be fully described later by referring to FIGS. 11 and 12.

The pivot support 802 is connected to the housing 2a to be rotatable relatively to the housing 2a. Accordingly, the scanner portion 3 rotatable relatively to the housing 2a. Accordingly, the scanner portion 3 connected to the pivot support 802 is displaceable between the exactly upright position shown in FIG. 10A and the substantially horizontal position shown in FIG. 10B by turning the scanner portion 3 about a shaft 84 or the pivot support 802.

The scanner portion 3 is connected to the pivot support 802 such that a clearance 8 (shown in FIGS. 10A and 10B) is formed between the glass plate 4 and a surface of the recess 2b which is opposed to the glass plate 4 when the scanner portion 3 is in the exactly upright position. The surface of the recess 2b to be opposed to the glass plate 4 constitutes a document support surface 2c. When a sheet document is supplied to the clearance 8 through a document inlet 10 while the scanner portion 3 is in the upright position, an image on the sheet document is read by the scanner portion 3. On the other hand, when the scanner portion 3 is in the horizontal position in which a major surface of the glass plate 4 faces upward, a book document can be placed on the major surface of the glass plate 4 to be read by the scanner portion 3 through the glass plate 4.

Thus, the multifunctional apparatus 800 is constructed such that when the scanner portion 3 is in the upright position as shown in FIG. 10A, a sheet document is readable, and when the scanner portion 3 is in the horizontal position shown in FIG. 10B, a book document is also readable.

The connecting structure between the scanner portion 3 and the printer portion 2 will be described more specifically. The pivot support 802 to which the scanner portion 3 is connected is supported by the shaft 804 such that the pivot support 802 is rotated about an axis of the shaft 804. When it is desired to have the scanner portion 3 read an image on a book document B, the operator holds an upper end portion of the scanner portion 3 and turns the scanner portion 3 around the shaft 804 toward the rest surface, to change the position of the scanner portion 3 from the upright position to the horizontal position. With the scanner portion 3 in this horizontal position, the glass plate 4 faces upward, enabling the operator to place the book document B on the glass plate 4 to have the scanner portion 3 read the image on the book document B by displacing the reading device 6 in a direction indicated by S in FIG. 10B.

Figure 11:
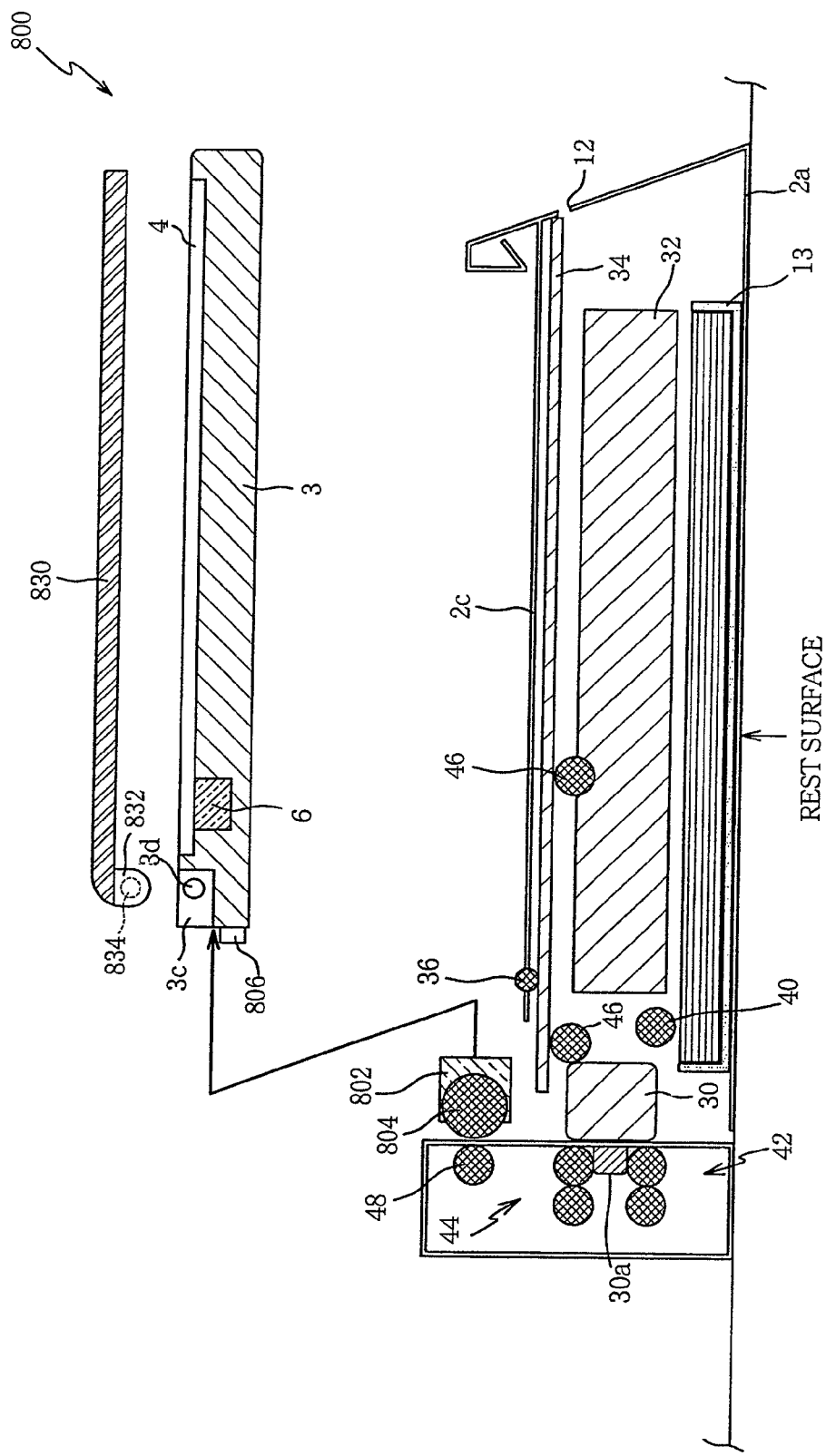
FIG. 11 is a schematic cross-sectional view showing a state where the scanner portion is separated from the housing.
Figure 12:
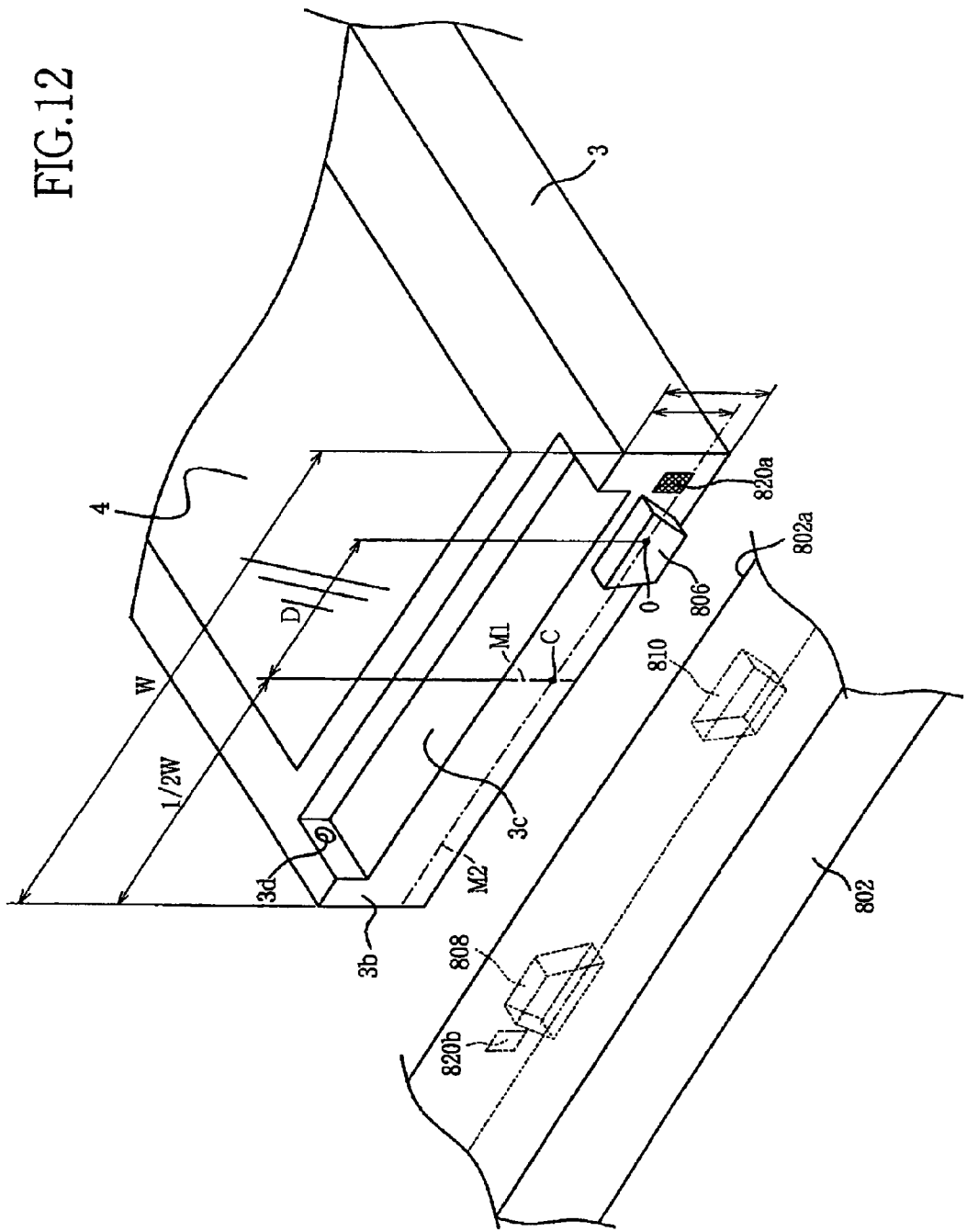
FIG. 12 shows in enlargement a connecting structure between the scanner portion and the printer portion.

The connecting structure between the scanner portion 3 and the printer portion 2 will be described by referring to FIGS. 11 and 12, in which FIG. 11 is a schematic cross-sectional view showing a state where the printer portion 2 with the housing 2a is separated from the scanner portion 3, while FIG. 12 is an enlarged perspective view of the connecting structure.

The scanner portion 3 can be separably attached in two orientations to the pivot support 802 of the housing 2a, that is, a first orientation as shown in FIGS. 10A and 10B in which the surface where the glass plate 4 is disposed is opposable to the housing 2a, and a second orientation as shown in FIGS. 11 and 13 in which the surface of the glass plate 4 is on the side remote from or opposite to the housing 2a.

As shown in FIG. 12, the pivot support 802 has a connecting surface 802a, and the scanner portion 3 has a connecting surface 3b. The connecting surfaces 802a and the 3b are brought into abutting contact with each other. A connector protrusion 806 is armed in the connecting surface 3b of the scanner portion 3. A first connector recess 808 and a second connector recess 810 in either of which the connector protrusion 806 is to be fitted are formed in the connecting surface 802a of the pivot support 802.

The connector protrusion 806 and the first and second connector recesses 808, 810 constitute a connector of centronics interface with 36-pin, for mechanically connecting the scanner portion 3 and the pivot support 802, as well as establishing electrical connection therebetween. Namely, data of an image read by the scanner portion 3 is outputted to the printer portion 2 from the scanner portion 3, through the connection between the connector protrusion 806 and either one of the first and second connector recesses 808, 810.

A cross sectional shape of the connector protrusion 806 is trapezoidal, that is, two sides thereof parallel to the external surfaces of the glass plate 4 are parallel to each other and are different in length. A longitudinal or width dimension of the connecting surface 3b of the scanner portion 3 is W, and a maximum thickness of the connecting surface 3b is T. A center O of the connector protrusion 806 is remote by a distance D from a center line M1 of the connecting surface 3b of the scanner portion 3 in its longitudinal direction, and remote by a distance H in the direction of the thickness of the scanner portion 3 from an external surface of the scanner portion 3 on which the glass plate 4 is formed.

The connector protrusion 806 is fitted in the first connector recess 808 when the scanner portion 3 is attached to the housing 2a or its pivot support 802 with the glass plate 4 opposable to the housing 2a, namely, when the scanner portion 3 and the printer portion 2 are attached to each other such that the multifunctional apparatus 800 is in the standing posture, as shown in FIGS. 10A and 10B.

On the other hand, the connector protrusion 806 is fitted in the second connector recess 810 when the scanner portion 3 is attached to the housing 2a or its pivot support 802 with the glass plate 4 facing the outside space and on the side remote from or opposite to the housing 2a, namely, when the scanner portion 3 and the printer portion 2 are attached to each other such that the multifunctional apparatus 800 is in the lying posture, as shown in FIGS. 11 and 13.

Thus, the first and second connector recesses 808, 810 are formed in a substantially trapezoidal shape in cross section, which is similar to and larger than that of the connector protrusion 806. The positions of the connector recesses 808, 810 in the connecting surface 802a of the pivot support 802 abutting the connecting surface 3a of the scanner portion 3, are in symmetric relation, with respect to the center line M1 of the connecting surface 3a, as well as with respect to an intersecting point C of the center line M1 and a line M2 which is parallel to the longitudinal sides of the connecting surface 3b and remote by the distance H from the external surface of the scanner portion 3 on which the glass plate 4 is formed.

In this arrangement, when the scanner portion 3 is to be attached to the pivot support 802 with the glass plate 4 opposable to the housing 2a, i.e., in the first orientation shown in FIGS. 10A and 10B, the connector protrusion 806 can not be erroneously fitted in the second connector recess 810, thereby preventing an electric defect due to erroneous connection between the connector protrusion 806 and the second connector recess 810.

Similarly, when the scanner portion 3 is attached to the pivot support 802 with the glass plate 4 on the side opposite to or remote from the housing 2a, as shown in FIGS. 11 and 13, the connector protrusion 806 can not be erroneously fitted in the first connector recess 808, thereby preventing the erroneous electric connection between the connector protrusion 806 and the first connector recess 808.

In this way, when the scanner portion 3 is attached to the pivot support 802 with the glass plate 4 of the scanner portion opposable to the housing 2a, the connector protrusion 806 is fitted in the first connector recess 808. While the multifunctional apparatus 800 is in this state, when the scanner portion 3 is desired to be attached to the pivot support 802 with the glass plate 4 of the scanner portion 3 on the side opposite to the housing 2a, the scanner portion 3 is first separated from the housing 2a with the connector protrusion 806 pulled out from the first connector recess 808, and then the orientation of the scanner portion 3 is reversed and the connector protrusion 806 is fitted in the second connector recess 810 this time. Thus, the scanner portion 3 can be easily and by a simple manipulation attached to and detached from the pivot support 802.

The above-described arrangement may be modified such that a connector element formed in the scanner portion 3, namely the connector protrusion 806, is replaced with a connector recess, while connector elements formed in the pivot support 802, namely the first and second connector recesses 808, 810, are replaced with connector protrusions. In such a modification, however, a dummy connector recess for receiving the first or second connector 808, 810 which does not receive the connector protrusion upon connection of the scanner portion 3 and the pivot support 802 should be formed in the pivot support 802. This makes the structure of the scanner portion 3 relatively complex. Hence, the above-described arrangement where the connector element in the scanner portion 3 is a protrusion, and the connector elements in the pivot support 802 are recesses, is preferable.

At the place adjacent to the connector protrusion, there is disposed a detecting element 820a of a switch. At a place in the pivot support 802 to be brought into contact with the detecting element 820a upon fitting of the connector protrusion 806 in the first connector recess 808, there is disposed a detected element 820b of the switch.

That is, the switch consisting of the detecting and detected elements 820a, 820b detects fitting of the connector protrusion 806 in the first connector recess 808. More specifically, when the connector protrusion 806 is fitted in the first connector 808, the detecting and detected elements 820a, 820b are brought into contact with each other, and a detection signal indicating this fitting is sent from the scanner portion 3 to a CPU in the housing 2a, via the connection between the detecting and detected elements 820a, 820b which are in contact. In this way, it is detected that the connector protrusion 806 is connected to the first connector recess 808.

The state where the connector protrusion 806 is connected to the first connector recess 808 corresponds to the state where the scanner portion 3 is attached to the pivot support 802 with the glass plate 4 oriented to be opposable to the housing 2a, as shown in FIGS. 10A and 10B. Hence, when the multifunctional apparatus 800 is in this state, the document ejecting mechanism including the first document ejecting roller 36 is driven in order to automatically eject the sheet document which is fed in through the document inlet 10 and ejected through the document outlet 24.

On the other hand, when the connector protrusion 806 is fitted in the second connector recess 810, the detecting element 820a does not contact the detected element 820b, and the document ejecting mechanism is not driven. That is, the state where the connector protrusion 806 is connected to the second connector recess 810 is established when the scanner portion 3 is attached to the pivot support 802 with the glass plate 4 on the side remote from the housing 2a, as shown in FIGS. 11 and 13, and in this sheet, a document is not fed from the document inlet 10 and driving of the document ejecting mechanism is accordingly inhibited.

As shown in FIG. 11, a cover 830 is removably attached to the scanner portion 3. More specifically, as shown in FIG. 11, a recess portion 3c sunken from the external surface of the scanner portion 3 on which the glass plate 4 is disposed, is formed at an end portion of the scanner portion 3, and a fitting hole 3d is formed in each of two longitudinal end surfaces of the recess portion 3c.

The cover 830 is a plate-like member of a size capable of covering the glass plate 4, as shown in FIG. 11. As shown in FIG. 11, a tab 832 is provided at each of two opposite lateral ends of an end portion of the cover 830, and an outward protrusion 834 is formed in each tab 832.

The outward protrusions 834, 834 of the cover 830 are fitted in the fitting holes 3d formed in the recess portion 3c to be capable of rotating relatively to the scanner portion 3. Thus, the cover 830 can be attached to the scanner portion 3 to be turnable, around an axis provided by the outward protrusions 3c, 3c, away and toward the glass plate 4 of the scanner portion 3.

There will be next described how to use the multifunctional apparatus 800 in the lying posture, by referring to FIG. 13, which is a schematic cross-sectional view of the multifunctional apparatus 800. In the present embodiment, the term "lying posture" of the multifunctional apparatus 800 refers to a state where the printer portion 2 is laid down on the rest surface, and the scanner portion 3 is placed on the printer portion 2 in a lying posture with its glass plate 4 on the side opposite to or remote from the housing 2a of the printer portion 2, that is, with the glass plate 4 facing upward, as shown in FIG. 13.

That is, when the lying posture is to be established from the state where the scanner portion 3 is connected to the printer portion 2 with its glass plate 4 opposable to the printer portion 2, as shown in FIG. 10A, the scanner portion 3 is first detached from the pivot support 802, then the scanner portion 3 is connected to the pivot support 802 such that the connector protrusion 806 and the second connector recess 810 are connected, with the glass plate 4 on the side opposite to the housing 2a, and the multifunctional apparatus 800 as a whole is laid down on the rest surface so that a rear surface of the housing 2a is in direct contact with the rest surface. When the multifunctional apparatus 800 is in this lying posture, the cover 830 is attached to the scanner portion 3, as described above. That is, the cover 830 is removed from the printer portion 2 when the scanner portion 3 and the printer portion 2 are connected to each other while the multifunctional apparatus 800 is in the standing posture. This makes it unnecessary to secure a space for accommodating the cover in the housing 2a. Hence, in the standing posture, a thickness of the multifunctional apparatus 800 as a whole is relatively small.

To read a book document or a sheet document while the apparatus 800 is in the lying posture, the cover 830 is turned so as to expose the glass plate 4 to the outside space, and the book document or the sheet document is placed on the glass plate 4. The cover 830 is then turned downward to sandwich the book document or sheet document between the cover 830 and the glass plate 4. After it is confirmed that the operating mode of the multifunctional apparatus 800 is set at the COPY mode, the start switch 14 is pressed. Then, the reading device 6 is displaced in the direction of the arrow S to read an image on the book document or sheet document.

In this state where the multifunctional apparatus 800 is in the lying posture with the connector protrusion 806 fitted in the second connector recess 810, the detecting and detected elements 820a, 820b of the switch do not contact, as can been seen from FIG. 12, and the document ejecting mechanism including the first document ejecting roller 36 is not driven, thereby preventing operating noise which would be otherwise generated due to driving of the document ejecting mechanism. Accordingly, the user is not caused to worry that a defect may be occurring, by noise generated by unnecessary driving of the document ejecting mechanism.

That is, while the multifunctional apparatus 800 is in the lying posture, it is omitted to drive the document ejecting mechanism including the first document ejecting roller 36, since the book document or sheet document read is manually set and removed by the user.

Since the book or sheet document can be read with the document sandwiched between the cover 830 and the glass plate 4, the light emitted from the reading device 6 less scatters, as well as incidence of disturbing light on the reading device is prevented, compared to a case where the cover 830 is not used. Hence, the accuracy and precision in reading a document is enhanced.

The data of the image read by the reading device 6 is outputted to the printer portion 2 via the connection between the connector protrusion 806 and the second connector recess 810. Then, a recording medium is fed into a pathway by the pickup roller 40, by being separated from the other recording media in the recording medium holder 13. The recording medium is fed along the guide not shown, while being bent, to the position opposed to the line head 30, at which recording of the image on the recording medium is performed by the line head 30 based on the outputted image data. The recording medium is then fed along the guide (not shown) while being bent, and ejected through the recording medium outlet 12.

The multifunctional apparatus 800 is capable of reading both of a book document and a sheet document while in both of the standing posture and the lying posture, since when the apparatus 800 is in the lying posture, the scanner portion 3 can be oriented such that the glass plate 4 faces upward so that a book document or sheet document is put on the glass plate 4. It is noted that when the apparatus 800 is in the lying posture, the scanner portion 3 is laid down on the printer portion 2 as lying, and the scanner portion 3 and the printer portion 2 do not occupy separate areas in the rest surface, in other words, only an area substantially corresponding to the rear surface of the housing 2a of the printer portion 2 is occupied by the apparatus 800. Thus, the book document or sheet document can be read with a relatively small area required.

The book document or sheet document may be read in a state where the entirety of the multifunctional apparatus 800 is laid down such that the rear surface of the housing 2a contacts the rest surface and the scanner portion 3 is oriented as shown in FIGS. 10A and 10B with the glass plate 4 opposable to the housing 2a.

To read the book document in this state, a surface of the book document to be read should be oriented toward the glass plate 4. Accordingly, the book document is supported at a back thereof and thus unstably placed on the glass plate 4. In this case, the scanner portion 3 may be detached from the pivot support 802 and then re-attached thereto but now with the glass plate 4 on the side remote from the housing 2a, namely, facing upward, so as to enable to read the book document in a stable state. In this way, the multifunctional apparatus 800 offers a choice of ways in which the apparatus 800 is used.

Since a surface of the housing 2a which is in contact with the rest surface when the multifunctional apparatus 800 is placed on the rest surface in the lying posture, namely, the rear surface of the housing 2a, is flat, the multifunctional apparatus 800 can rest stably in the lying posture.

In the multifunctional apparatus 800 according to the eighth embodiment, the connector protrusion 806 and the first or second connector recess 808, 810 are connected to each other, to mechanically and electrically connect the scanner portion 3 and the pivot support 802 of the printer portion 2 so as to enable output of the image data as read in the scanner portion 3 to the housing 2a.

However, the multifunctional apparatus 800 may be modified such that in addition to the connector protrusion 806 and the connector recesses 808, 810, a connecting mechanism for mechanically connecting the scanner portion 3 and the pivot support 802 is further provided. In this modification, the scanner portion 3 and the pivot support 802 can be more firmly connected to each other.

Alternatively, the multifunctional apparatus 800 may be modified such that a mechanical connecting mechanism for mechanically connecting the scanner portion 3 and the pivot support 802, and an electrical connecting means for outputting image data read in the scanner portion 3 to the printer portion 2 by wireless communication, are separately provided. In this modification, the scanner portion 3 can be used while separated from the printer portion 2. In other words, the multifunctional apparatus 800 can be used in a manner that the scanner portion 3 is carried to a place away from the printer portion 2 and used there. In this modification, too, the document is removed by the user and the first document ejecting roller 36 need not be driven, and accordingly it is preferable that driving of the first document ejecting roller is inhibited.

The following is a brief description of the construction of the eighth embodiment written in the form similar to the appended claims, and the effects obtained thereby.

An image processing apparatus comprising:

an image reading portion having a box-shaped housing with a reading surface, and a scanning device disposed inside the housing and displaceable along the reading surface, the image reading portion reading a first image on a document by displacing the document and the scanning device relatively to each other;

an image recording portion including:

a recording medium supply device which accommodates a recording medium;

a feeding mechanism which feeds the recording medium fed out of the recording medium supply device; and a recording device which records a second image on the recording medium fed by the feeding mechanism;

the apparatus being changeable in posture between a standing posture in which both the image reading portion and the image recording portion stand substantially upright, and a lying posture in which the image reading portion is laid down on the image recording portion as laid down;

a connecting portion where the image reading portion is separably attached to the image recording portion; and the connecting portion connects the image reading portion to the image recording portion with the image reading portion being oriented such that the reading surface is to be opposed to the image recording portion when the apparatus is in the standing posture, and such that the reading surface faces a side opposite to the image recording portion when the apparatus is in the lying posture.

The first and second images may or may not be the same.

The arrangement of the eighth embodiment as defined above in the form of a claim may be employed separately from the previously described arrangements of the first through seventh embodiments. When this arrangement is employed solely, at least the following effects can be obtained.

According to this image processing apparatus, the connecting portion connects the image reading portion to the image recording portion such that the reading surface of the image reading portion is disposed on the side to be opposed to the image recording portion while the apparatus is in the standing posture. Thus, by supplying a sheet document between the reading surface of the image reading portion and the image recording portion, an image on the sheet document can be read while the apparatus is in the standing posture.

The connecting portion connects the image reading portion to the image recording portion such that the reading surface of the image reading portion is disposed on the side opposite to the image recording portion while the apparatus is in the lying posture. Thus, the apparatus can reads an image on a book document or a sheet document while the apparatus is in the lying posture, by supplying the book document or the sheet document on the reading surface of the image reading portion of the apparatus in the lying posture. Since the lying posture of the apparatus is such that the image reading portion is laid down on the image recording portion as laid down, and thus unlike the conventional apparatus, not both the image reading portion and the image recording portion occupies an area in a rest surface on which the apparatus is placed, the image processing apparatus can read a book document or a sheet document without occupying a relatively large area in the rest surface, even in the lying posture.

There will be now described a multifunctional apparatus according to a ninth embodiment of the invention, by referring to FIGS. 14-18.

Figure 14:
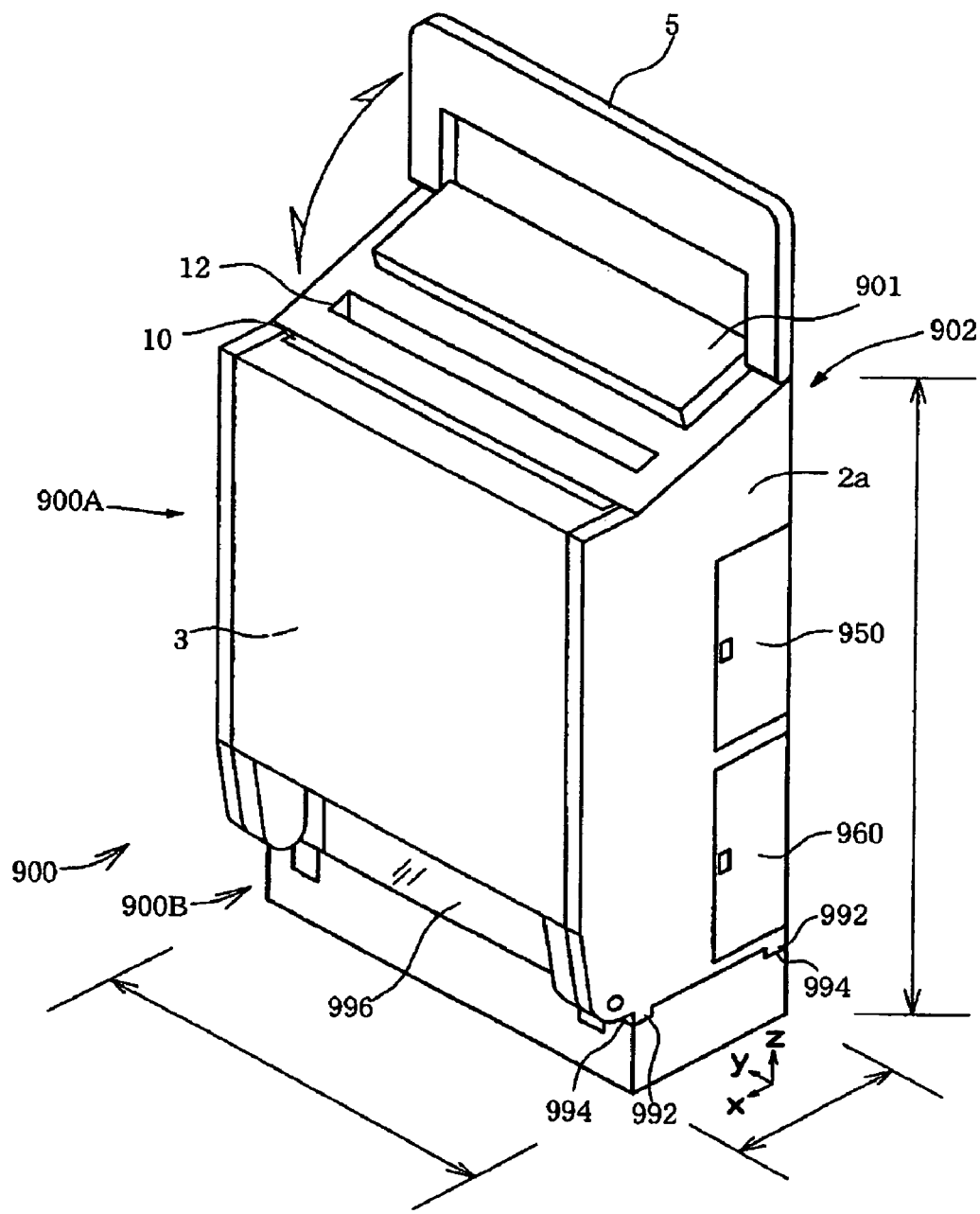
FIG. 14 is an external perspective view of a multifunctional apparatus according to a ninth embodiment.

In FIG. 14, reference numeral 900 generally denotes the multifunctional apparatus according the ninth embodiment. The multifunctional apparatus 900 is connected to a computer not shown, and records an image or a document on a recoding medium K such as a sheet of paper, mainly based on image data or document data sent from the computer, but the multifunctional apparatus 900 can be connected to a digital camera so as to record an image on a recording medium based on image data outputted from the digital camera. Further, various kinds of memory media can be loaded in the multifunctional apparatus 900, so that the multifunctional apparatus 900 can record an image or others based on image data or other data stored in the memory media. The multifunctional apparatus 900 is a MFD (Multi Function Device) which comprises a printer function and a scanner unction. The multifunctional apparatus 900 may further comprise a copy function and/or a facsimile function including communication portion, for instance. However, the operation and effects of the present embodiment can be obtained as long as the multifunctional apparatus 900 has a printer function.

As shown in FIG. 14, the multifunctional apparatus 900 has a printer portion 902 including a housing 2a having a recess 2b formed in a front side thereof, as in the first through eighth embodiments, and a scanner portion 3 accommodated in the recess 2b. The printer portion 902 has an overall width W and height H, which are set such that the multifunctional apparatus 900 can handle a recording medium of a maximum width with respect to the recording capability of the apparatus 900, e.g., a recording medium of A4 size, and that the printer portion 902 can accommodate the recording medium and the recording medium can be fed inside the printer portion 902, namely, W and H are respectively somewhat larger than the width and height of the recording medium of A4 size. An overall thickness T of the printer portion 902 is smaller than the width W and the height H, and thus the printer portion 902 and according the multifunctional apparatus 900 has a generally thin box-like shape. The multifunctional apparatus 900 is placed on a rest surface in an upright position, in which a longitudinal direction of a side face of the apparatus 900 is vertical, i.e., a Z-axis direction in FIG. 14. Accordingly, as in the first through eighth embodiments, the area occupied by the multifunctional apparatus 900 in the rest surface is relatively small.

The scanner portion 3 is similar to that in each of the above-described embodiments, and description thereof is dispensed with. However, in this embodiment there is formed a window in the printer portion 902, as described later, and accordingly the scanner portion 3 is pivotally connected to the housing 2a of the printer portion 902 at a position near the opening O' and on two opposite lateral sides of the window 996.

In the multifunctional apparatus 900 of the ninth embodiment, a feed pathway P is formed to connect a recording medium holder 913 (shown in FIG. 15) disposed in a rear portion of the apparatus 900, and a recording medium outlet 12. In an upper surface of the housing 2a, a recording medium outlet 12 is open. The recording medium holder 913 is connected to the recording medium outlet 12 through a feed pathway P, as will be described later. As a recording medium K is fed along the pathway P, an image is recorded on the recording medium by a line head 30, and then the recording medium is ejected through the recording medium outlet 12.

In the upper surface of the housing 2a and on an upper or rear side of the recording medium outlet 12, there is disposed an operator panel 901 through which the multifunctional apparatus 900 is operated by a user. The operator panel 901 comprises various manual operation buttons and a liquid crystal panel. The apparatus 900 can be operated in accordance with instructions inputted through the operator panel 901, but the apparatus 900 is connectable to a computer and can be operated also in accordance with instructions sent from the computer via a printer driver. Since the upper surface of the housing 2a is tilted upward from the front side to the back side, the operator panel 901 is also tilted in the same direction, enabling the user to see the manual operation buttons and the liquid crystal panel in the operator panel 901 from the front side as well as from the upper side. Thus, whether the multifunctional apparatus 900 is placed on a table or a floor, a high visibility and usability are ensured.

In a lateral surface of the printer portion 2, there is disposed a slot portion 950 having a plurality of slots into which various small memory cards can be loaded or inserted as recording media, and when a memory card is not inserted, the slots of the slot portion 950 are closed by an openable/closable cover, as shown in FIG. 14, so as not to introduce foreign matter such as dirt. When a small memory card is inserted in the slots of the slot portion 950, image data stored in the memory card is read out to be presented in the liquid crystal panel in the operator panel 901, and a desired image can be recorded on the recording medium by the multifunctional apparatus 900.

In the lateral surface of the printer portion 902, there is further disposed an ink cartridge holder portion 970 having a plurality of cartridge holders in which ink cartridges for cyan (C), magenta (M), yellow (Y) and black (B) inks, for instance, are accommodated. Similarly to the slot portion 950, an openable/closable cover closes the cartridge holders of the ink cartridge holder portion 960 except when a used ink cartridge is replaced with a new one, so as not to introduce foreign matter such as dirt. The relative position between the slot portion 950 and the ink cartridge holder portion 960 may be determined as desired, however, the arrangement as shown in FIG. 1 where the ink cartridge holder portion 960 is on the lower side of the slot portion 950 is preferable, since even ink leaks from the ink cartridge holder portion 960, an electronic component of the small memory card or the slot portion 950 is not contaminated by the leaking ink.

At an upper aide of the housing 2a, a lid member 5 formed in a U-like shape so as not to interfere with the operator panel 901 is disposed to be turned around an axis so as to be folded and raised above the upper surface of the housing 2a. Raised to stand upright, as shown in FIG. 14, the lid member 5 can serve as a handle held by the user to carry the multifunctional apparatus 900. When folded down on the upper surface of the housing 2a, the lid member 5 closes the recording medium outlet 12, so as to prevent introduction of foreign matter such as dust and dirt into the printer portion 902 of the apparatus 900. Although the lid member 5 may be manually turned upward and downward by the user, it may be arranged such that the lid member 5 is automatically turned upon activation of the multifunctional apparatus 900 by a driving force of a motor or others.

Figure 15:
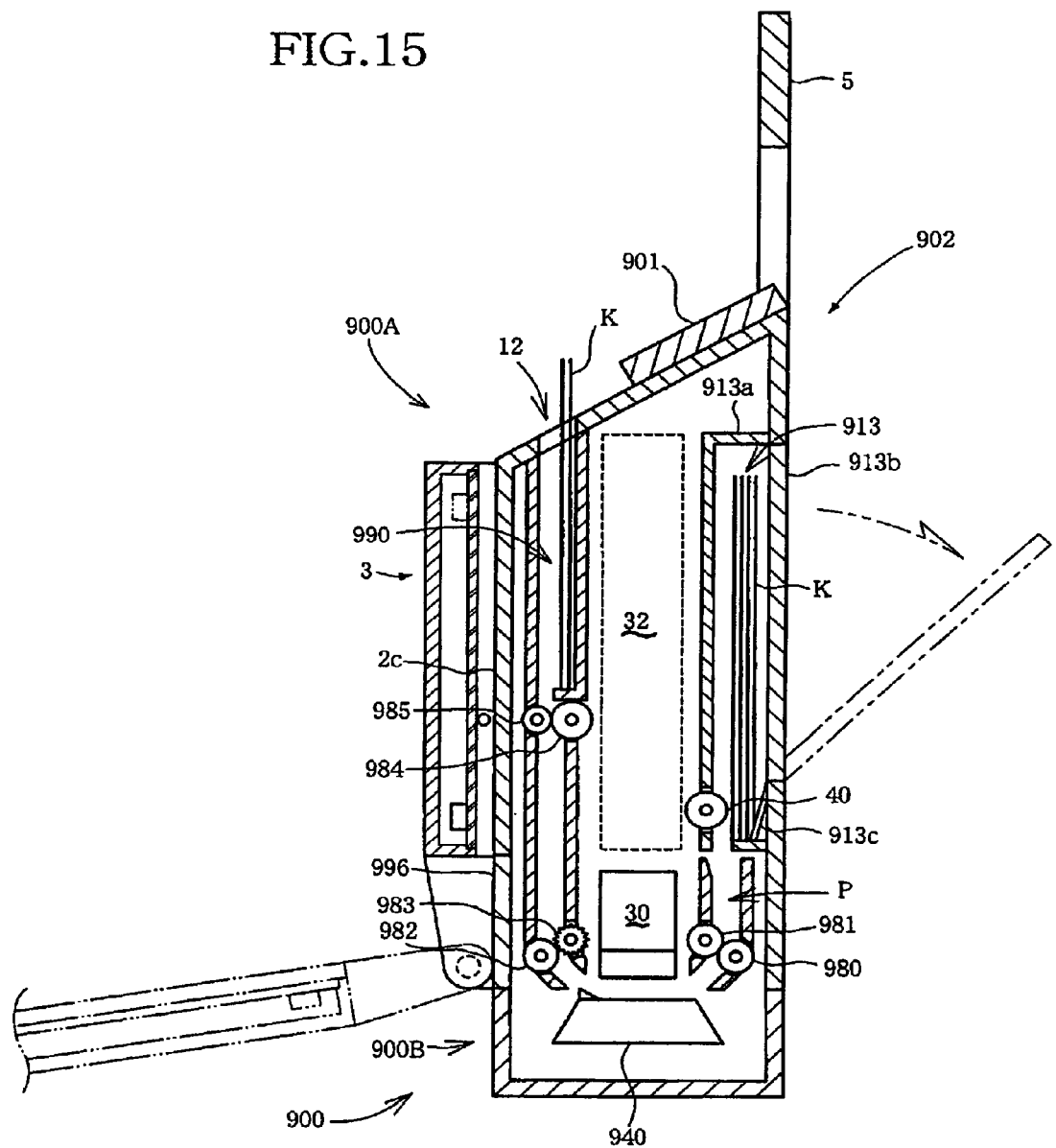
FIG. 15 is a vertical cross-sectional view of an internal structure of the multifunctional apparatus.

FIG. 15 is a view of an internal structure of the multifunctional apparatus 900. As shown in FIG. 15, the multifunctional apparatus 900 comprises the housing 2a in which are incorporated the recoding medium holder 913, the pathway P, the line head 30, a platen 940, and an arranging space 32 in which various members including electrical components are arranged.

The recording medium holder 913 accommodates a recording medium or media, which is fed into the pathway P one by one. The recording medium holder 913 can accommodate recording media of various sizes other than A4, such as B5 and postcard size. More specifically, the recording medium holder 913 occupies a space in the rear portion of the housing 2a, and comprises a partition plate 913a disposed inside the housing 2a and a cover 913b constituting a back surface of the housing 2a. As shown in FIG. 15, the cover 913b can be made inclined with respect to the back surface of the multifunctional apparatus 900, so as to open the recording medium holder 913 to set a recording medium or media K as desired. The recording media K accommodated in the recording medium holder 913 are held in a vertical or upright position as shown in FIG. 15, with a surface thereof on which an image or others is to be recorded facing the internal side.

As shown in FIG. 15, a lower portion of the recording medium holder 913 is continuous with the pathway P, and a pickup roller 40 is disposed at a lower portion of the partition plate 913a so as to pick up the recording media out of the recording medium holder 913 one bye one, and feed each recording medium into the pathway P. The pickup roller 40 is rotated by a driving force from a motor (not shown) transmitted via a transmitting mechanism (not shown) comprising a plurality of gears. In a lower portion of the recording medium holder 913 and at a position opposed to the pickup roller 40, there is disposed a guide 913c to hold a lower end of a stack of the recording media at a supply position. The guide 913c is biased toward the pickup roller 40 by a spring or others (not shown) to hold the recording media K in pressing contact with the pickup roller 40 in an upright position. Thus, by rotation of the pickup roller 40 in contact with a topmost one of the stack of the recording media K, the topmost recording medium K is picked up and fed downward into the pathway P, by a frictional force between the pickup roller 40 and the recording medium K.

The pathway P extends downward from a lower side of the recording medium holder 913, U-turns near a bottom of the housing 2a, and extends upward to the recording medium outlet 12 formed in the upper surface of the housing 2a. Hence, the recording medium K is first fed in an upright position, downward along the pathway P from the recording medium holder 913, then reversed in a U-turn manner, and again fed in an upright position upward to be ejected through the recording medium outlet 12. By feeding the recording medium K in the upright position along the pathway P in the U-like shape as seen from a lateral side of the housing 2a, the thickness of the housing 2a is reduced and the overall size of the multifunctional apparatus 900 is reduced, thereby reducing an area occupied in a rest surface by the multifunctional apparatus 900.

Most portions of the pathway P are defined between an outer guide surface and an inner guide surface which are opposed to each other with a clearance therebetween, except at a place where the line head 30 and the platen 940 are disposed. The outer guide surface and the inner guide surface may be provided by guide members fixed inside the housing 2a, or the outer guide surface may be integrally formed with the housing 2a, for instance. Although not shown in FIG. 15, at a curved portion of the pathway P and/or other portions, a feeder roller is provided as needed, so as to smoothen the feeding of the recording medium K.

As shown in FIG. 15, the line head 30 is disposed at the lowest portion of the generally U-shaped pathway P, that is, the place where the pathway P U-turns. The line head 30 is disposed on an internal side of the pathway P to reciprocate or scan in a direction of width of the pathway P, that is, a Y-axis direction as shown in FIG. 14. The line head 30 is oriented to be capable of ejecting ink droplets downward from a lower surface thereof. On the other hand, on an external side of the pathway P and under the line head 30, there is disposed the platen 940.

The line head 30 is displaced while ejecting droplets of the inks of respective colors, i.e., cyan, magenta, yellow and black, as supplied from the ink cartridges (not shown) disposed in the housing 2a through tubes or others, to record an image on the recording medium being fed over the platen 940. Although not shown in FIG. 15, on the internal side of the pathway P, the line head 30 is mounted on a carriage slidably disposed on a guide member extending in a width direction of the pathway P. With the carriage slid along the guide member by a belt drive mechanism or other mechanisms, the line head 30 is displaceable in a main scanning direction which is parallel to the width of the pathway P.

Figure 16:
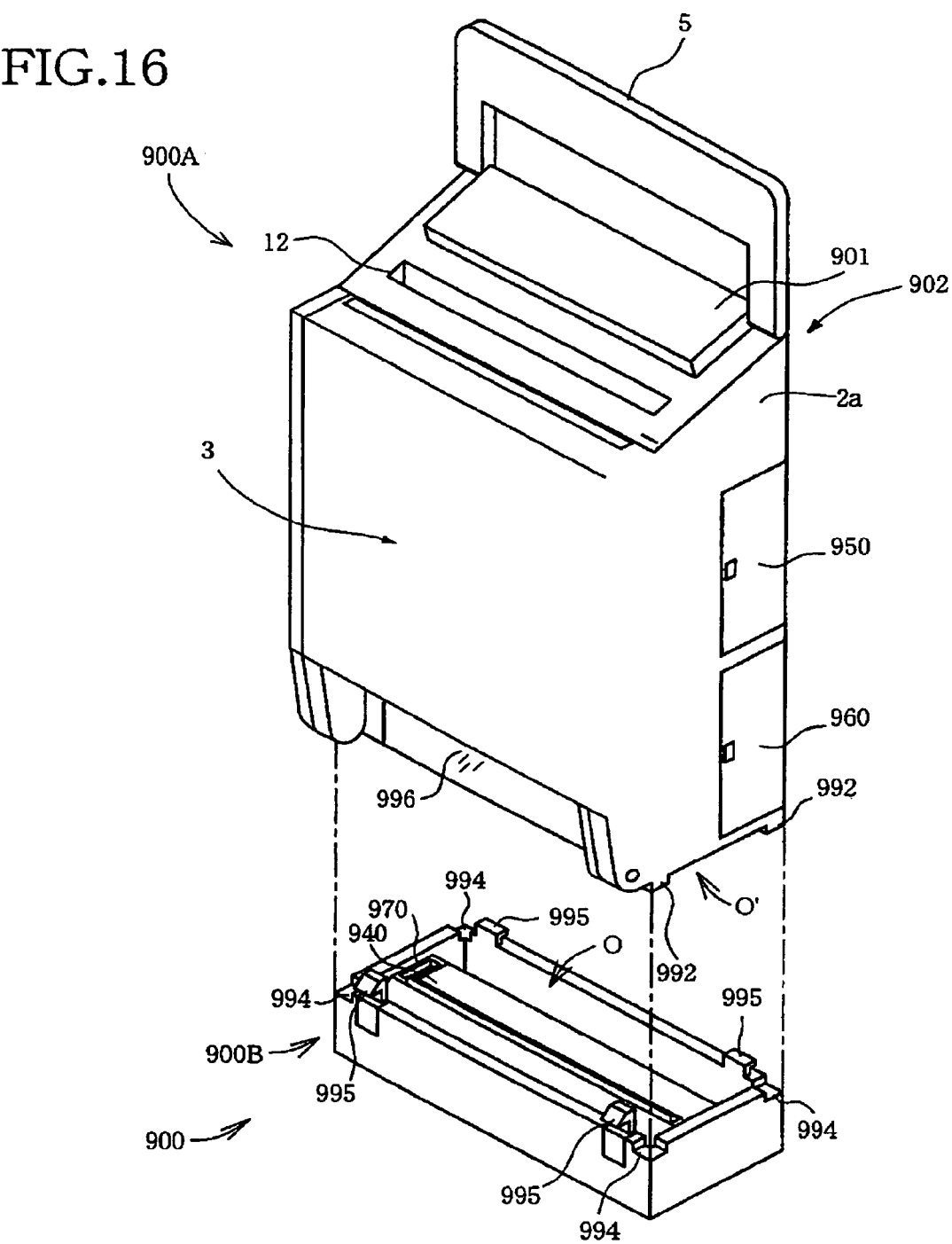
FIG. 16 is a perspective view showing a state where a platen unit and a recording unit of the multifunctional apparatus are separated from each other.

The platen 940 supports the recording medium K fed along the pathway P in a horizontal position and at a position spaced from the line head 30 by a predetermined distance, namely, a predetermined head gap is established, and has a horizontal surface for supporting the recording medium K across a range in which an image is recorded (hereinafter referred to as "the image recording range"). On a side of the platen 940 and outside the image recording range of the line head 30, there is disposed a waste ink tray 970 as shown in FIG. 16. The waste ink tray 970 is a tray open on its upper side opposed to an ink ejecting surface or a lower surface of the line head 30, and receives ink ejected from the line head 2 in a purging operation in which bad ink from which water has evaporated and having high viscosity, and foreign matter is removed from the line head 30.

On the upstream side of the line head 30 with respect to the pathway P, there is disposed a pair of rollers 980, 981 between which the recording medium K fed along the pathway P is nipped to be fed onto the platen 940. The roller 980 is a feeder roller while the roller 981 is a presser roller. On the other hand, on the downstream side of the line head 30, there is disposed another pair of rollers 982, 983 between which the recording medium K on which an image has been recorded is nipped to be further fed. The roller 982 is a feeder roller, and the roller 983 is a gear roller. The feeder rollers 980, 982 receive a driving force from a motor not shown, to intermittently feed the recording medium by a given linefeed width.

The presser roller 981 is biased to be pressed onto the feeder roller 981 by a predetermined pressing force, and is rotatable such that when the recording medium K enters the nip between the feeder roller 980 and the presser roller 981, the presser roller 981 retracts by an amount corresponding to a thickness of the recording medium K such that it is assured that the rotation of the feeder roller 980 is transmitted to the recording medium. A relationship between the gear roller 983 and the feeder roller 982 is similar to that between the presser roller 981 and the feeder roller 980, but since the gear roller is brought into pressing contact with the recording medium K on which an image has been recorded, an external surface of the gear roller is alternately dented and raised like a spur wheel in order not to lower the quality of the image on the recording medium.

Hence, the recording medium K nipped between the feeder roller 980 and the presser roller 981 is intermittently fed over the platen 940 by the predetermined linefeed width, and each time the recording medium is fed by the linefeed width, the line head 30 is scanned across the width of the recording medium. In this way, the image recording is implemented from a front side of the recording medium. The front side portion of the recording medium where the image has been recorded is then pinched between the feeder roller 982 and the gear roller 983 while a rear side portion of the recording medium is nipped between the feeder roller 980 and the presser roller 981, and the recording medium is intermittently fed by the predetermined linefeed width while the recording by the line head 30 is repeated. When the recording medium K is further fed, a rear end of the recording medium is released from the nip between feeder roller 980 and the presser roller 981, and the recording medium is further kept intermittently fed by the linefeed width while the recording is continued. After the recording across an entire predetermined recording area in the recording medium K is complete, the feeder roller 982 is continuously rotated or driven so that the recording medium K is fed upward in the upright position along the pathway P while kept pinched between the feeder roller 982 and the gear roller 983.

On the further downstream side of the pathway P, a recording-medium ejecting roller 984 and a presser roller 985 are disposed, so as to pinch therebetween the recording medium K on which the image has been recorded, in the same way as the feeder roller 980 and the presser roller 981 do, and feeds the recording medium until the front end thereof projects from the recording medium outlet 12. On the downstream side of the recording-medium ejecting roller 984 and the presser roller 985, there is disposed a catch holder 990 in which a recording medium whereon an image has been recorded is sequentially accommodated in an upright position with an end thereof protruding from the recording medium outlet 12.

The electrical components disposed in the arranging space include a CPU (Central Processing Unit) which generally controls the multifunctional apparatus 900, a ROM (Read Only Memory), a RAM (Random Access Memory), a bus, an ASIC (Application Specific Integrated Circuit), and others, which operate to control rotation of the motors in accordance with information from various sensors, and transmits/receives signals to/from the operator panel 901 and the computer.

As shown in FIG. 16, the multifunctional apparatus 900 is dividable into two units, namely, an upper unit which is a recording unit 900A including the recording medium holder 913, the pathway P with the feeder roller 980, 982, the line head 30, the arranging space 32, and the scanner portion 3, and a lower unit which is a platen unit 900B including the platen 940 and the waste ink tray 970. As described above, the pathway P extends downward from the recording medium holder 913, and the line head 30 is disposed at a position opposed to the lowest portion or U-turn portion of the pathway P such that the line head 30 ejects ink droplets downward, with the platen 940 disposed under the line head 30. Accordingly, members or elements which should be driven or should transmit/receive electrical signals, such as the line head 30 and electrical components, are all collected in the recording unit 900A, while members or elements which need not to be driven or transmit/receive electrical signals, such as the platen 940 and the waste ink tray 970, are disposed in the platen unit 900B, allowing the structure of the platen unit 900B to be relatively simple. Hence, by constituting a lowest portion of the multifunctional apparatus 900 by the platen unit 900B, provision of contacts for transfer of electrical signals or driving force to/from the platen unit 900B is made unnecessary, and the multifunctional apparatus is easily dividable into the two units 900A and 900B with a simple structure.

Since the housing 2a is box-shaped, when the two units 900A and 900B are separated from each other, an upper surface of the platen unit 900B is an opening O as shown in FIG. 16, and the platen 940 and the waste ink tray 970 disposed therein are exposed. Similarly, a lower surface of the recording unit 900A as divided is an opening O', and the line head 30 (shown in FIG. 15) is exposed through this opening O'. The line head 30 can scan or reciprocate while ejecting ink droplets to the outside through the opening O'.

At each of four places around the opening O of the platen unit 900B, there is formed a snap engaging portion 995 which is to engage a corresponding one of four receiving portions (not shown) formed around the opening O' of the recording unit 900A. By engagement of the snap engaging portions 995 with the receiving portions, the recording unit 900A and the platen unit 900B are connected to each other. The connection between the recording unit 900A and the platen unit 900B may be established by any known, desired means other than the one described above.

Four level determining legs 992 protrude downward around the opening O' of the recording unit 900A. That is, the level determining legs 992 are disposed at four corners of the opening O', as shown in FIG. 16, thereby enabling to place the recording unit 900A as separated from the platen unit 900B on a surface on which an image is to be recorded with the opening O' facing downward. The level determining legs 992 determine the position of the recording unit 900A in level or height so as to establish a predetermined head gap, i.e., a distance between the surface on which the recording unit 900A is placed and the ink ejecting surface of the line head 30.

As described above, when an image is to be recorded on the recording medium K as being fed along the pathway P, the platen 940 supports the recording medium K, thereby positioning the recording medium K relatively to the ink ejecting surface of the line head 30. That is, the position of the platen 940 determines the head gap. An upper surface of the platen 940 which supports the recording medium K and a vertical position where the recording unit 900A and the platen unit 900B are separated from each other (i.e., the level of the surface O or O') do not necessarily coincide, and thus the level determining legs 992 protruding from a plane of the opening O' as a separating surface enable the recording unit 900A as separated from the platen unit 900B to rest stably on the surface on which an image is to be recorded (hereinafter referred to as "the recording surface"), while positioning the line head 30 relatively to the recording surface, with the predetermined head gap therebetween, simply by placing of the recording unit 900A on the recording surface.

On the other hand, at four corners of the opening O of the platen unit 900B, four recesses 994 corresponding to the level determining legs 992 are respectively formed. When the recording unit 900A and the platen unit 900B are connected to each other, the level determining legs 992 are fitted in the recesses 994, with the opening O' of the recording unit 900A and the opening O of the platen unit 900B abutted, as shown in FIG. 14. By the level determining legs 992 fitted in the recesses 994, the two units 900A, 900B are positioned such that an external surface of the recording unit 900A and that of the platen unit 900B is made continuous.

In a front face of the multifunctional apparatus 900, a window 996 (as briefly mentioned on top of the description of this embodiment) is formed near the opening O'. The window extends in a lateral direction of the printer portion 902 and is made of a material having a relatively high transparency, such as acrylate resin, so that the inside of the recording unit 900A is seeable through the window 996. Since the line head 30 is disposed inside the recording unit 900A and near the opening O', and a width of the window 996 corresponds to the image recording range of the line head 30, an image recording area of the line head 30 in which image recording is performed can be seen through the window 996.

Where there is a member which intervenes between the line head 30 and the window 996 such as a guide member, it is preferable that a cutout is made in the intervening member, or the intervening member is made of a transparent member, in order to make the image recording area seeable. Further, although in the present embodiment the window 996 is constituted by a transparent member in order to prevent introduction of foreign matter such as dirt into the recording unit 900A, the window 996 may be constituted by a mesh member in place of the transparent member. Where it is ensured that foreign matter is not introduced, the window 996 may be a simple cutout or opening. The position where the window 996 is disposed is not limited to the front face of the multifunctional apparatus 900. However, to enable the user to see the entire recording area of the line head 30, the front face or a back face of the multifunctional apparatus 900 is the most preferable place to dispose the window 996. Further, in view of manipulation of the operator panel 901 by the user while checking the image recording area through the window 996, it is particularly preferable to form the window 996 in the front face.

On the window 996 and near a right hand end thereof, there is put an arrow 998 as a mark indicating a position from which recording by the line head 30 is started. The mark may not be limited to the arrow 998 put on the window 996, as long as the mark is seeable through the window 996. For instance, the mark may be put on the guide member for guiding the carriage whereon the line head 30 is mounted.

Figure 17:
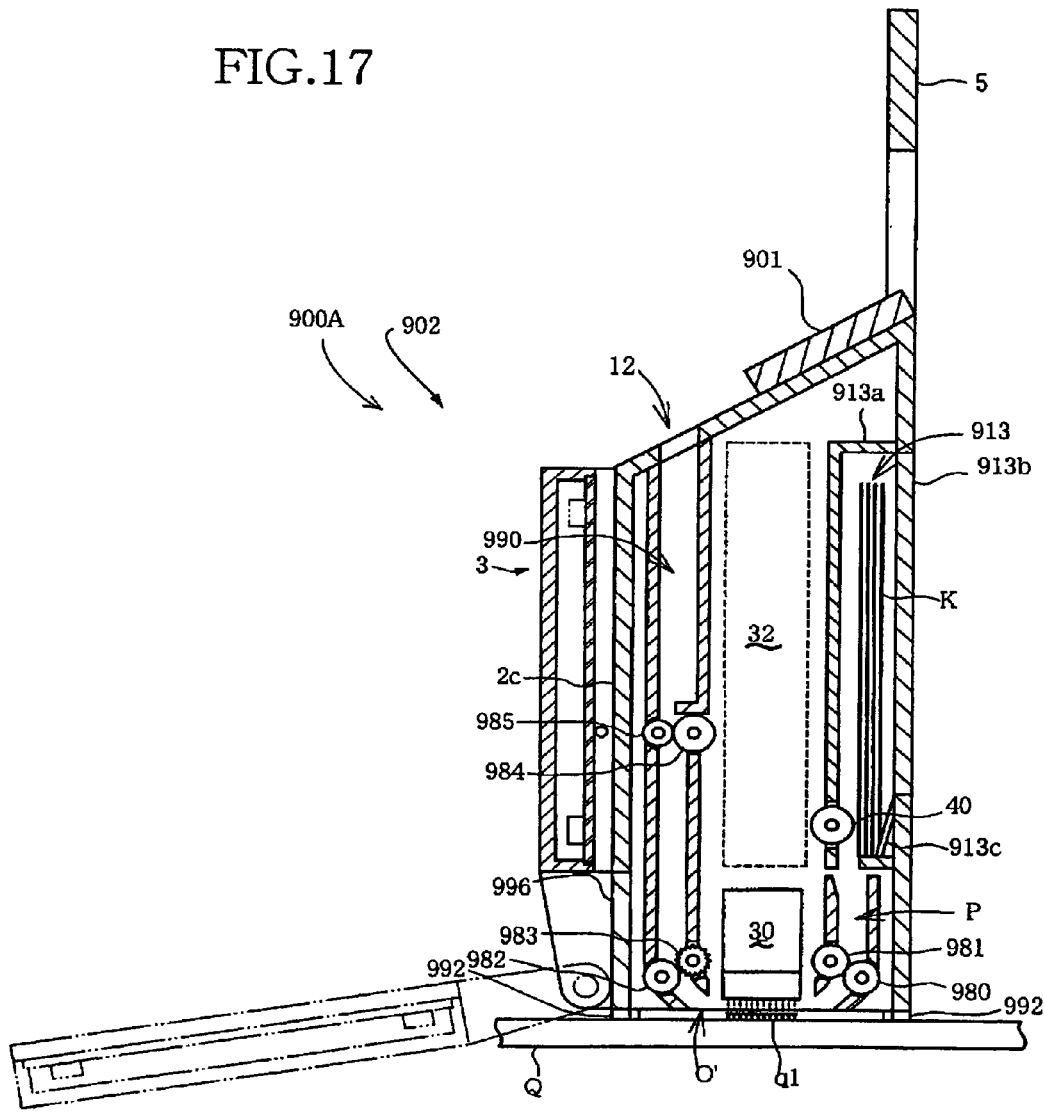
FIG. 17 is a vertical cross-sectional view showing a state where an image is being recorded by the recording unit.

FIG. 17 shows a state where the recording unit 900A as separated from the platen unit 900B is placed on a recording surface q1 of a recording medium having such a large thickness that a feeding mechanism of the printer portion 902 including the above-described rollers 980-985 can not feed the recording medium along the pathway P. Other recording media that the feeding mechanism can not feed along the pathway P are, for instance, a nonflexible recording medium, too soft a recording medium such as cloth, a booklet consisting of a plurality of paper sheets as bound, and may be any other media as long as the line head 30 can record an image thereon.

As described above, the multifunctional apparatus 900 has a thin box-like shape and can be placed in a vertical or standing posture, with the feed pathway P generally U-shaped as seen from a lateral side of the multifunctional apparatus 900, and accordingly the recording medium K is fed along the pathway P in an upright posture. Thus, in the present embodiment also, the area occupied by the multifunctional apparatus 900 in the rest surface is relatively small. Since the window 996, through which the image recording area of the line head 30 is seeable, is formed in the front face of the multifunctional apparatus 900, and the arrow 998 indicating the start position from which the line head 30 starts recording is put on the window 996, the user can easily place the recording unit 900A at a desired position in the recording surface q1, by positioning the arrow 998 at a desired position wherefrom the recording is to be started while seeing the recording surface q1 through the window 996. Further, the state where the recording unit 900A as separated from the platen unit 90013 is performing recording on the recording surface can be viewed.

The recording unit 900A placed on the recording surface q1 of the recording medium Q is supported by the level determining legs 992 protruding from the four corners of the opening O' to stably rest there, and the recording surface q1 and the ink ejecting surface of the line head 30 are positioned relatively to each other, namely, spaced from each other by the head gap, by the level determining legs 992. When an instruction to record an image is made to the recording unit 900A in this state through the operator panel 7 or the computer, the line head 30 reciprocates while ejecting ink droplets to record the desired image on the recording surface q1.

Therefore, according to the present recording apparatus 900, recording is performed with the recording unit 900A and the platen unit 900B connected to each other, in a case where a recording medium is one the apparatus 900 can feed along the pathway P, such as the recording medium K. On the other hand, recording is performed with the recording unit 900A separated from the platen unit 900B in a case where a recording medium is one which is difficult to feed along the pathway P, that is, an image is directly recorded on the recording medium Q with the line head 30 located at a desired position in the recording surface q1 of the recording medium Q.

In this way, a single multifunctional apparatus 900 can perform recording for a recording medium feedable along the pathway P, as well as for a recording medium difficult to feed along the pathway P, by allowing to directly record an image thereon. Hence, it is unnecessary to prepare a plurality of multifunctional apparatuses to select depending on the recording medium on which an image is to be recorded, or bother to change connection with an output device which outputs image data such as computer. Further, the space for placing and storing a single multifunctional apparatus is smaller than that for a plurality of the apparatuses, enabling to save space in an office or other places where the multifunctional apparatus is used. In addition, maintenance work such as replenishing ink is required only for a single multifunctional apparatus.

Figure 18:
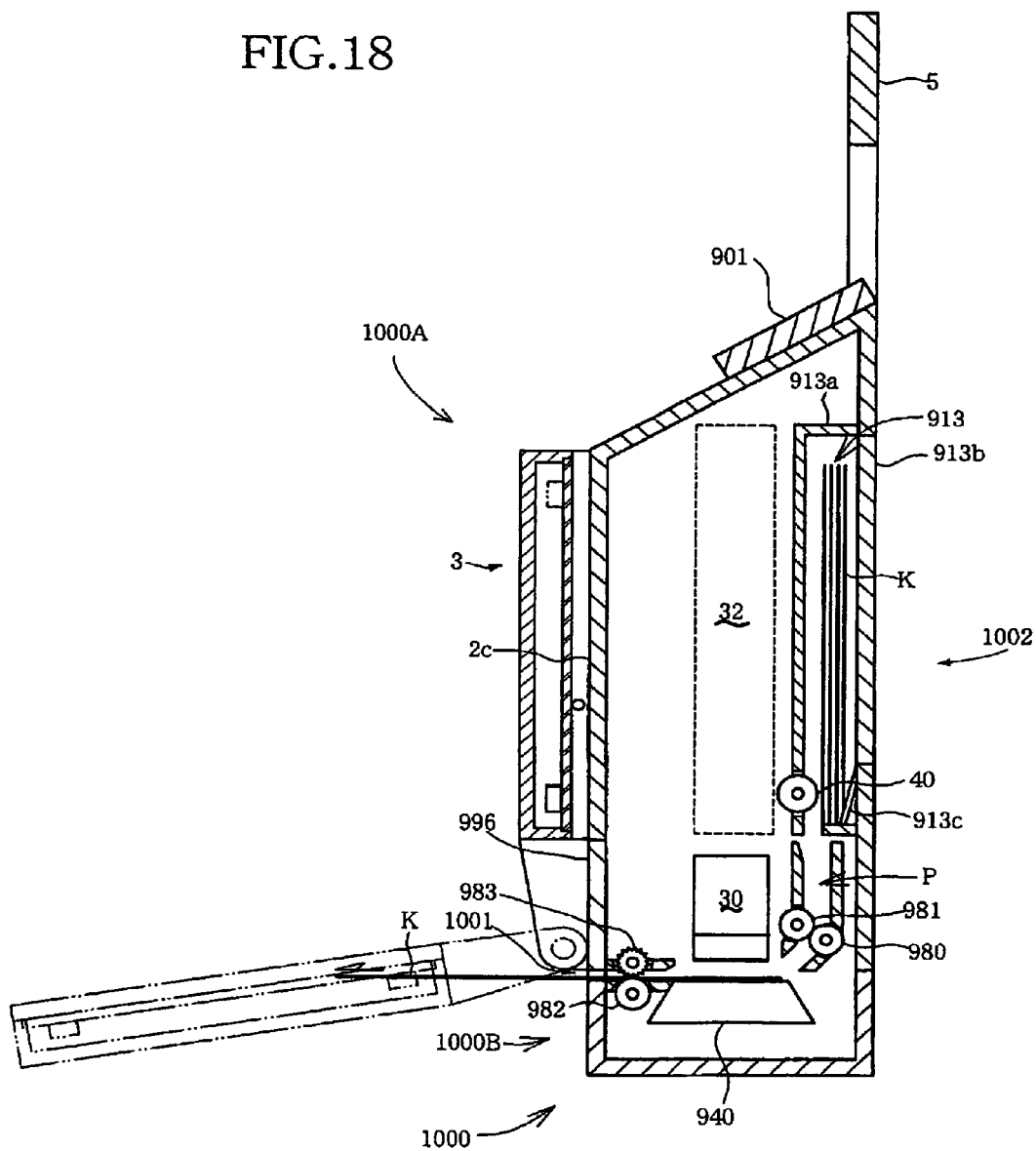
FIG. 18 is a vertical cross-sectional view of a multifunctional apparatus according to a tenth embodiment.

There will be now described a multifunctional apparatus 1000 according to a tenth embodiment, by referring to FIG. 18 in which the same reference numerals as used in the ninth embodiment denote the corresponding elements or parts. That is, the tenth embodiment is similar to the ninth embodiment with some exception. That is, in the multifunctional apparatus 900 of the ninth embodiment, the pathway P is generally U-shaped as seen from a lateral side of the housing 2a. However, in the tenth embodiment, a portion of a pathway P on the downstream side of a line head 30 does not extend upward, but extends straight sideward to make the pathway P generally L-shaped. Accordingly, a recording medium outlet 1001 is formed in a lower portion of the front face of the multifunctional apparatus 1000, in place of the recording medium outlet 12 formed in the upper surface of the housing 2a, so as to eject the recording medium K after the image recording by the line head 30 is complete.

In both of the ninth and tenth embodiments, irrespective of whether the pathway P is generally U-shaped or L-shaped, the multifunctional apparatus 900, 1000 has a thin box-like shape and can be placed in a vertical or standing posture, with the feed pathway P extends generally along the longitudinal or vertical direction of the multifunctional apparatus 900, 1000, and accordingly the recording medium K is fed in an upright posture. Hence, the thickness of the housing 2a can be made relatively small, enabling to reduce an area which the separated recording unit 900A, 1000A or the entirety of the multifunctional apparatus 900, 1000 occupies on a rest surface, and accordingly the overall size of the separated recording unit 900A, 1000A or the entirety of the multifunctional apparatus 900, 1000. Thus, moving the separated recording unit 900A, 1000A onto the recording surface and positioning the recording unit 900A, 1000A therein is relatively easy. Further, these pathway shapes enable to easily simplify the structure of the platen unit 900B, 1000B, while making separation of the platen unit 900B, 1000B from the recording unit 900A, 1000A easy, with the arrangement such that the recording medium holder 913, the line head 30, the pathway P, and the carriage, the feeder rollers, driving sources such as motors, a control portion and other members or elements which relate to driving or control of the members or elements disposed in the recording unit 900A, 1000A, are collected in the recording unit 900A, 1000A, while the platen 940 and other members not requiring driving and control are collected in the platen unit 900B, 1000B. Thus, a multifunctional apparatus with high usability is realized.

Although in the multifunctional apparatus 900, 1000 according to the ninth and tenth embodiment, the scanner portion 3 is pivotally connected to the housing 2a of the printer portion 902, 1002 at a position near the opening O' and on two opposite lateral sides of the window 996, the scanner portion 902, 1002 may be pivotally connected to the housing 2a at a position above the window.

Further, although the multifunctional apparatus 900, 1000 comprises the scanner portion 3, the technique of this embodiment is applicable to an image processing apparatus without a scanner function. When the technique of this embodiment is applied to such an image processing apparatus where the scanner function is omitted, the same effects specific to this embodiment in the invention can be obtained.

The following is a brief description of the construction common to the ninth and tenth embodiments, as written in the form similar to the appended claims, and the effects obtained thereby.

An image processing apparatus comprising:

a recording medium supply device which accommodates a recording medium;

a pathway into which the recording medium is fed from the recording medium supply device, and along which the recording medium is fed thereafter;

an inkjet recording head which scans in a main scanning direction while ejecting ink droplets onto the recording medium as fed along the pathway so as record an image on the recording medium, the main scanning direction being perpendicular to a direction of the pathway;

a platen which is disposed to be opposed to the inkjet recording head to support the recording medium from the under side;

the apparatus being separable into a recording unit including at least the inkjet recording head and a platen unit including at least the platen; and the inkjet recording head capable of scanning while ejecting ink droplets to the outside of the recording unit while the recording unit is separated from the platen unit.

According to this image processing apparatus, image recording is performed while the recording unit and the platen unit are connected to each other, in a case where a recording medium whereon an image is to be recorded is one which the apparatus can feed along the pathway, such as paper sheet of standard size. On the other hand, where image recording is performed for a recording medium which is difficult to feed along the pathway, such as booklet and cloth, the recording unit is separated from the platen unit so that the recording head can eject ink droplets on a recording surface of the recording medium, and the image is directly recorded on the recording medium.

Since the present image processing apparatus is separable into the recording unit including the inkjet recording head, and the platen unit including the platen, recording of an image is enabled not only on a recording medium feedable along the pathway, but also on a recording medium difficult to feed along the pathway, by separating the recording unit from the platen unit and directly recording the image on the recording medium difficult to feed. This makes it unnecessary to prepare a plurality of apparatuses for recording on respective kinds of recording media, and accordingly to disconnect one apparatus and re-connect another apparatus from and to a data outputting device such as computer from which image data is received. Further, a space for setting and storing the apparatus is reduced, thereby saving space in an office or other places where the apparatus is used, and maintenance work such as ink replenishment is required only for a single apparatus. In particular, by arranging the inkjet recording head, the recording medium supply device, the pathway and others in the recording unit in a concentrated manner, and arranging only the platen and other elements not requiring driving and control in the platen unit to make the structure of the platen unit relatively simple, it is made easy to separate or attach the platen unit from and to the recording unit, and to move and position the recording unit as separated from the platen unit on a recording surface. Thus, the image processing apparatus has a high usability.

There will be now described a multifunctional apparatus according to an eleventh embodiment of the invention, by referring to FIGS. 19-23. In the following description, like reference numerals denote like elements or parts which have been described above, and which are not repeatedly described here.

Figure 19:
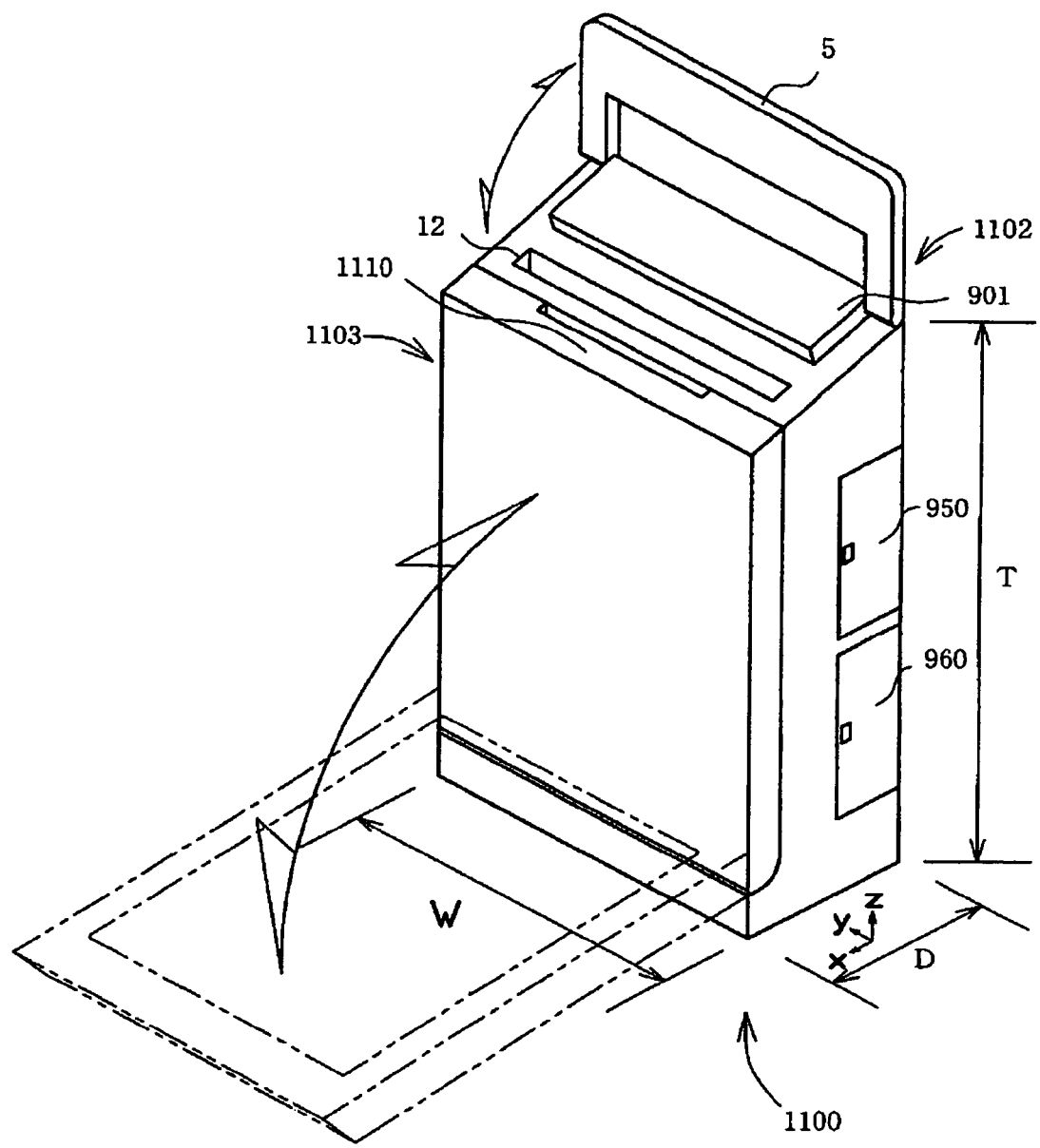
FIG. 19 is an external perspective view of a multifunctional apparatus according to an eleventh embodiment of the invention.

In FIG. 19, reference numeral 1100 generally denotes the multifunctional apparatus, which is a MFD (Multi Function Device) integrally including a scanner portion 1103 on its front side, and a printer portion 2 on its rear side, and accordingly having a scanner function as well as a printer function. The multifunctional apparatus 1100 may further comprise a facsimile function and/or other functions. The multifunctional apparatus 1100 is connected to a computer not shown, and records an image or a document on a recoding medium K such as a sheet of paper, mainly based on image data or document data sent from a computer. The scanner portion 1103 reads an image of various documents and converts the image into image data which is outputted to the computer or other devices. However, the multifunctional apparatus 1100 can be connected to a digital camera so as to record an image on a recording medium based on image data outputted from the digital camera. Further, various kinds of memory media can be loaded in the multifunctional apparatus 1100, so that the multifunctional apparatus 1100 can record an image or others based on image data or other data stored in the memory media.

A general structure of a printer portion 1102 is the same as that of the multifunctional apparatus 900 according to the ninth embodiment, except that the window 998 is not formed and the apparatus is not vertically separable into two portions. Therefore, the same part of this embodiment as the ninth embodiment described above by referring to FIG. 14 (corresponding to the description of paragraphs [0130] to [0135]) is not repeatedly described here.

Figure 20:
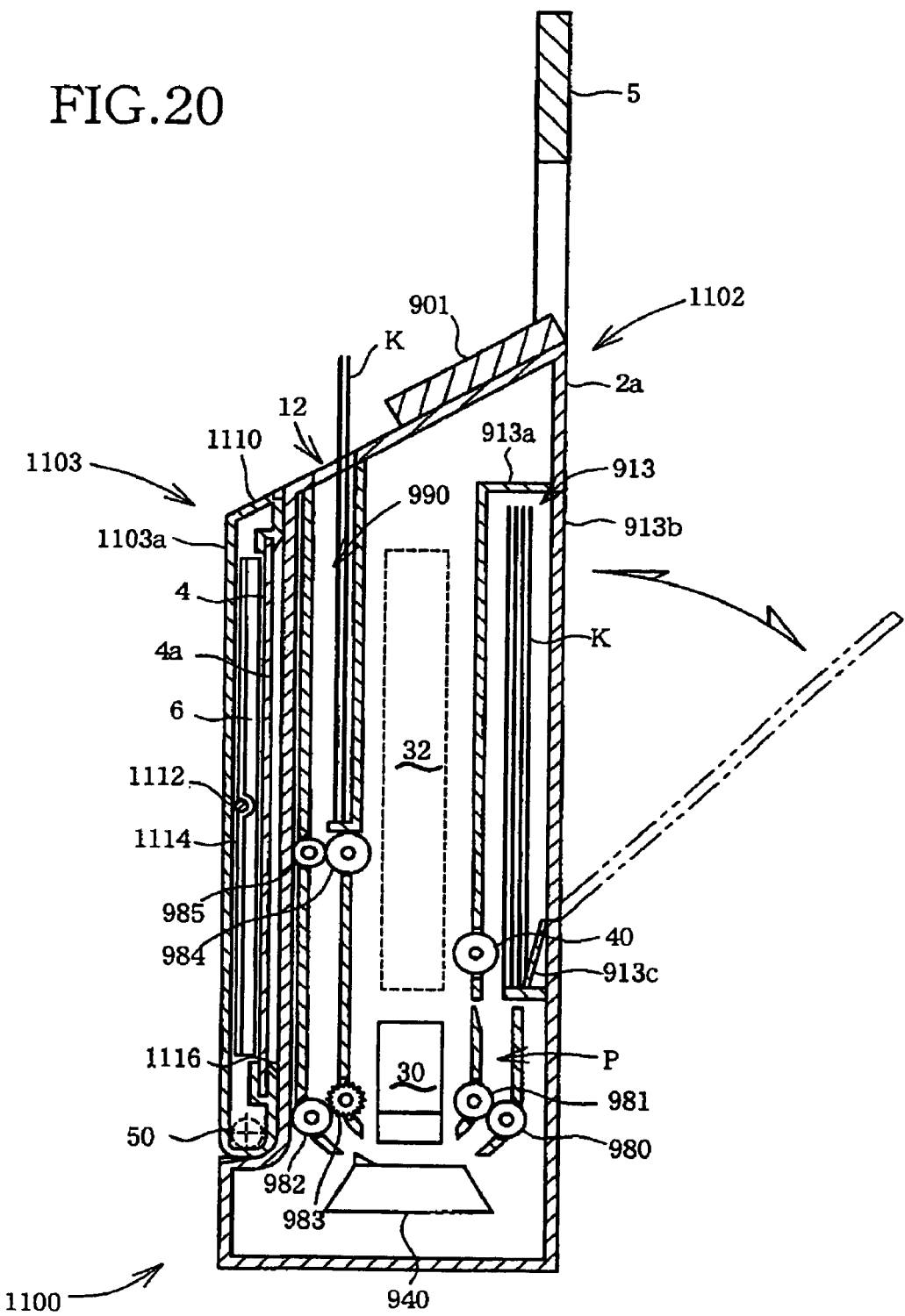
FIG. 20 is a vertical cross-sectional view of an internal structure of the multifunctional apparatus.

The scanner portion 1103 is constituted by a flat bed scanner. As shown in FIG. 20, a housing 1103a of the scanner portion 1103 also has a width and height that are set in view of a maximum size of a document, e.g., A4 size, in terms of the reading capability of the multifunctional apparatus 1100, and thus the housing 1103a of the scanner portion 1103 is slightly larger than A4 size document in width and height. A thickness of the housing 1103a of the scanner portion 1103 is smaller than the width and height of itself, making the shape of the housing 1103a of the scanner portion 1103 thin box-like as a whole. A reading surface 4a of the scanner portion 1103 is a surface of the housing 1103a of the scanner portion 1103, which is opposed to an external front surface of the housing 2a. A lower end portion of the housing 1103a is pivotally connected to the housing 2a of the printer portion 1102, so that an upper portion of the housing 1103a is turned downward or frontward and upward to open/close the scanner portion 1103 relatively to the printer portion 1102.

When not in use, the multifunctional apparatus 1100 is placed in an upright or standing posture, with an overall profile of the apparatus 1103 being thin and box-shaped such that the thickness direction of the housing 1103a of the scanner portion 1103 and that of the housing 2a of the printer portion 1102 are coincident, as indicated by solid line in FIG. 19. That is, the multifunctional apparatus 1100 is of upright standing type as a whole. Although only briefly described here, when the scanner portion 1103 is used, a user grasps an upper end portion or a grip portion 1110 and brings down the scanner portion 1103 frontward and to a horizontal position, and then puts a desired document on a glass plate 4 of the scanner portion 1103 providing the reading surface 4a so as to have an image scanner (hereinafter referred to as "the reading device 6") constituting a reading device read an image on the document.

FIG. 20 shows an internal structure of the multifunctional apparatus 1100. As shown in FIG. 20, the housing 2a of the printer portion 1102 incorporates a recording medium holder 913, a pathway P, a line head 30, a platen 940, an arranging space 32, a catch holder 990, and others.

The description with respect to FIG. 15 showing the internal structure of the printer portion 902 of the ninth embodiment applies to description with respect to FIG. 20 showing an internal structure of the printer portion 1102 of the present embodiment, and thus only different parts therebetween will be described. That is, in the arranging space 32 of the this embodiment, the CPU, ROM, RAM, bus, ASIC and other electrical components are for controlling the scanner portion 1103 as well as the members in the housing 2a.

The housing 1103a of the scanner portion 1103 comprises the reading device 6, a guide shaft 1112, and a carriage 1114 for displacing the reading device 6, as shown in FIG. 20.

The glass plate 4 is a transparent member with which the document the image on which is to be read is held in close contact, and has a size slightly larger than a document of A4 size as a document having a maximum size which the scanner portion 1103 can read. As described above, the housing 1103a of the scanner portion 1103 having a generally thin box-like shape is also larger than A4 size, and the glass plate 4 is disposed on a side of the scanner portion 1103 opposed to the external surface of the housing 2a of the printer portion 1102. The glass plate 4 provides the reading surface 4a and at the same time constitutes a part of an external surface the housing 1103a of the scanner portion 1103.

In the housing 1103a, there is disposed the reading device 6 opposed to the glass plate 4. The reading device 6 is constituted by a CIS (Contact Image Sensor) elongate in a direction parallel to a surface of the glass plate 4, namely, the Z-axis direction in FIG. 19, and displaceable in a direction of a width of the glass plate 4, namely, the Y-axis direction in FIG. 19. More specifically, the carriage 1114 is coupled with the guide shaft 1112 extending in the width direction in the scanner portion 1103 such that the carriage 1114 is slidable in an axial direction of the guide shaft 1112, and the reading device 6 is mounted on the carriage 1114. The carriage 1114 is slid along the guide shaft 1112 by a belt drive mechanism or others, thereby displacing the reading device 6 in the width direction of the glass plate 4.

At each of two opposite end portions of a lower end of the housing 1103a of the scanner portion 1103, there is disposed a shaft 50 having an axis parallel to the width direction of the scanner portion 1103. The shafts 50 are supported by respective bearing portions (not shown) formed in the housing 2a of the printer portion 1102, 80 that the scanner portion 1103 is openable/closable by being turned around the shafts 50 frontward and upward.

It is noted that the above description on the structures of the printer portion 1102 and the scanner portion 1103 are provided only by way of example. The printer portion 1102 may not be of inkjet printer type, but may be of laser printer type. The reading device 6 of the scanner portion 1103 may be constituted by a miniaturized optical system using a CCD (Charge Coupled Device), in place of the CIS. In general, however, an inkjet printer can be easily reduced in size and weight, and the focal depth of a CIS is smaller than that of a CCD. Thus, to reduce the thickness of the scanner portion 1103 and accordingly the overall size and thickness of the multifunctional apparatus 1100, an inkjet printer portion and a CIS are preferably employed.

There will be now described how an image is read by the scanner portion 1103 in the multifunctional apparatus 1100.

Figure 23:
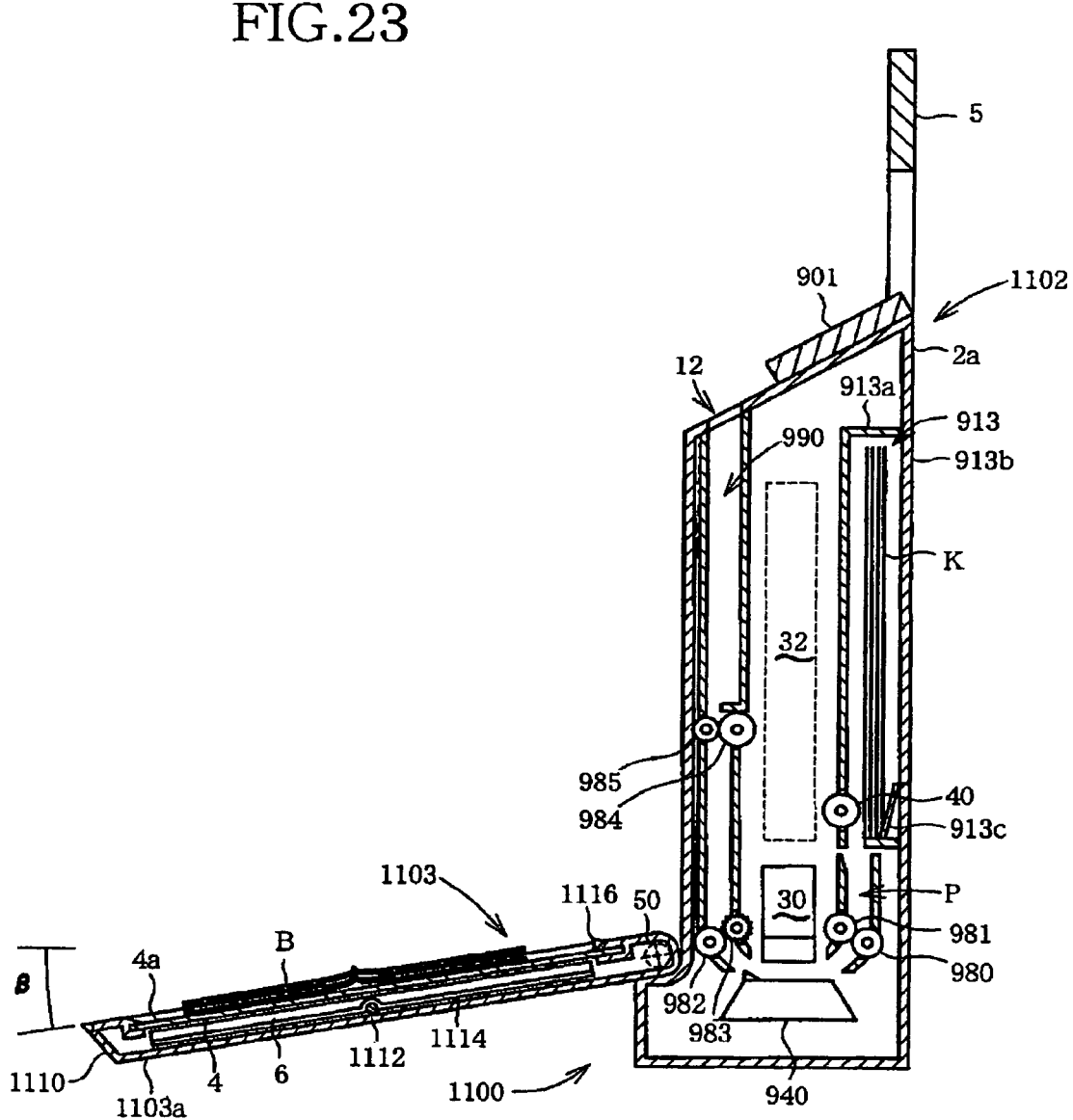
FIG. 23 is a cross-sectional view of the apparatus in a state where the scanner portion is opened.

As shown in FIGS. 19-21 and 23, the scanner portion 1103 is displaceable or openable/closable to be placed in one of a closed position (shown in FIG. 20), an inclined position (shown in FIG. 21), and a fully open position (shown in FIG. 23). The closed position and the inclined position correspond to the "upright position". That is, the closed position corresponds to the "exactly upright" position, while the inclined position corresponds to the "substantially upright" position. When the scanner portion 1103 is in the closed position, the reading surface 4a as a surface of the glass plate 4 is fixed in position adjacent the external front surface of the housing 2a of the printer portion 1102. When the scanner portion 1103 is in the inclined position, the reading surface 4a is inclined in a direction to open at a first predetermined angle with respect to the vertically extending external front surface of the housing 2a. When the scanner portion 1103 is in the fully open position, the reading surface 4a is inclined downward at a second predetermined angle with respect to a horizontal surface with which the reading surface 4a aligns when the scanner portion 1103 is just horizontal. That is, the fully open position corresponds to the "substantially horizontal" position.

When the scanner portion 1103 is not used, namely, when the multifunctional apparatus 1100 is not used or when only the printer portion 1102 is used, the scanner portion 1103 is placed in the closed position, as shown in FIG. 20, thereby reducing the space occupied by the standing multifunctional apparatus 1100 in the thickness direction thereof. Thus, a space in an office or other places where the multifunctional apparatus 1100 is used is saved. Since the reading surface 4a of the glass plate 4 is closed by the external surface of housing 2a, it is prevented that dust or dirt adheres to the reading surface 4a.

On the other hand, when the scanner portion 1103 is used, the scanner portion 1103 is opened by being turned frontward. Since the scanner portion 1103 is disposed on the front side of the printer portion 1102, the space for opening and closing the scanner portion 1103 is required only on the front side of the printer portion 1102, that is, the font side of the multifunctional apparatus 1100. Hence, it is not necessary to secure a space on the rear side of the multifunctional apparatus 1100, thereby facilitating placing the multifunctional apparatus 1100 at the side of a wall or the like. Further, according to this embodiment, all the operations related to the multifunctional apparatus can be made by the user from the front side thereof, enhancing the usability of the apparatus.

When used, the scanner portion 1103 is opened to either the inclined position or the fully open position, depending on the thickness of a document an image whereon is to be read, and/or other conditions. That is, whether the scanner portion 1103 is placed in the inclined position or the fully open position may be determined depending on the thickness of the document. For instance, when a relatively thin document in the form of a single standard paper sheet is to be read, the scanner portion 1103 is placed in the inclined position, and when a relatively thick or heavy document such as book or booklet is to be read, the scanner portion 1103 is placed in the fully open position. The multifunctional apparatus 1100 may be adapted such that an image on a document Q is readable by the scanner portion 1103 in the closed position, after that document Q is placed on the reading surface 4a of the scanner portion 1103 while the scanner portion 1103 is in the inclined position.

Figure 21:
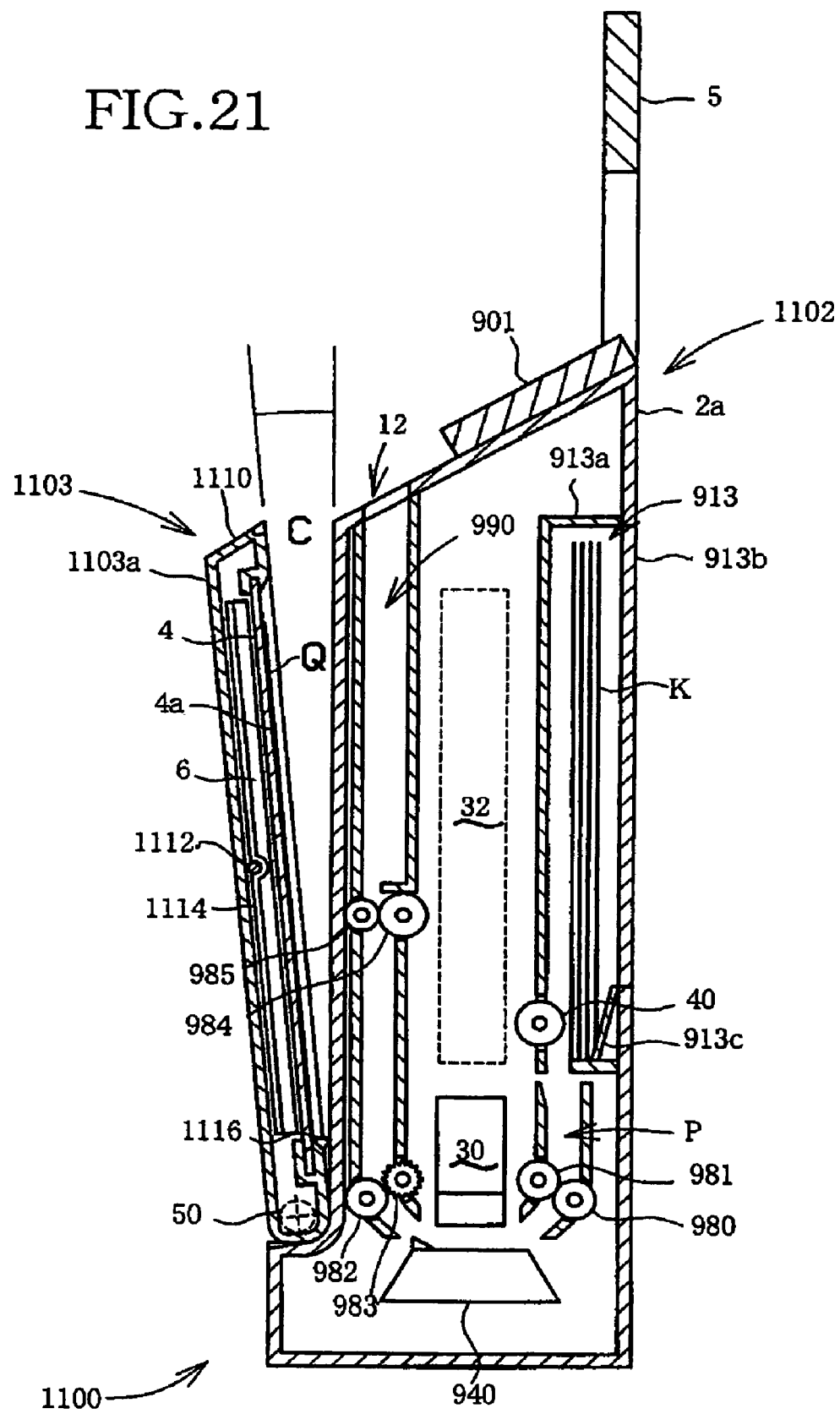
FIG. 21 is a vertical cross-sectional view of the multifunctional apparatus in a state where a scanner portion of the apparatus is inclined.

FIG. 21 shows the inclined position of the scanner portion 1103. The user holds the grip portion 1110 of the housing 1103a of the scanner portion 1103 in the closed position as shown in FIG. 20, and opens the scanner portion 1103 frontward, so that the scanner portion 1103 is provisionally fixed at an angle α to hold the scanner portion 1103 inclined. The provisional fixing in position of the scanner portion 1103 is realized, for instance, by providing each shaft 50 with a pin biased to radially protrude, and forming in the printer portion 1102 two receiving portions each to engage with the pin at the angle α. However, any other known and desired provisional fixing mechanism may be employed.

Thus, there is formed a clearance C between the housing 1103a of the scanner portion 1103 and the external surface of the housing 2a of the printer portion 1102, at an upper side thereof. The user can insert the document Q into the clearance from the upper side of the multifunctional apparatus 1100 so as to place the document Q on the inclined reading surface 4a. The reading surface 4a is inclined frontward, namely, toward the side to open the scanner portion 1103, and the user puts a lower end of the document Q into the clearance C from the front side of the multifunctional apparatus 1100, such that the document Q slips obliquely downward in the clearance C. Then, the document Q is brought into close contact with the reading surface 4a by its own weight.

Figure 22:
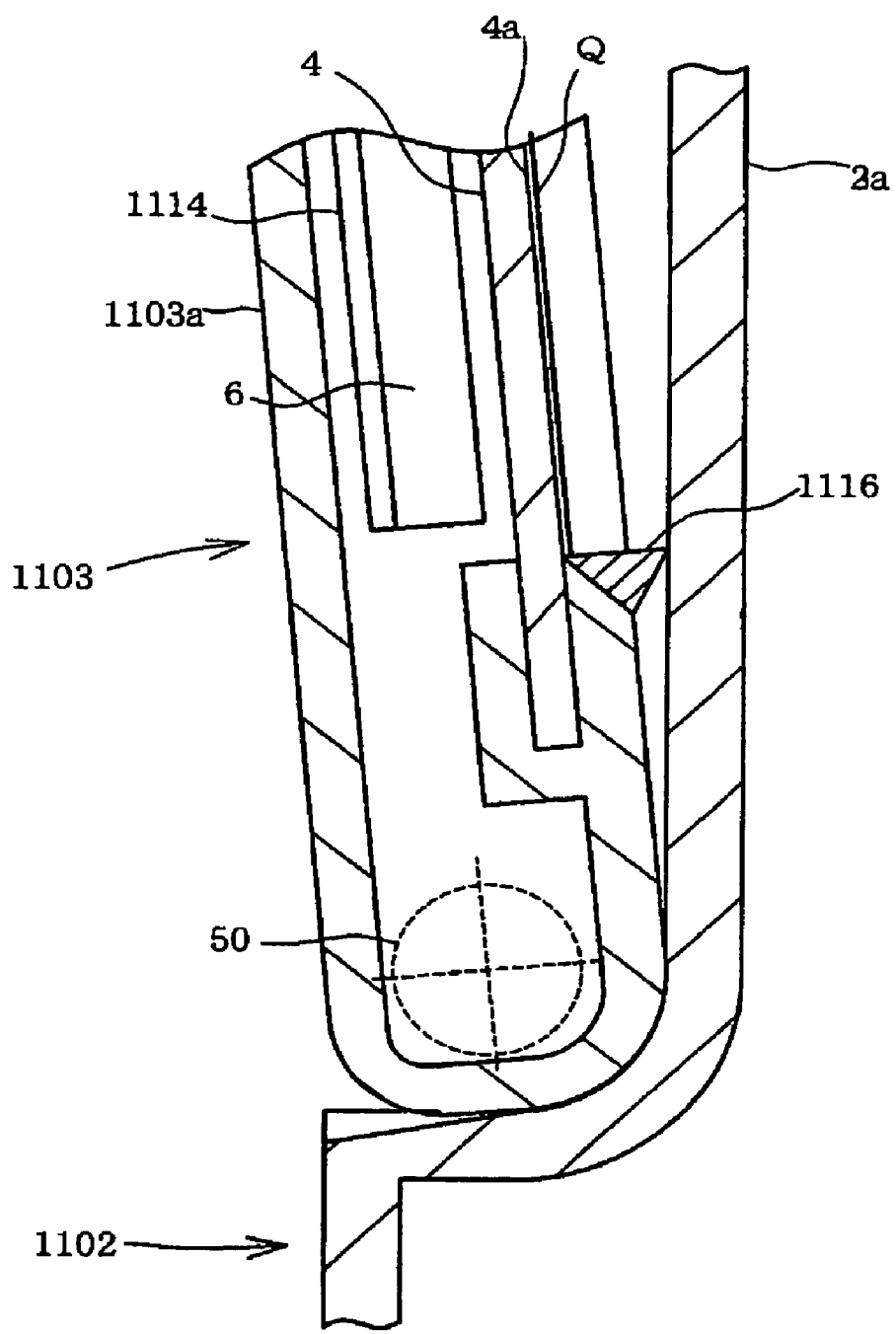
FIG. 22 is an enlarged cross-sectional view of a stopper and the vicinity thereof.

As shown in FIG. 22, at a lower end of the reading surface 4a, there is disposed a stopper 1116 extending across the width of the scanner portion 1103. The stopper 1116 is an elastic member protruding from a lower end of the reading surface 4a toward the external surface of the housing 2a. An upper surface of the stopper 1116 constitutes an engaging surface extending across a width of the reading surface 4a. The stopper 1116 is in contact with the external surface of the housing 2a and thereby being deformed or compressed while the scanner portion 1103 is in the closed position. When the scanner portion 1103 is opened, the stopper 1116 is elastically decompressed or restores to an original shape thereof, so as to close the clearance C between the lower end of the reading surface 4a and the external surface of the housing 2a while the scanner portion 1103 is in the inclined position.

As described above, the document Q inserted into the clearance C slips down along the reading surface 4a by its own weight, and stops by contact of the lower end of the document Q with the stopper 1116, as shown in FIG. 22. In this state, the document Q is held at a predetermined position on and relatively to the reading surface 4a. In this way, the document Q is held at the predetermined position with the lower end of the reading surface 4a being a reference position, and accordingly it is not required to position the document Q in the clearance C between the housing 1103a of the scanner portion 1103 and the housing 2a of the printer portion 1102 by the user peering down inside the clearance C. Thus, the document Q can be easily and simply positioned, enhancing the usability of the apparatus 1100. Further, since the document Q is brought into close contact with the reading surface 4a by its own weight, a clearance does not tend to be formed between the reading surface 4a and the document Q. This improves the accuracy in reading an image on the document Q by the reading device 6.

In the inclined position as described above, the scanner portion 1103 performs reading of the document Q by the reading device 6 scanning.

The angle α at which the reading surface 4a is inclined frontward with respect to the vertical, external front surface of the housing 2a while the scanner portion 1103 is in the inclined position, is suitably determined taking account of the width or the opening dimension of the clearance C in which the document Q is inserted, as well as the stability of the standing multifunctional apparatus 1100, for instance. Preferably, the angle α is about 2-10°.

FIG. 23 shows the fully open position of the scanner portion 1103. The user holds the grip portion 1110 of the scanner portion 1103 in the closed position shown in FIG. 20 or in the inclined position shown in FIG. 21, and turns down and frontward the scanner portion 1103 to the maximum, placing the scanner portion 1103 in the fully open position where the reading surface 4a is inclined downward by an angle β from the horizontal surface with which the reading surface 4a aligns when the scanner portion 1103 is just horizontal. In the fully open position, an upper end of the scanner portion 1103 is in contact with a rest surface which may be a floor. Hence, a provisional fixing mechanism, such as the one required to hold the scanner portion 1103 in the inclined position, is not required for holding the scanner portion 1103 in the fully open position.

With the scanner portion 1103 in the fully open position, a relatively thick document R is put on the reading surface 4a. Although the relatively thick document R has a considerable weight, the printer portion 1102 standing substantially upright is stable even when the document R is put on the reading surface 4a since the upper end of the scanner portion 1103 is in contact with the rest surface. With the scanner portion 1103 in the fully open position, the reading surface 4a is inclined to face obliquely frontward, and it is easy to put the document R at a predetermined position on the reading surface 4a from the front side of the multifunctional apparatus 1100. In this fully open position, the scanner portion 1103 reads an image on the document R by the reading device 6 scanning.

The angle β at which the reading surface 4a is inclined downward with respect to the horizontal surface while the scanner portion 1103 is in the fully open position, is suitably determined taking account of easiness in placing the document R on the reading surface 4a from the front side of the multifunctional apparatus 1100, stability of the multifunctional apparatus 1100 when the scanner portion 1103 is in the fully open position, and the position of the shafts 50 of the scanner portion 1103, for instance. Although not shown, there may be provided a cover in the form of a film for shielding light from the outside so as to prevent the light from being incident on the reading surface 4a on which a document of any of various kinds is placed, while the scanner portion 1103 is in either of the fully open position or the inclined position.

As described above, since the scanner portion 1103 of the multifunctional apparatus 1100 can be placed in the closed, inclined and fully open positions, foreign matter such as dust and dirt is prevented from adhering to the reading surface 4a while the scanner portion 1103 is not in use, thereby enabling to reduce the space occupied by the multifunctional apparatus 1100. On the other hand, when the scanner portion 1103 is used, the scanner portion 1103 is placed in a desired one of the inclined and fully open positions depending on the thickness of the document to be read or other conditions while the printer portion 1102 is kept substantially upright, with the space occupied by the multifunctional apparatus 1100 relatively small, thereby enhancing the usability of the apparatus 1100.

There will be described a multifunctional apparatus according to a twelfth embodiment of the invention, by referring to FIG. 24. In the following description related to the twelfth embodiment of the invention, reference numerals used in the eleventh embodiment are used to denote the corresponding parts or elements, and detailed description thereof is omitted.

Figure 24:
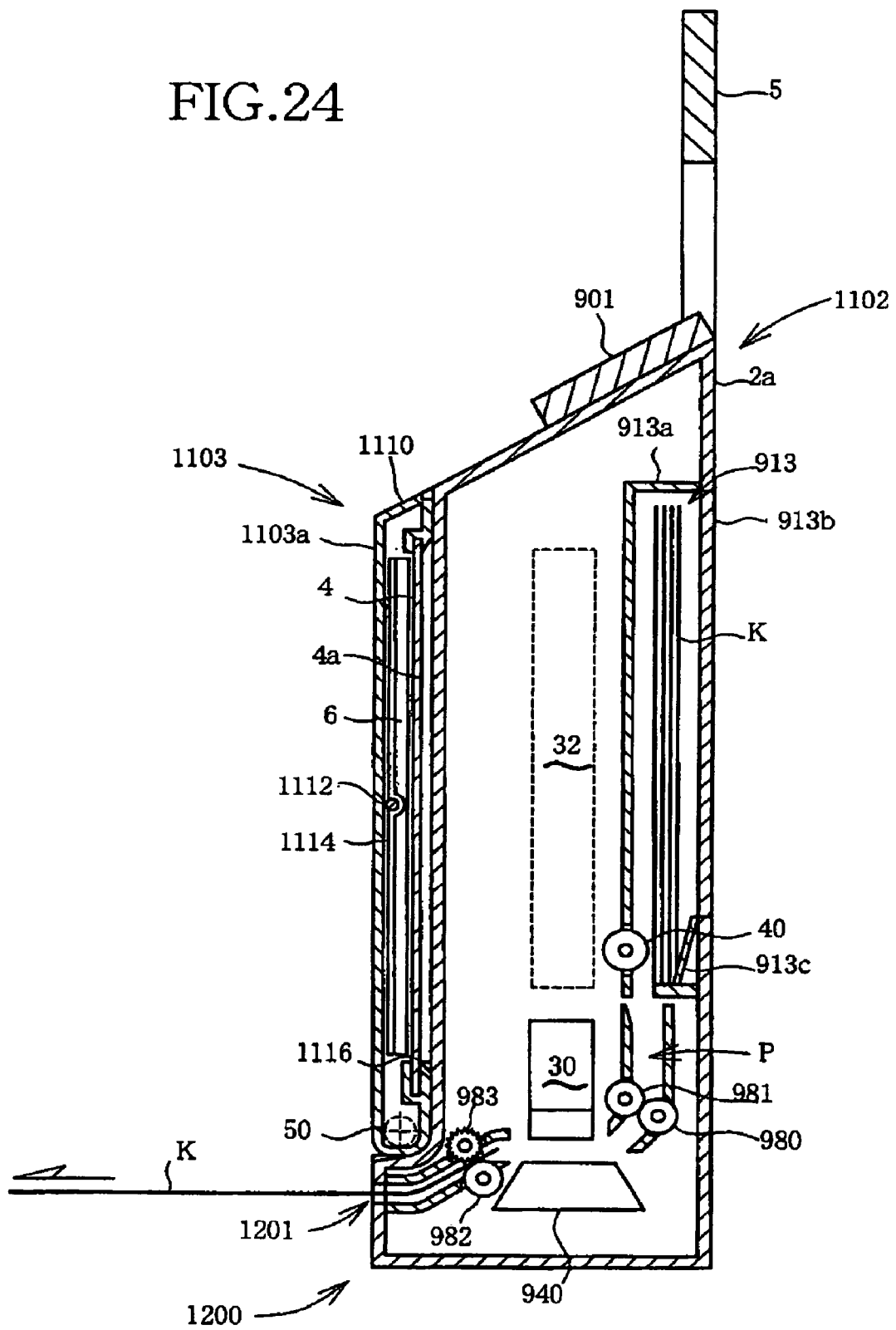
FIG. 24 is a cross-sectional view of a multifunctional apparatus according to a twelfth embodiment of the invention.

In FIG. 24, reference numeral 1200 generally denotes the multifunctional apparatus of the twelfth embodiment in which the shape of the feed pathway P is different from that of the eleventh embodiment. That is, the multifunctional apparatus 1200 has a pathway P which is not generally U-shaped as seen from a lateral side of the housing 2a, but a portion of the pathway P on the downstream side of a line head 30 extends substantially sideward and under the scanner portion 1103. In other words, the pathway P is generally L-shaped. In this embodiment, a recording medium outlet 1201 is formed in a lower portion of a front face of a housing 2a, in place of the recording medium outlet 12 formed in the upper surface of the housing 2a in the eleventh embodiment, so that the recording medium K on which an image has been recorded is ejected to the front side of the apparatus 1200.

With the generally L-shaped pathway P, the multifunctional apparatus 1200 is of the type standing substantially upright with the thin box-shaped printer portion 1102 standing substantially upright, like the eleventh embodiment, and the space occupied by the housing 2 of the printer portion 1102 is relatively small since the thickness of the housing 2a is relatively small.

Figure 25:
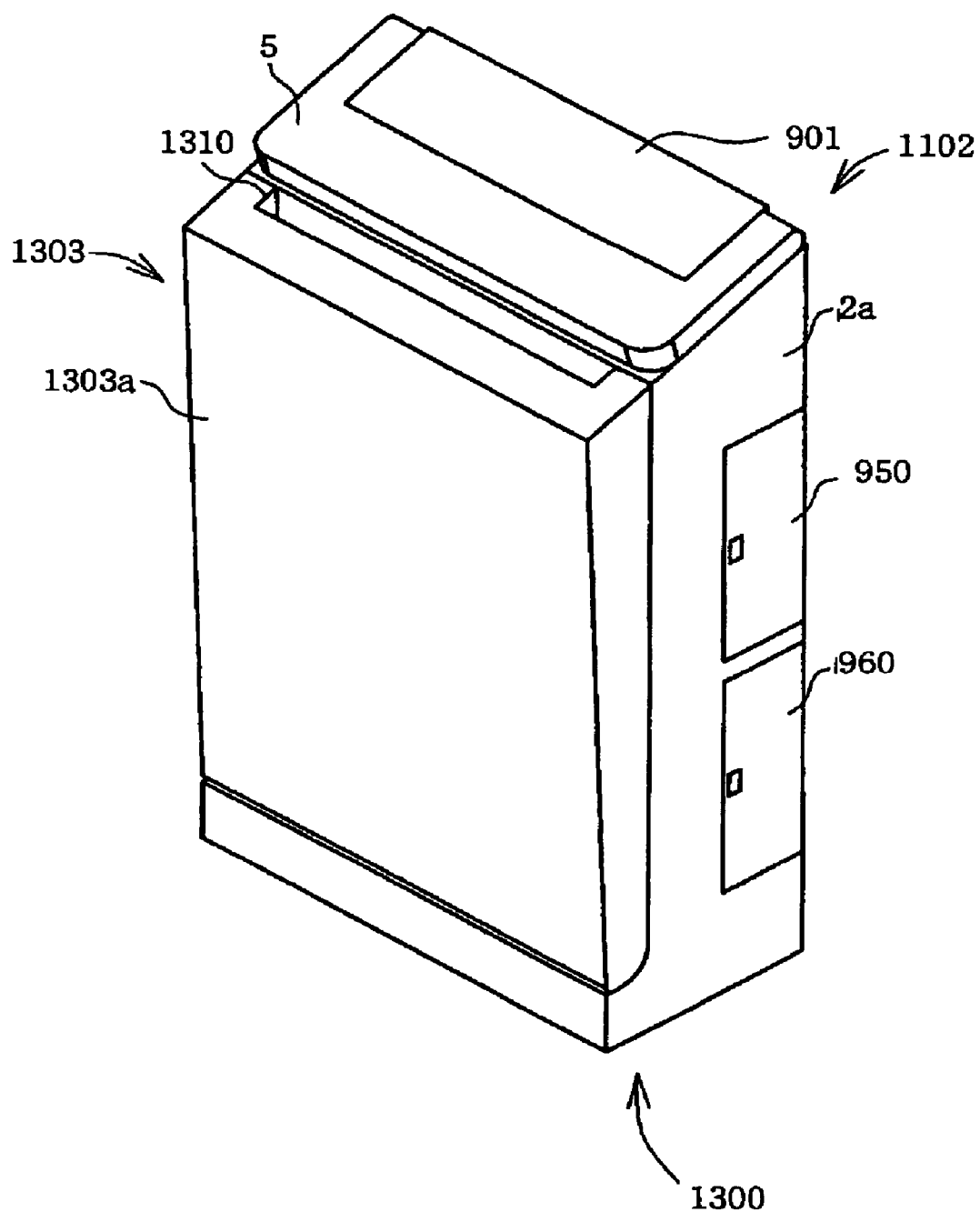
FIG. 25 is an external perspective view of a multifunctional apparatus according to a thirteenth embodiment of the invention.
Figure 26:
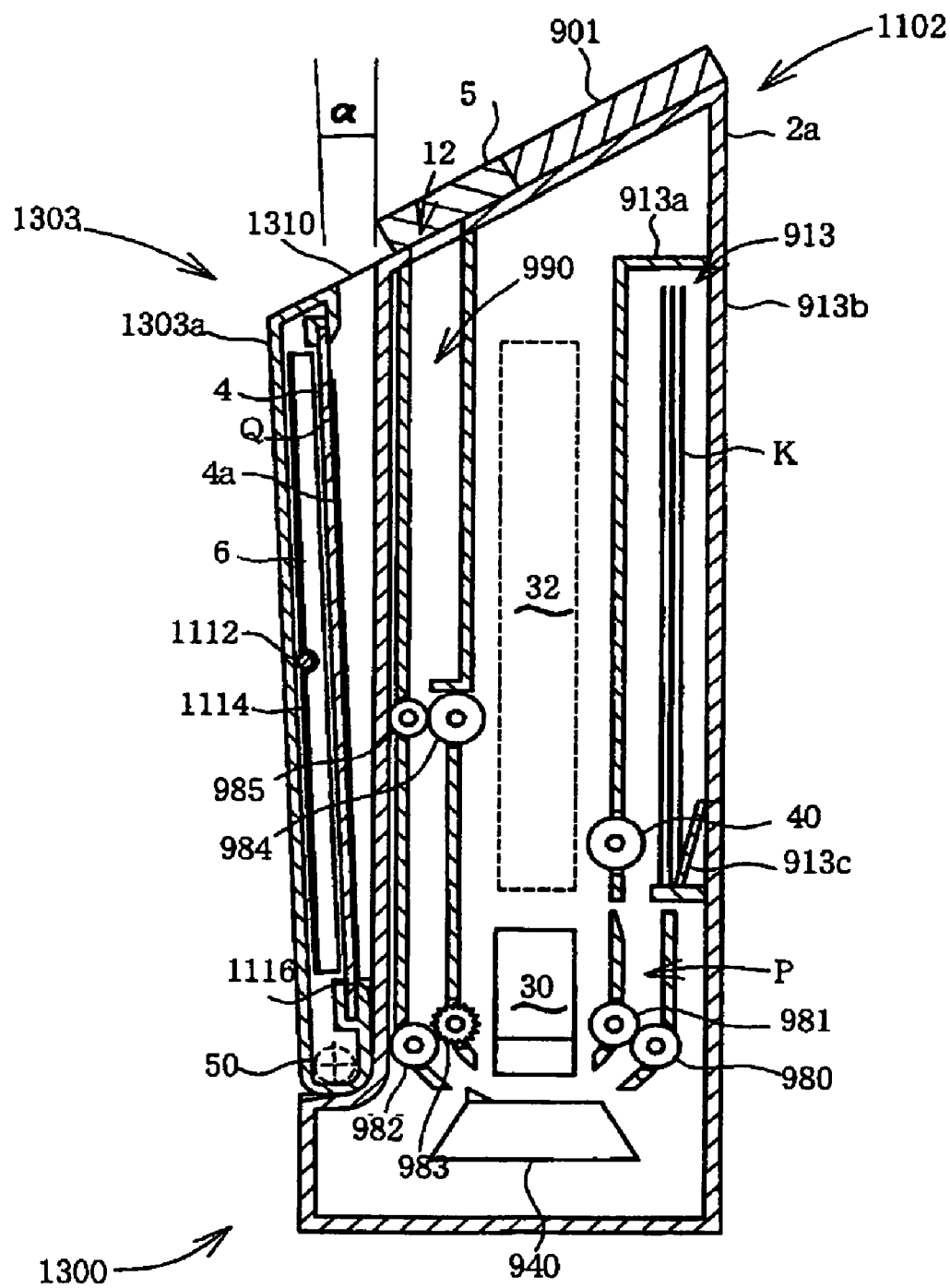
FIG. 26 is a cross-sectional view of an internal structure of the multifunctional apparatus.
Figure 27:
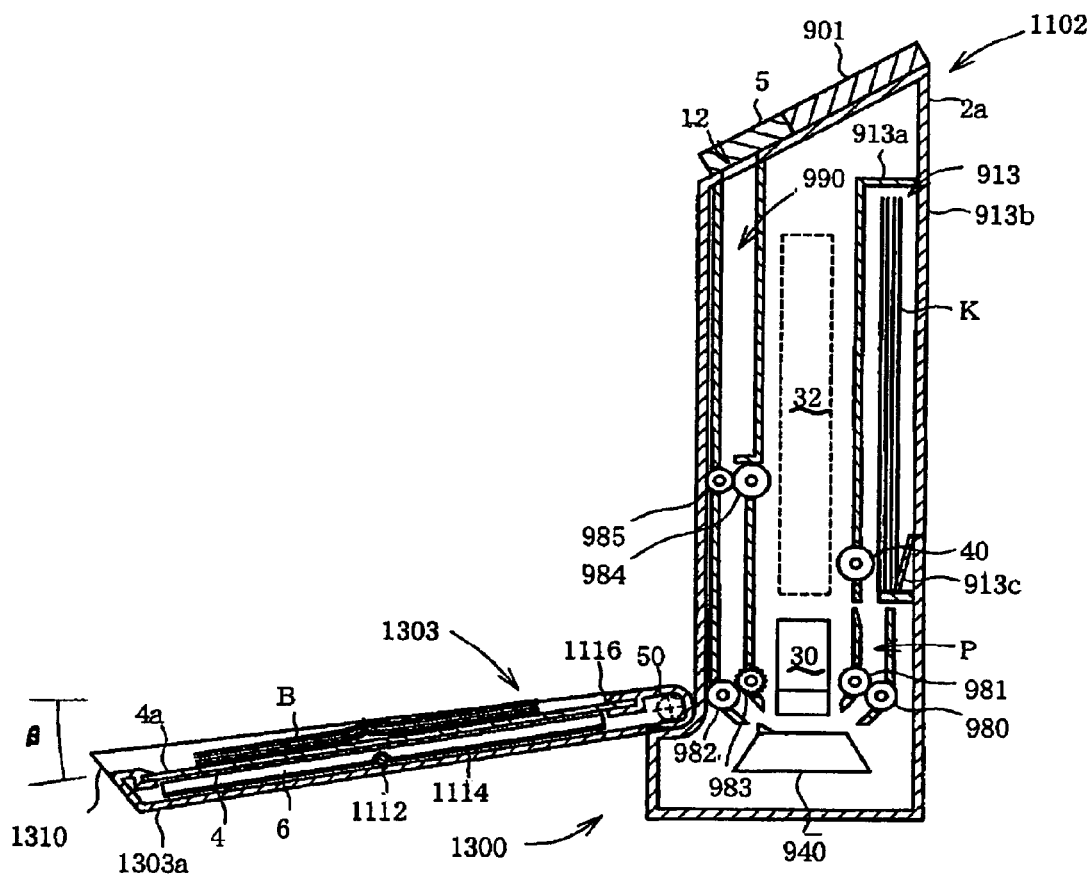
FIG. 27 is a cross-sectional view of the apparatus in a state where the scanner portion is opened.

There will be now described a multifunctional apparatus according to a thirteenth embodiment of the invention, by referring to FIGS. 25-27. In the following description related to the thirteenth embodiment of the invention, reference numerals used in the eleventh embodiment are used to denote the corresponding parts or elements, and detailed description thereof is omitted.

In FIG. 25, reference numeral 1300 generally denotes the multifunctional apparatus of the thirteenth embodiment, which is a multifunctional apparatus integrally comprising a scanner portion 1303 on its front side and a printer portion 1102 including a housing 2a on its rear side, similarly to the multifunctional apparatus 1100 of the eleventh embodiment. Thus, the multifunctional apparatus 1300 has a scanner function and a printer function. The multifunctional apparatus 1300 is different from the multifunctional apparatus 1100 in the positions the scanner portion 1303 can be placed, namely, the way the scanner portion 1303 is opened/closed by being turned frontward or toward the housing 2a, when an image of a document is to be read by the scanner portion 1303. The printer portion 1102 including the housing 2a in the present embodiment is similar to that of the multifunctional apparatus 1100, and thus corresponding parts or elements will be referred to by using the same reference numerals as used in the eleventh embodiment and description thereof is dispensed with.

The scanner portion 1303 is a flat bed scanner having a housing 1303a of a thin box-like shape, as shown in FIG. 25, like the scanner portion 1103 of the eleventh embodiment. The housing 1303a of the scanner portion 1303 is pivotally connected to the housing 2a of the printer portion 1102 at a lower end side thereof, and an upper portion of the scanner portion 1303 is turned frontward and upward to open and close the scanner portion 1303 relatively to the printer portion 1102. As shown in FIGS. 25 and 26, a direction of a thickness of the housing 2a and that of the housing 1303a are substantially parallel and there is a gap as a document inlet 1310 between an upper surface of the housing 2a and an upper surface of the housing 1303a. The document inlet 1310 is formed such that an upper portion of the scanner portion 1303 has a portion sunken in a direction of a thickness of the scanner portion 1303, on the side to be opposed to the housing 2a of the printer portion 1102 and at a substantially central position in a direction of width of the scanner portion 1303. A width of the sunken portion is slightly larger than a width of a document having a maximum width in terms of the reading capability of the scanner portion 1303, namely, the width of A4 size. In a state where the thickness direction of the housing 2a and that of the housing 1303a are substantially coincident, as shown in FIGS. 25 and 26, that is, while the scanner portion 1303 is closed, a document can be inserted into the document inlet 1310 to be opposed to a reading surface 4a of a glass plate 4.

As shown in FIG. 26, the scanner portion 1303 is similar to the scanner portion 1103 of the eleventh embodiment, and description thereof is omitted.

The scanner portion 1303 of the present embodiment is openable/closable by being turned frontward and back toward the housing 2a, to be placed in either a fully open position corresponding to the substantially horizontal position, as shown in FIG. 27 where the reading surface 4a is inclined downward at a second predetermined angle with respect to a horizontal surface with which the reading surface 4a aligns when the scanner portion 1303 is just horizontal, or an inclined position corresponding to the substantially upright position, as shown in FIG. 26 where the reading surface 4a provided by the glass plate 4 is inclined frontward at a first predetermined angle with respect to a vertical, external front surface of the housing 2a.

More specifically, when a relatively thin document, such as a standard paper sheet, is desired to be read while the scanner portion 1303 is not used, the scanner portion 1303 is placed in the inclined position as shown in FIG. 26. In the present embodiment, this inclined position of the scanner portion 1303 where the reading surface 4a is inclined frontward with respect to the vertical external front surface of the housing 2a at the predetermined first angle, is a closed position of the scanner portion 1303 relative to the housing 2a. Thus, when the scanner portion 1303 is not used, and when the scanner portion 1303 is to scan a relatively thin document, the space occupied by the standing multifunctional apparatus 1300 is relatively small in the direction of thickness thereof, thereby saving space in an office or other places where the multifunctional apparatus 1300 is used. Since it is not necessary to open the scanner portion 1303 when a relatively thin document is to be read, an operation required when an image is to be read is simplified.

When a relatively thin document is read by the scanner portion 1303, the user simply inserts a document Q into the document inlet 1310 without opening the scanner portion 1303. As shown in FIG. 26, with the scanner portion 1303 closed relatively to the housing 2a, the reading surface 4a of the glass plate 4 is inclined frontward at an angle α with respect to the vertical front surface of the housing 2a. Hence, the user can position the document Q on the inclined reading surface 4a by inserting the document Q through the document inlet 1310 from the upper side of the multifunctional apparatus 1300. The reading surface 4a is inclined frontward, i.e., the direction to open the scanner portion 1303. Thus, when the user inserts a lower end of the document Q into the document inlet 1310 from the front side of the multifunctional apparatus 1300 such that the document Q drops down obliquely, the document Q is brought into close contact with the reading surface 4a by its own weight, thereby enhancing the usability of the apparatus.

Similarly to the eleventh embodiment, a stopper 1116 extending across a width of the scanner portion 1303 is disposed at a lower end of the reading surface 4a, and thus the document Q inserted through the document inlet 1310 slips down along the reading surface 4a by its own weight until the lower end of the document Q contacts the stopper 1116, and thereby stops to be held at a predetermined position on the reading surface 4a, as shown in FIG. 26. In this way, the document Q is held at a predetermined position with a lower end of the reading surface 4a being a reference position, it is not necessary for the user to peer down into the document inlet 1310 to position the document Q therein. Thus, the document Q is easily positioned. Since the document Q is brought into close contact with the reading surface 4a by its own weight, a clearance does not tend to be formed between the reading surface 4a and the document Q, thereby improving the accuracy in reading an image by the reading device 6.

With the scanner portion 1303 in this inclined position, the image on the document Q is read by the reading device scanning.

The angle α at which the reading surface 4a is inclined frontward with respect to the vertical surface when the scanner portion 1303 is in the inclined position, is determined by taking account of the opening dimension of the document inlet 1310 through which the document Q is inserted, the stability of the standing multifunctional apparatus 1300, and other conditions. Preferably, the angle α is about 2-3°.

On the other hand, when a document relatively thick and heavy, such as book and booklet, is to be read, the scanner portion 1303 is placed in the fully open position, similarly to the eleventh embodiment. Since the scanner portion 1303 is disposed on the front side of the housing 2a, the space required to open/close the scanner portion 1303 is limited to the front side of the housing 2a, i.e., the front side of the multifunctional apparatus 1300. Hence, it is not required to secure a space on the rear side of the multifunctional apparatus 1300, thereby facilitating placing the multifunctional apparatus 1300 at the side of a wall of the like.

As shown in FIG. 27, when the user opens frontward the scanner portion 1301 to the maximum from the inclined position as shown in FIG. 26, the scanner portion 1303 is placed in the fully open position where the reading surface 4a is inclined downward at an angle β with respect to the horizontal surface with which the reading surface 4a aligns when the scanner portion 1303 is just horizontal. In the fully open position, an upper end of the scanner portion 1303 is in contact with a rest surface which may be a floor, and thus a provisional fixing mechanism for fixing the scanner portion 1303 in position between the fully open position and the inclined position is not provided.

A relatively thick document R such as book is placed on the reading surface 4a while the scanner portion 1303 is in the fully open position. Although the relatively thick document R has a considerable weight, the printer portion 1102 standing substantially upright is stable even when the document R is put on the reading surface 4a since the upper end of the scanner portion 1303 is in contact with the rest surface. With the scanner portion 1303 in the fully open position, the reading surface 4a is inclined to face obliquely frontward, and it is easy to put the document R at a predetermined position on the reading surface 4a from the front side of the multifunctional apparatus 1300. While in this fully open position, the scanner portion 1303 reads an image on the document R by the reading device 6 scanning.

According to the present multifunctional apparatus 1300, when the scanner portion 1103 is not used and when a relatively thin document is to be read, the scanner portion 1303 is placed in the inclined position, thereby the space occupied by the multifunctional apparatus 1300 is saved, while facilitating the reading of the image on the document. On the other hand, when a relatively thick document is to be read, the scanner portion 1303 is placed in the fully open position to read an image, while the printer portion 1102 of the multifunctional apparatus 1300 is kept in the standing position to save space.

The following is a brief description of the construction common to the twelfth and thirteenth embodiments, as written in the form similar to the appended claims, and effects obtained thereby.

An image processing apparatus comprising:

an image recording portion including a first housing flat box-shaped, and a pathway which is formed in the first housing and along which a recording medium is fed so that a first image is recorded on the recording medium, the image recording portion is normally placed in a standing posture; and an image reading portion having a second housing flat box-shaped an external surface of which constitutes a reading surface to be opposable to the first housing, a lower end portion of the second housing being pivotally connected to the first housing such that an upper portion of the second housing is openable/closable relatively to the first housing, so that the image reading portion can be placed in an inclined position where the reading surface is inclined in a direction such that a distance of the reading surface from a vertical surface is larger on an upper side than a lower side, and the image reading portion capable of reading a second image on a document on the reading surface.

The first and second images may or may not be a same image.

According to the image processing apparatus, the second housing of the image reading portion opens relatively to the vertical surface so that the image reading portion is placed in the inclined position, allowing a user to insert, from the front side of the apparatus, a document into a clearance between the upper portion of the second housing and an external surface of the first housing of the image recording portion, so as to position the document on the reading surface easily. Thus, the usability of the apparatus is high. Further, the inserted document is brought into close contact with the inclined reading surface by its own weight, the accuracy in reading the second image on the document is enhanced.

There will be now described a multifunctional apparatus according to a fourteenth embodiment, by referring to FIGS. 28-35. Elements or parts corresponding to those in any one of the above-described embodiments are denoted by the same reference numerals, and description thereof is omitted.

Figure 28:
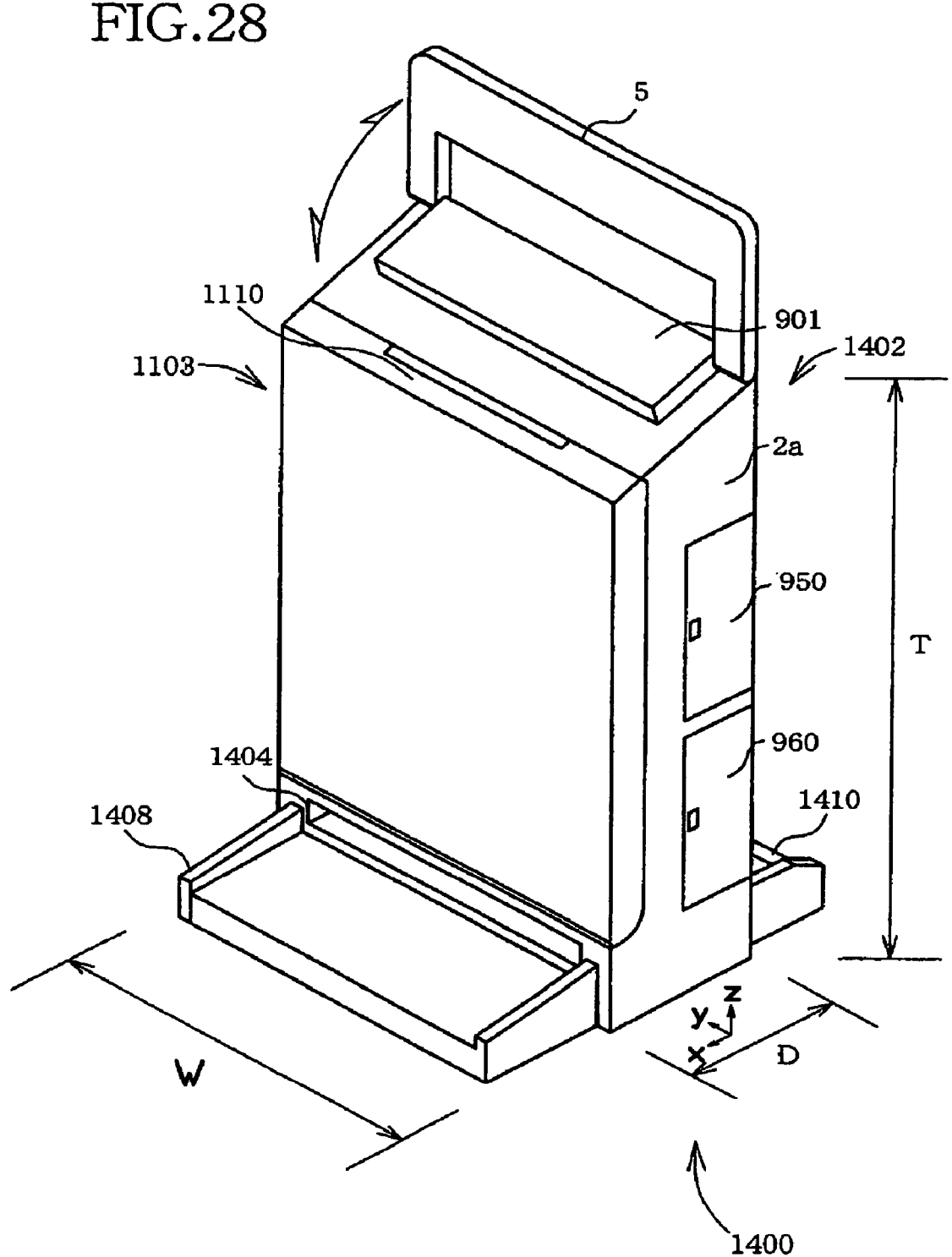
FIG. 28 is an external perspective view of a multifunctional apparatus according to a fourteenth embodiment of the invention.

In FIG. 28, reference numeral 1400 generally denotes the multifunctional apparatus according to the fourteenth embodiment. A general structure of the multifunctional apparatus 1400 is similar to that of the multifunctional apparatus 1100 according to the eleventh embodiment, with some exception, and therefore only a different part of this embodiment is described here. It is noted that although the multifunctional apparatus 1400 comprises both of a printer function and a scanner function, a part of the effects obtained by this embodiment and the following fifteenth embodiment can be obtained even where a scanner function or a scanner portion 1103, and/or some other functions is omitted, as long as a printer portion 1402 providing the printer function is included in the multifunctional apparatus 1400.

Like any other apparatuses 1-1300 described above, the multifunctional apparatus 1400 is also the type standing substantially upright, and thus relatively small in overall size and thickness, reducing the occupying area in a rest surface on which the multifunctional apparatus 1400 is placed, and enhancing the portability.

The printer portion 1402 has a recording medium outlet 1404 open at a position similar to that of the recording medium outlet 312, 1001, 1201, namely, in a lower portion in a front face of a housing 2a of the printer portion 1402. Thus, a recording medium K on which an image has been recorded is ejected frontward. Further, in a lower portion in a rear surface of the housing 2a of the printer portion 1402, there is formed a recording medium inlet 1406 through which a recording medium K is manually inserted. A stacker tray 1410 is disposed on the rear side of the housing 2a at a position corresponding to this recording medium inlet 1406.

A catch tray 1408 and the stacker tray 1410 are respectively attached to the front and rear sides of the housing 2a of the printer portion 1402, such that the catch tray 1408 and the stacker tray 1410 protrude from a bottom portion of the housing 2a. The catch tray 1408 and the stacker tray 1410 correspond to the recording medium outlet 1404 and the recording medium inlet 1406, respectively. That is, the catch tray 1408 catches and holds a recording medium K on which an image has been recorded and ejected through the recording medium outlet 1404. The stacker tray 1410 accommodates a recording medium (or a stack of recording media K), in the form of a relatively thick sheet of paper or other materials, or a paper sheet of nonstandard size, which is to be inserted through the recording medium inlet 1406, and holds the recording medium or the stack of the recording media at a predetermined position. The catch tray 1408 and the stacker tray 1410 serve as support legs also for preventing the standing multifunctional apparatus 1400 from falling. Since provision of the catch tray 1408 and the stacker tray 1410 increases an area occupied by the multifunctional apparatus 1400 in a rest surface, it is preferable that these trays 1408 and 1410 be removably attached to the housing 2*a* of the printer portion 1402 as needed.

An upper surface of the housing 2*a* of the printer portion 1402 is descending frontward, and an operator panel 901 through which the multifunctional apparatus 1400 is operated is disposed in this upper surface. The structure and effects related to the upper surface of the housing is the same as those of the eleventh to thirteenth embodiments, and description thereof is not described here.

In this embodiment also, a slot portion 950 and a cartridge holder portion 960, like those in the ninth to thirteenth embodiments, are provided in a lateral surface of the housing 2*a*. The structure and effects of these portions 960, 970 are also the same as those of the eleventh to thirteenth embodiments, and therefore description thereof is not repeated here.

The scanner portion 1103 has the same structure as that of the eleventh to thirteenth embodiments, and is connected to the housing 2*a* of the printer portion 1402 in the same way as in the eleventh to thirteenth embodiments. Thus, further description thereof is not provided here.

Figure 29:
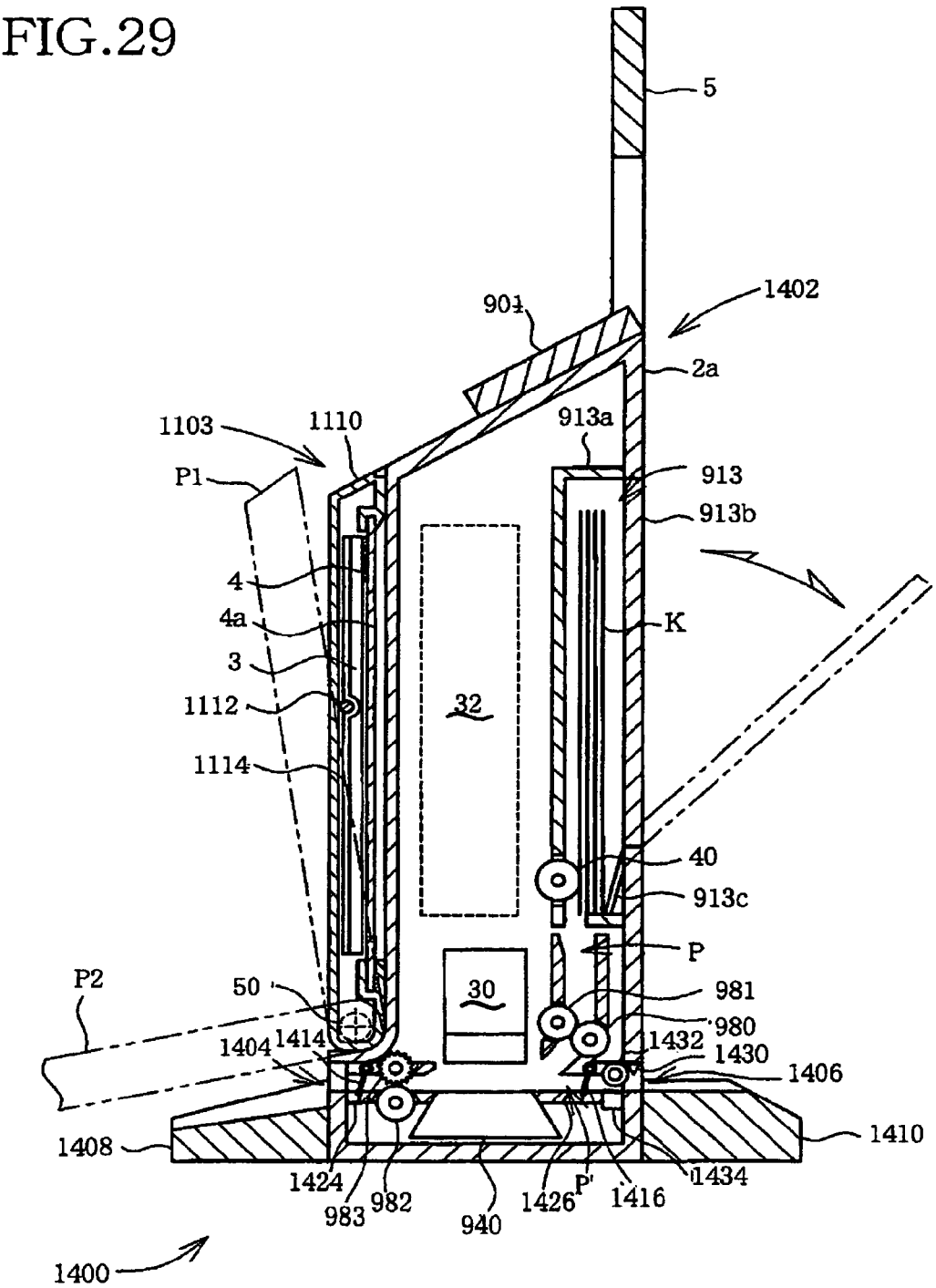
FIG. 29 is a vertical cross-sectional view of an internal structure of the multifunctional apparatus.

Referring now to FIG. 29, there will be described an internal structure of the multifunctional apparatus 1400. As shown in FIG. 29, the housing 2*a* of the printer portion 1402 incorporates a recording medium holder 913, a feed pathway P, a line head 30, a platen 940, an arranging space 32 in which members or elements including electrical components are disposed, an outlet shutoff valve 1414 for closing and opening the recording medium outlet 1404, an inlet shutoff valve 1416 for opening and closing the recording medium inlet 1406, and others. Each of the outlet and inlet shutoff valves 1414, 1416 constitutes a pathway shutoff valve.

The structure of the recording medium holder 913 is the same as that of the ninth and other relevant embodiments and description thereof is omitted.

The pathway P extending from the recording medium holder 913 is generally L-shaped in this embodiment in the same way as in the twelfth embodiment, and description thereof is not repeated here.

Printing or recording is performed by the line head 30 in the same way as any of the above-described embodiments where the platen head 30 faces downward, and description thereof is omitted.

There will be described in detail the construction related to the outlet shutoff 1414 valve and the inlet shutoff valve 1416. As shown in FIG. 29, in the vicinity of, and on the internal side of, the recording medium outlet 1404, there is disposed the outlet shutoff valve 1414 which is switchable in position between an open position to open the pathway P, and a closing position to close the pathway P. More specifically, the outlet shutoff valve 1414 is a thin plate member having a width substantially the same as a width of the pathway P, and pivotably disposed to project at a position in the pathway P downstream of a gear roller 983 so as to normally close the pathway P. That is, the outlet shutoff valve 1414 is normally biased by a biasing member such as a spring (not shown) toward the upstream side of the pathway P. An end of the outlet shutoff valve 1414 engages a receiving portion 1424 which is a recess formed in a guide member defining the pathway P and opposed to the outlet shutoff valve 1414. Since the outlet shutoff valve 1414 is biased by a biasing force of the biasing member toward the upstream side of the pathway P, the outlet shutoff valve 1414 engages the receiving portion 1424 to close the pathway P, that is, placed in the closing position to close the recording medium outlet 1404. A driving force can be transmitted to the outlet shutoff valve 1414 from a motor not shown, so that the outlet shutoff valve 1414 is biased by the driving force toward the downstream side against the biasing force of the biasing member, and placed in the open position to open the pathway P, that is, open the recording medium outlet 1404.

The recording medium inlet 1406 is formed in a lower portion of an external back surface of the housing 2*a* so that a recording medium is manually fed in through this inlet 1406. When a standard paper sheet such as that of A4 size is used as the recording medium K, a stack of such paper sheets is usually put in the recording medium holder 913 and waits for being fed out into the pathway P one by one. However, to enable to record an image on a relatively thick sheet which does not easily bend along the pathway P, such as postcard, an envelope and a nonstandard paper sheet, the recording medium inlet 1406 is formed to allow insertion of such a nonstandard sheet or others into the printer portion 1402. A pathway P' along which a manually inserted recording medium is fed extends horizontally from the recording medium inlet 1406, to merge with the pathway P at a position immediately upstream of the platen 940.

At the recording medium inlet 1406 is attached a sheet sensor 1430. The sheet sensor 1430 detects whether a recording medium K is inserted into the recording medium inlet 1406. A detection signal from the sheet sensor 1430 is sent to a control portion 1450 comprising the electrical components in the arranging space 32. At a position immediately inside the recording medium inlet 1406, there are disposed a feed-in roller 1432 and a sheet guide 1434 to be respectively opposed to the manual insertion pathway P'. More specifically, the feed-in roller 1432 disposed on an upper side of the manual insertion pathway P' is rotated by receiving a driving force of a motor (not shown) transmitted via a transmitting mechanism (not shown) comprising a plurality of meshing gears. On the other hand, the sheet guide 1434 disposed on a lower side of the pathway P' is disposed to be vertically displaceable so that an upper surface of the sheet guide 1434 is brought into pressing contact with the feed-in roller 1432 and away therefrom. When a recording medium K is fed in from the stacker tray 1410, the sheet guide 1434 is elevated to press the recording medium K against the feed-in roller 1432 and then the feed-in roller 1432 is rotated, thereby feeding the recording medium K nipped between the feed-in roller 1432 and the sheet guide 1434 into the pathway P'.

As shown in FIG. 29, in the vicinity of the recording medium inlet 1406, the inlet shutoff valve 1416 switchable in position between the open position to open the pathway P' and the closing position to close the pathway P'. More specifically, the inlet shutoff valve 1416 is a thin plate member having a width substantially the same as that of the pathway P', and pivotably disposed in the vicinity of the recording medium inlet 1406 and on the downstream side of the feed-in roller 1432, to project to normally close the pathway P'. That is, the inlet shutoff valve 1416 is normally biased by a biasing member such as a spring or others (not shown) toward the upstream side of the pathway P. An end of the inlet shutoff valve 1416 engages a receiving portion 1426 which is a recess formed in a guide member defining the pathway P' and opposed to the inlet shutoff valve 1416. Since the inlet shutoff valve 1416 is biased by a biasing force of the biasing member toward the upstream side of the pathway P', the inlet shutoff valve 1416 engages the receiving portion 1426 to close the pathway P', that is, placed in the closing position to close the recording medium inlet 1406. A driving force is transmitted to the inlet shutoff valve 1416 from a motor not shown, so that the inlet shutoff valve 1416 is biased by the driving force toward the downstream side against the biasing force of the biasing member, and placed in the open position to open the pathway P', that is, open the recording medium inlet 1406.

Like in the eleventh to thirteenth embodiment, the scanner portion 1103 can be displaced relatively to the printer portion 1402 depending on the kind of a document to be read or on other conditions. In FIG. 29, reference symbols P1 and P2 respectively denote an inclined position and a fully open position of the scanner portion 1103 which are identical with those in the eleventh to thirteenth embodiments. Positions that the scanner portion 1103 can be placed may be only a closed position or exactly upright position and the fully open position P2, or may be only the inclined position P1 and the fully open position P2.

Figure 30:
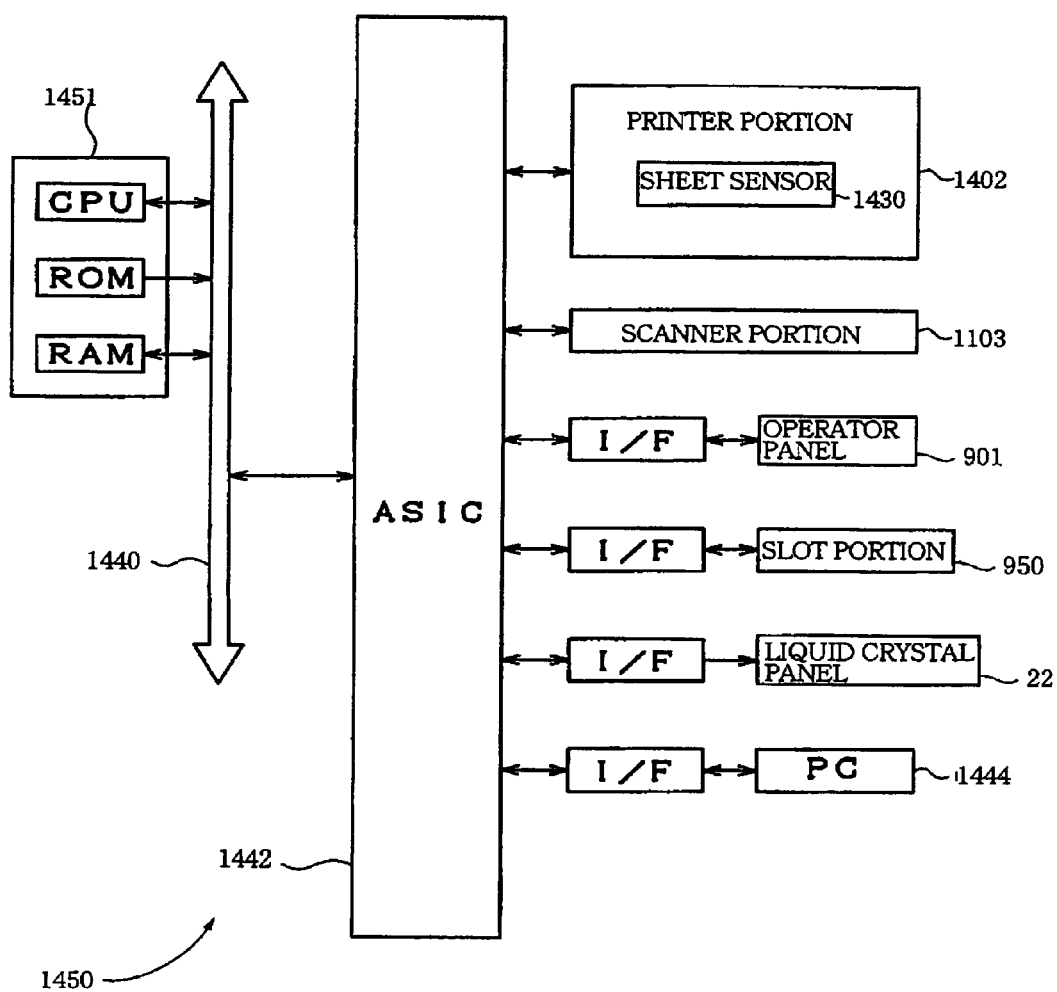
FIG. 30 is a functional block diagram of a control portion of the multifunctional apparatus.

FIG. 30 is a block diagram of the control portion 1450 constituted by the electrical components disposed in the arranging space 32 of the multifunctional apparatus 1400. As shown in FIG. 30, a central processing portion 1451 constituted by a CPU (Central Processing Unit), a ROM (Read Only Memory), and a RAM (Random Access Memory) is connected to various sensors including the sheet sensor 1430 in the printer portion 1402, motors, scanner portion 1103, operator panel 901, slot portion 950, and others, to be capable of data transfer, via a bus 1440 and an ASIC (Application Specific Integrated Circuit) 1442. The multifunctional apparatus 1400 is connected to a computer (PC) 1444, so that the apparatus 1400 can record an image or a document on a recording medium based on image data or document data transmitted from the computer 1444, as well as that inputted through the operator panel 901. Hence, the apparatus 1400 comprises an interface (I/F) for data transfer from and to the computer 1444. The configuration of the control portion 1450 is described only by way of example, and it is to be understood that details of the control portion 1450 is not limited to those according to the present embodiment.

Hereinafter, how recording is performing by the printer portion 1402 of the multifunctional apparatus 1400 will be described.

Initially, a case where an image is recorded on the recording medium K supplied from the recording medium holder 913 will be described. When the multifunctional apparatus 1400 starts recording of an image in response to an instruction inputted through the operator panel 901 or from the computer 1444, the central processing portion 1451 operates to drive a motor of the pickup roller 40 so as to pick up and feed a recording medium K as held in the recording medium holder 913 into the pathway P. Accordingly, recording medium K pressed by a guide 913c against the pickup roller 40 is fed downward into the pathway P, as shown in FIG. 31.

The central processing portion 1451 operates to transmit the driving force of the motor to the outlet shutoff valve 1414, so as to turn the outlet shutoff valve 1414 currently closing the pathway P, to the downstream side and against the biasing force. Thus, the outlet shutoff valve 1414 is placed in the open state. A multifunctional apparatus standing substantially upright such as the multifunctional apparatus 1400 is often directly placed on a floor, and tends to suffer from introduction of foreign matter such as dust and insect particularly through the recording medium outlet 1404. A recording mechanism constituted by the line head 30 in the vicinity of the recording medium outlet 1404 tend to be adversely affected by the foreign matter introduced into the housing 2a, such as dust, dirt and insect. However, according to the present embodiment, the outlet shutoff valve 1414 disposed at the recording medium outlet 1404 is kept in the closing position to close the recording medium outlet 1404 unless recording of an image is performed, that is, unless the recording medium K is to be ejected through the recording medium outlet 1404. Hence, it is prevented that foreign matter such as dust, dirt, and insect enters the housing 2a through the recording medium outlet 1404.

Figure 31:
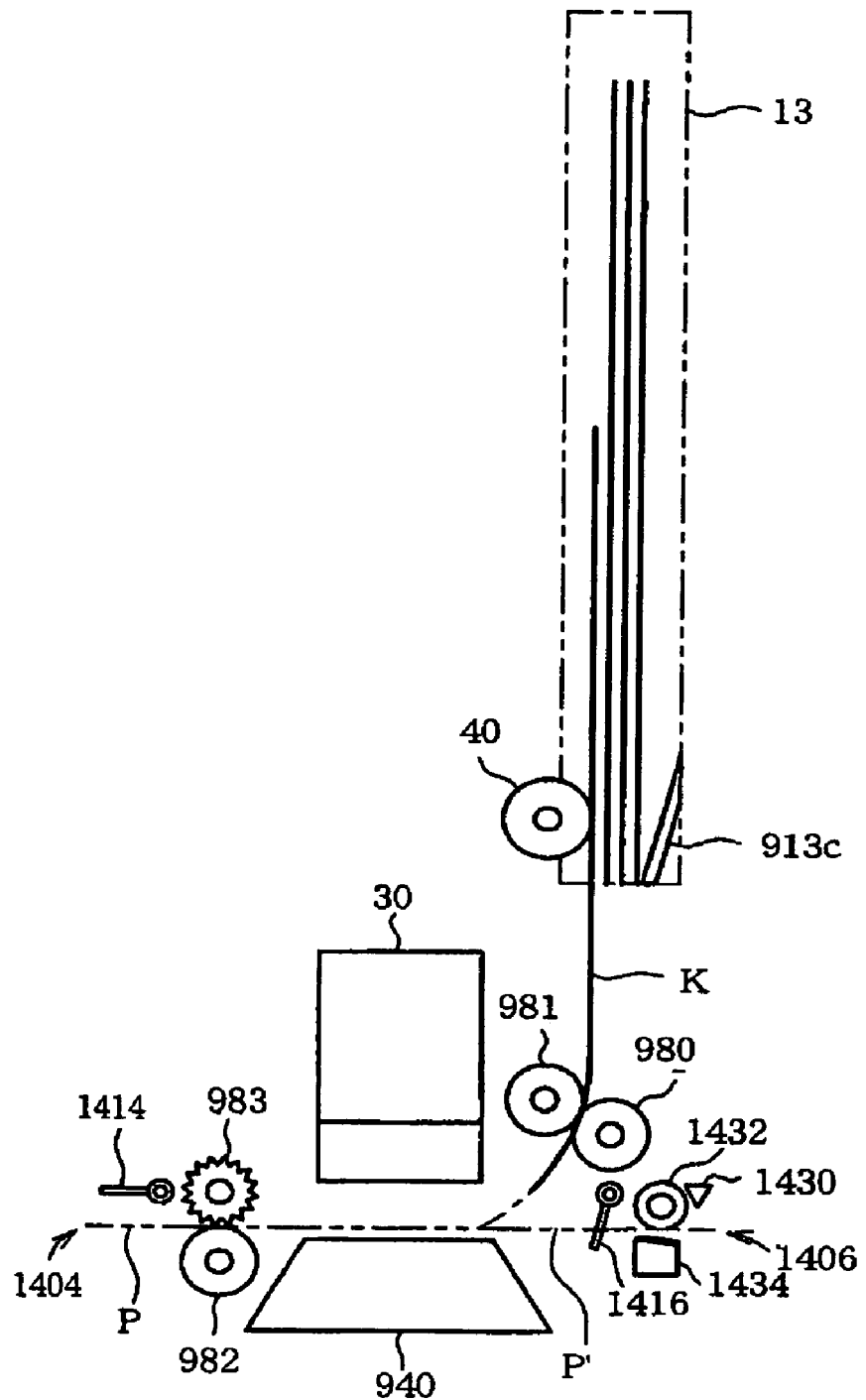
FIG. 31 is a schematic diagram illustrating how a recording medium K is fed from a recording medium holder.

The recording medium K fed out into the pathway P is transferred to be nipped between a feeder roller 980 and a presser roller 981 as shown in FIG. 31, retracting the presser roller 981 by an amount corresponding to a thickness of the recording medium K. The turning effort of the feeder roller 980 is transmitted to the recording medium K nipped between the feeder roller 980 and the presser roller 981. With a change in the feeding direction from vertical to horizontal, the recording medium K fed through the nip between the feeder roller 980 and the presser roller 981 is bent along the pathway P and fed to a position over the platen 940.

When a front end of the recording medium K reaches a recording area of the line head 30, the recording medium K nipped between the feeder roller 980 and the presser roller 981 is intermittently fed over the platen 940 by a predetermined linefeed width, and each time the recording medium K is fed by the linefeed width, the line head 30 is scanned across the width of the recording medium. In this way, the image recording is implemented from a front side of the recording medium K. The front side portion of the recording medium where the image has been recorded is then pinched between a feeder roller 982 and a gear roller 983 while a rear side portion of the recording medium is pinched between the feeder roller 980 and the presser roller 981, and the recording medium is intermittently fed by the predetermined linefeed width to repeat the recording by the line head 30. Eventually, a rear end of the recording medium K is released from the nip between feeder roller 980 and the presser roller 981, and the recording medium K is further intermittently led by the linefeed width while the recording is continued.

Figure 32:
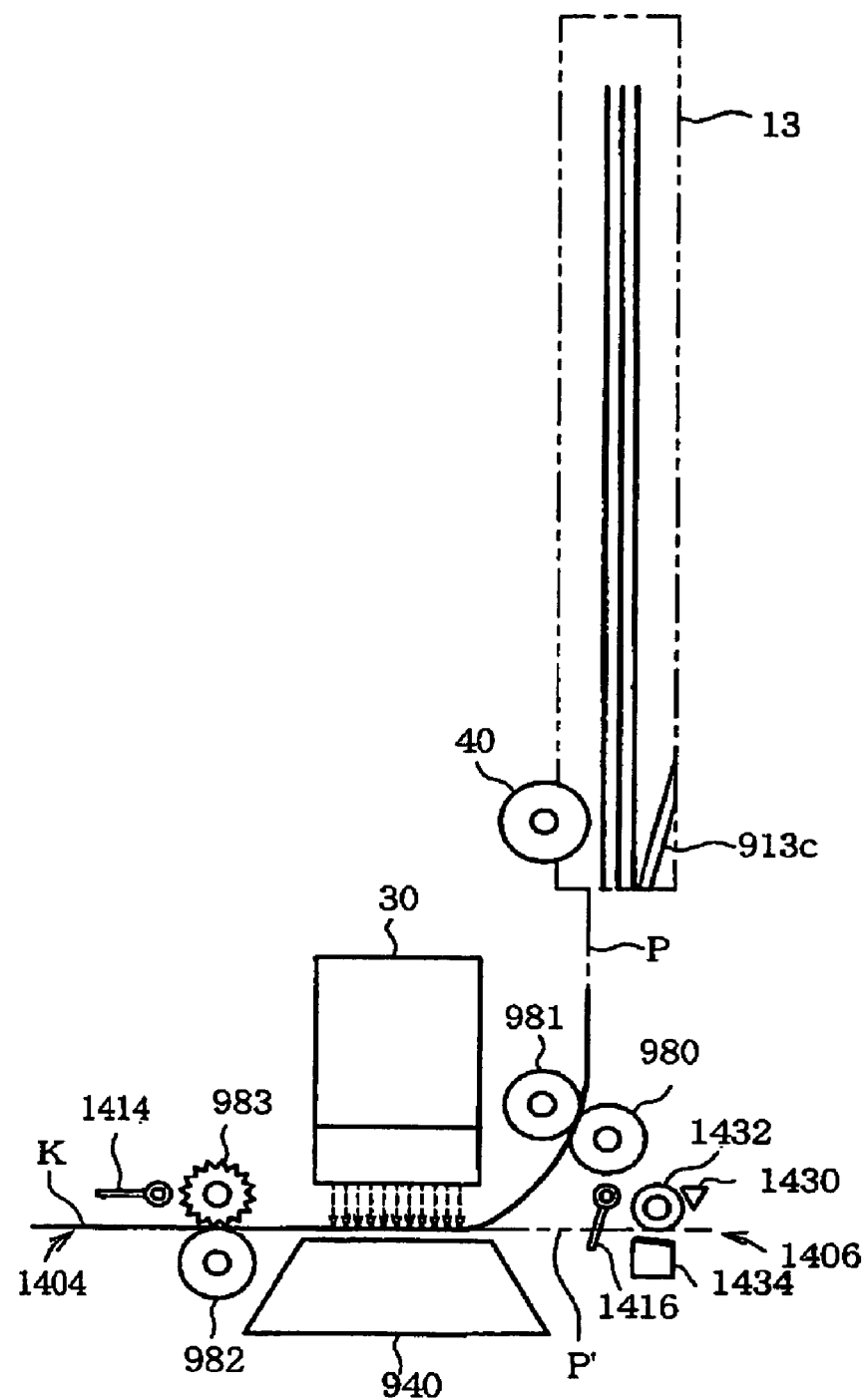
FIG. 32 is another schematic diagram illustrating how the recording medium K is fed.

As the image recording is performed by the line head 30 as described above, the front end of recording medium K projects from the recording medium outlet 1404 to the outside of the housing 2a, as shown in FIG. 32. As described above, the outlet shutoff valve 1414 is turned to the downstream side to be placed in the open position to open the pathway P, the recording medium K can project through the recording medium outlet 1404. After the recording across an entire predetermined recording area in the recording medium K is complete, the feeder roller 982 is continuously rotated 80 that the recording medium K is ejected through the recording medium outlet 1404 by being pinched between the feeder roller 982 and the gear roller 983. When recording on a predetermined number of recording media is complete, the central processing portion 1451 cuts off the driving force of the motor to the outlet shutoff valve 1414 to allow free displacement of the outlet shutoff valve 1414. Thus, the outlet shutoff valve 1414, which has been placed in the open state to keep the pathway P open, is now returned to the upstream side by the biasing force of the biasing member, to be placed in the closing position to close the pathway P. Thus, the recording medium outlet 1404 is closed to prevent foreign matter from entering the housing 2a.

Figure 33:
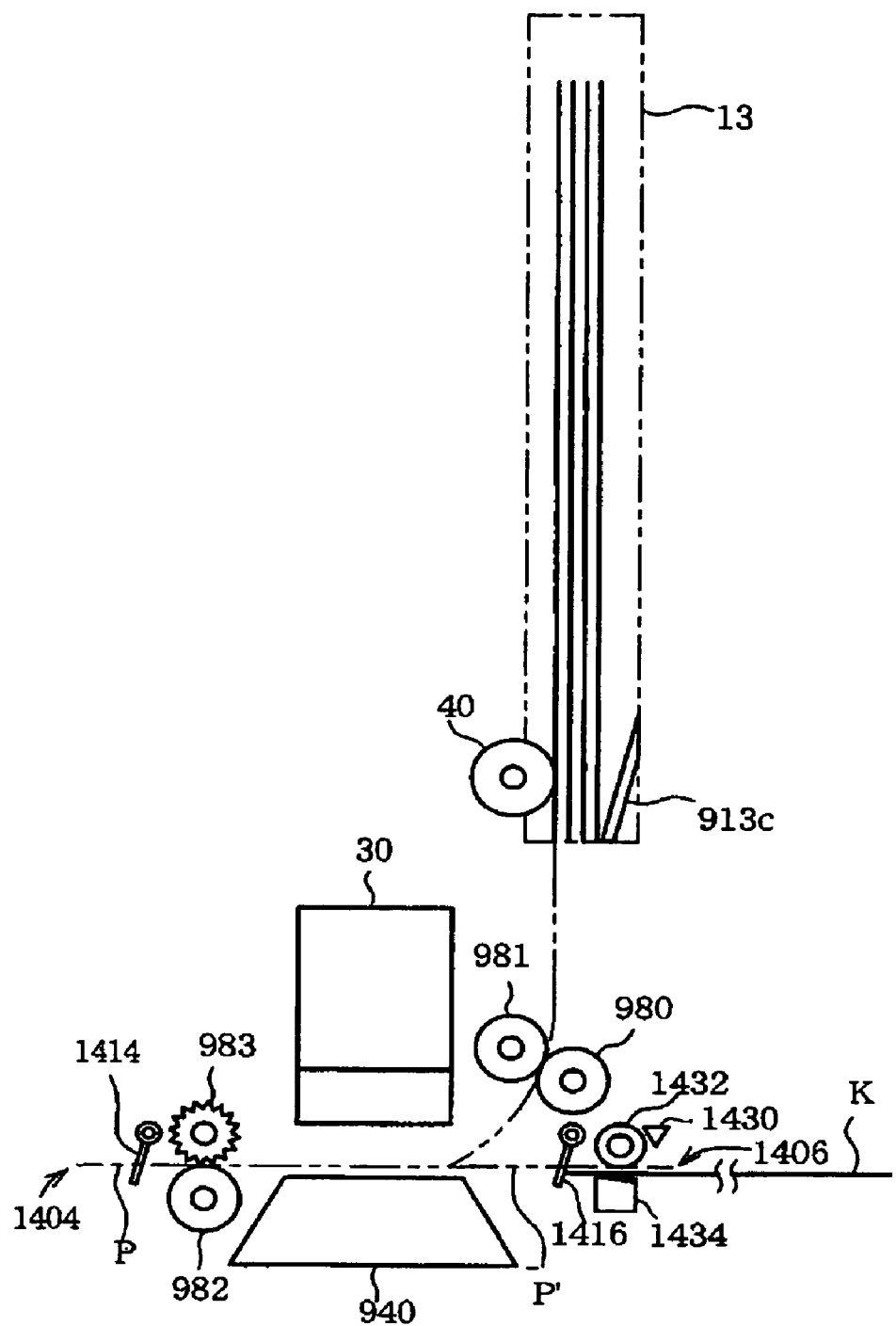
FIG. 33 is a schematic diagram illustrating how a recording medium K manually inserted from a recording medium inlet is fed.

There will be now described how an image is recorded on a recording medium K which is manually inserted through the recording medium inlet 1406. First, the user sets the recording medium K at the recording medium inlet 1406. As shown in FIG. 33, when the recording medium K is set at the recording medium inlet 1406, the sheet guide 1434 is lowered not to contact the feed-in roller 1432, and the inlet shutoff valve 1416 is in the closing position to close the pathway P'. Hence, the recording medium K is set on the stacker tray 1410 with a front end thereof in contact with the inlet shutoff valve 1416. Unless the recording medium K is fed in from the recording medium inlet 1406 in this way, the inlet shutoff valve 1416 is kept in the closing position to close the recording medium inlet 1406, so as to prevent introduction of foreign matter such as dust, dirt and insect into the housing 2a through the recording medium inlet 1406.

It is noted that in an arrangement where the recording medium outlet and the recording medium inlet are formed in two opposite sides of the printer portion so as to be connected to each other via the pathway for feeding a recording medium therealong, as in the present embodiment, foreign matter tends to be introduced. Thus, in such an arrangement, the effect of providing a pathway shutoff valve such as the outlet shutoff valve and the inlet shutoff valve in this embodiment is significant.

Then, in the multifunctional apparatus 1400 which is to start recording an image in response to an instruction from the operator panel 901 or the computer 1444, the central processing portion 1451 initially confirms whether a recording medium K is set at the recording medium inlet 1406, based on a detection signal from the sheet sensor 1430. When the sheet sensor 1430 detects a recording medium K, the driving force of the motor is transmitted to the inlet shutoff valve 1416, so that the inlet shutoff valve 1416 which has kept closing the pathway P' is turned by the driving force to the downstream side against the biasing force, to be placed in the open position to open the pathway P'. When the sheet sensor 1430 does not detect a recording medium K, the central processing portion 1451 makes an error indication on the operator panel 901, to prompt the user to set a recording medium K on the stacker tray 1410.

The central processing portion 1451 operates to transmit the driving force of the motor to the outlet shutoff valve 1414 so that the outlet shutoff valve 1414 which has kept closing the pathway P is turned by the driving force to the downstream side against the biasing force, to be placed in the open position to open the pathway P. In the same way as described above, unless the recording medium K is fed in from the recording medium inlet 1406, the outlet shutoff valve 1414 is kept in the closing position to close the recording medium outlet 1404. Thus, introduction of foreign matter such as dust, dirt and insect into the housing 2a through recording medium outlet 1404 is prevented.

Figure 34:
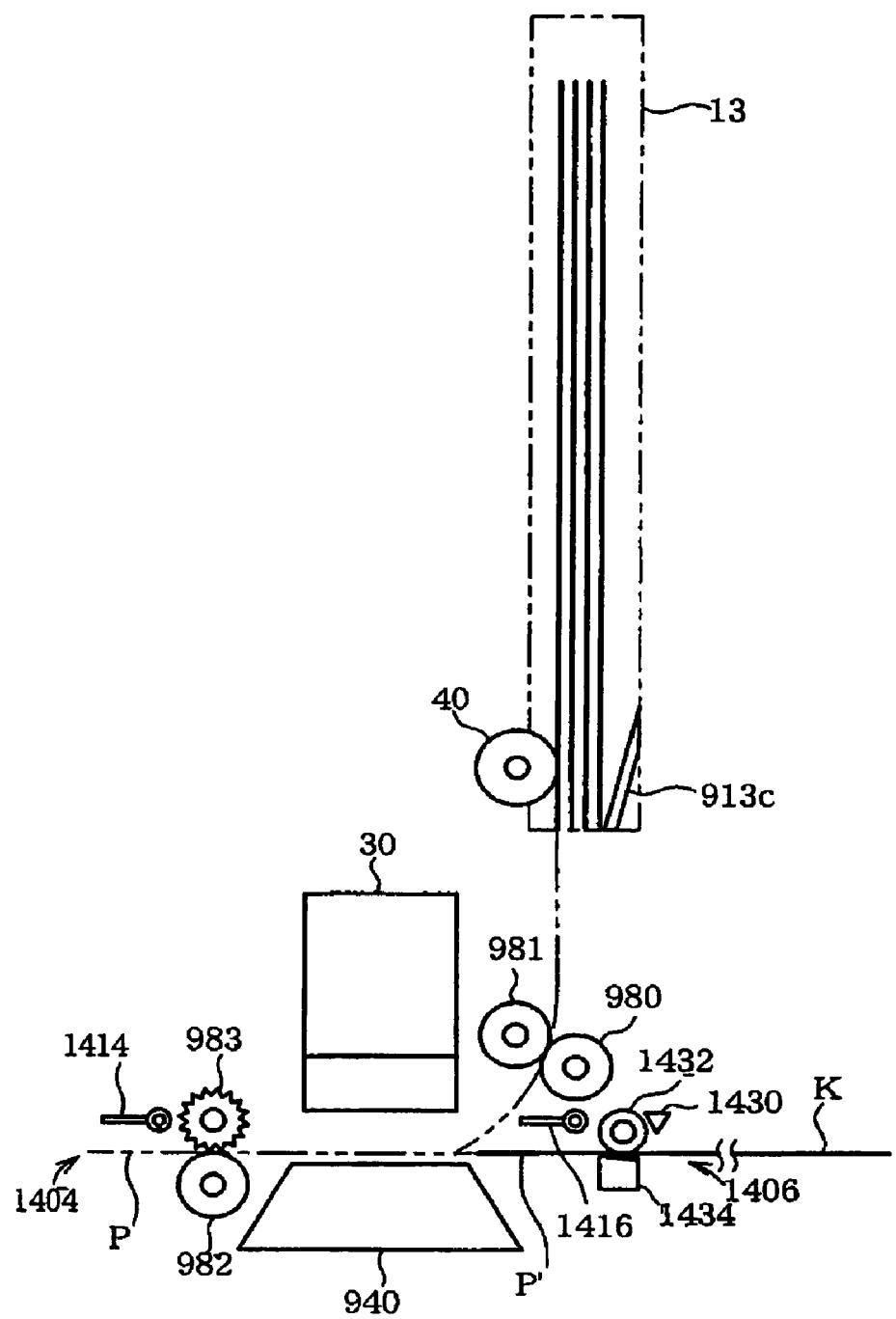
FIG. 34 is another schematic diagram illustrating how the manually inserted recording medium K is fed.

Thereafter, to feed the recording medium K into the pathway P', the sheet guide 1434 is elevated to press the recording medium K onto the feed-in roller 1432, and the motor is driven to rotate the feed-in roller 1432. Accordingly, the recording medium K is fed out into the pathway P', as shown in FIG. 34.

Figure 35:
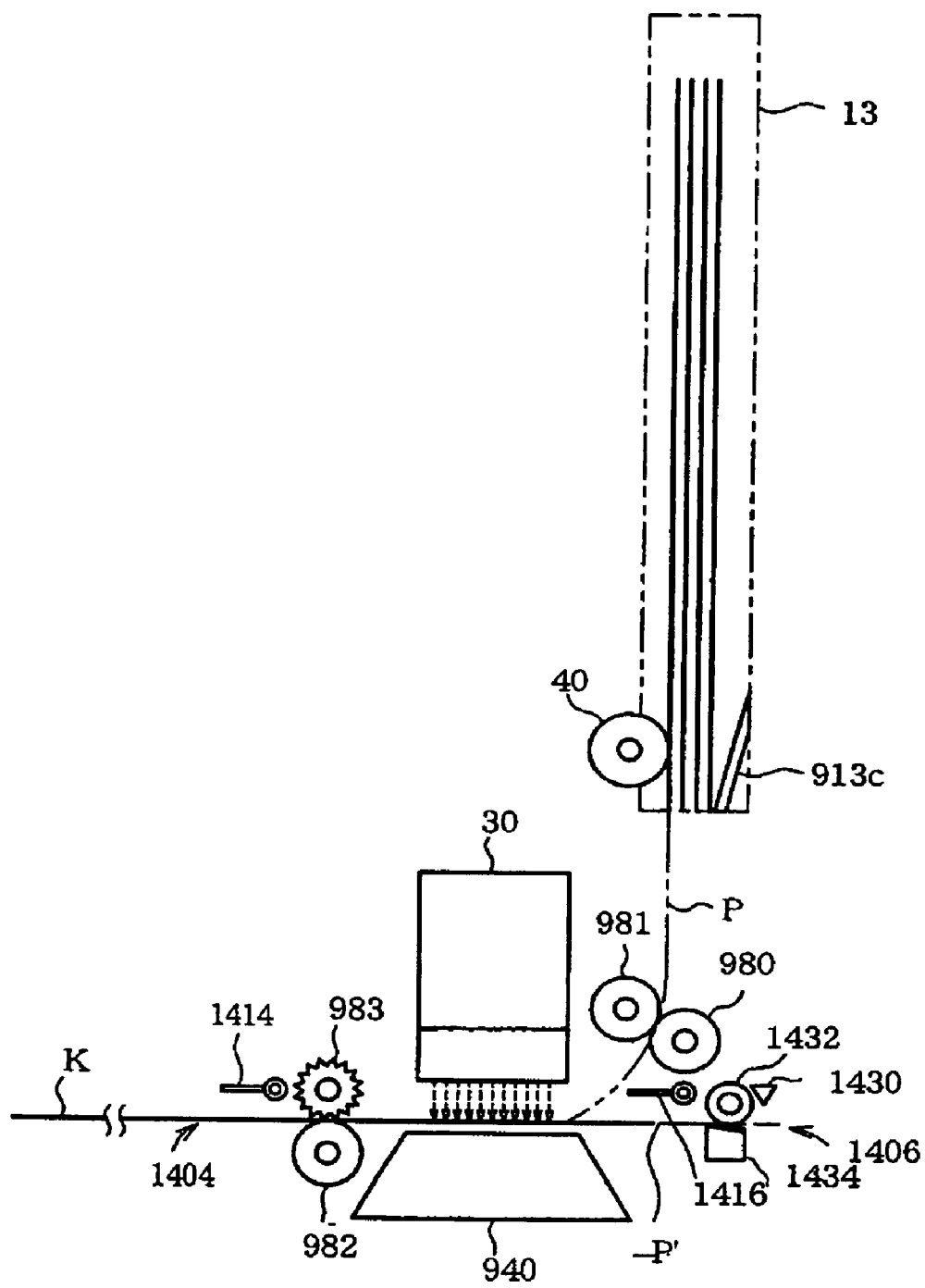
FIG. 35 is still another schematic diagram illustrating how the manually inserted recording medium K is fed.

The recording medium K fed out into the pathway P' is further transferred to enter the pathway P, and when a front end of the recording medium K reaches a recording area of the line head 30, the recording medium K is intermittently fed by the feed-in roller 1432 by a predetermined linefeed width on the platen 940. Each time the recording medium K is fed by the linefeed width, the line head 30 is scanned across the width of the recording medium. In this way, the image recording is implemented from a front side of the recording medium K. The front side portion of the recording medium where the image has been recorded is then pinched between the feeder roller 982 and the gear roller 983, as shown in FIG. 35, and the recording medium is intermittently fed by the predetermined linefeed width while the recording by the line head 30 is repeated. When the recording medium K is further fed, a rear end portion of the recording medium K is released from the nip between the feed-in roller 1432 and the sheet guide 1434, and the recording medium K is further intermittently fed by being nipped between the feeder roller 982 and the gear roller 983, by the linefeed width while the recording is continued by the line head 30.

When image recording is thus performed by the line head 30, the front end portion of the recording medium K projects through the recording medium outlet 1404 to the outside of the housing 2a, as shown in FIG. 35. Since the outlet shutoff valve 1414 is turned to the downstream side to be placed in the open position to open the pathway P as described above, the recording medium K is allowed to project to the outside through the recording medium outlet 1404. Although not shown in FIG. 35, a rear end portion of the recording medium K is similarly allowed to project through the recording medium inlet 1406 since the inlet shutoff valve 1416 is in the open state.

After the recording across an entire predetermined recording area in the recording medium K is complete, the feeder roller 982 is continuously rotated so that the recording medium K as nipped between the feeder roller 982 and gear roller 983 is ejected through the recording medium outlet 1404. When recording on a predetermined number of recording media is complete, the central processing portion 1451 cuts off the driving forces of the motors to the outlet shutoff valve 1414 and the inlet shutoff valve 1416 to allow free displacement of these shutoff valves 1414, 1416. Thus, the outlet shutoff valve 1414 which has been placed in the open state to keep the pathway P open, and the inlet shutoff valve 1416 which has been placed in the open state to keep the pathway P' open, are both turned to the upstream side by the biasing forces of the biasing members, to be placed back in their closing positions to close the pathways P, P'. Thus, the recording medium outlet 1404 and the recording medium inlet 1406 are closed to prevent foreign matter from entering the housing 2a.

According to the multifunctional apparatus 1400, the recording medium outlet 1404 is opened only when a recording medium K is to be ejected, and the recording medium inlet 1406 is opened only when a recording medium K is to be fed in. Otherwise, the recording medium outlet and inlet 1404, 1406 are respectively closed by the outlet shutoff valve 1414 and the inlet shutoff valve 1416, so as to prevent introduction of foreign matter into the housing 2a through the recording medium outlet and inlet 1404, 1406. Since the outlet and inlet shutoff valves 1414, 1416 are automatically changed in position in correspondence with feeding of the recording medium K, it is prevented that the recording medium K be fed with the outlet shutoff valve 1414 or the inlet shutoff valve 1416 undesirably kept in the closing state, and that the outlet shutoff valve 1414 or the inlet shutoff valve 1416 be undesirably left in the open state when the printer portion 1402 is not used. In particular, in an apparatus where a recording medium outlet is formed in a front face of a housing of a printer portion while a recording medium inlet is formed in a rear surface of the housing, like in the multifunctional apparatus 1400, a recording mechanism constituted by the line head is disposed in the vicinity of the recording medium outlet 1404 and the recording medium inlet 1406, making the effect of preventing introduction of foreign matter significant.

In the present embodiment, when an image is recorded, the outlet shutoff valve 1414, and the inlet shutoff valve 1416 also where appropriate, namely, where the recording medium K is fed in from the recording medium inlet 1406, receive(s) a driving force of a motor so that the outlet shutoff valve 1414, and the inlet shutoff valve 1416 where appropriate, is/are turned by the driving force to the downstream side against the biasing force, so as to open the pathway P, and the pathway P' also where appropriate. After image recording is complete, the driving force is cut off to make the outlet shutoff valve 1414, and the inlet shutoff valve 1416 also where appropriate, freely displaceable so as to place the outlet shutoff valve 1414, and the inlet shutoff valve 1416 also where appropriate, in the closing state by the biasing force of the biasing member.

However, it may be adapted such that the outlet shutoff valve 1414 and the inlet shutoff valve 1416 do not receive a driving force of a motor, but the recording medium K as has been brought into contact with the outlet shutoff valve 1414 or the inlet shutoff valve 1416 is further fed while kept in contact with the valve 1414 or 1416, so as to turn the outlet shutoff valve 1414 or the inlet shutoff valve 1416 to the downstream side of the pathway P against the biasing force of the biasing member. This arrangement will be described in detail below, as a fifteenth embodiment of the invention.

Further, it may be adapted such that the change in position of each of the outlet shutoff valve 1414 and the inlet shutoff valve 1416 in both of a direction from the open state to the closing state, and a direction from the closing state to the open state may be made by a driving force of a motor.

Referring to FIGS. 36-39, there will be now described a multifunctional apparatus according to a fifteenth embodiment of the invention, as briefly mentioned above. The fifteenth embodiment is similar to the fourteenth embodiment, except that in this embodiment the outlet shutoff valve 1414 and the inlet shutoff valve. 1416 do not receive a driving force of a motor, but a change in position of the outlet and inlet shutoff valves 1414, 1416 is made by a biasing force of a biasing member and contact between a recording medium and each shutoff valve 1414, 1416. The parts or elements corresponding to those in the fourteenth embodiment will be denoted by the same reference numerals and description thereof is omitted.

Figure 36:
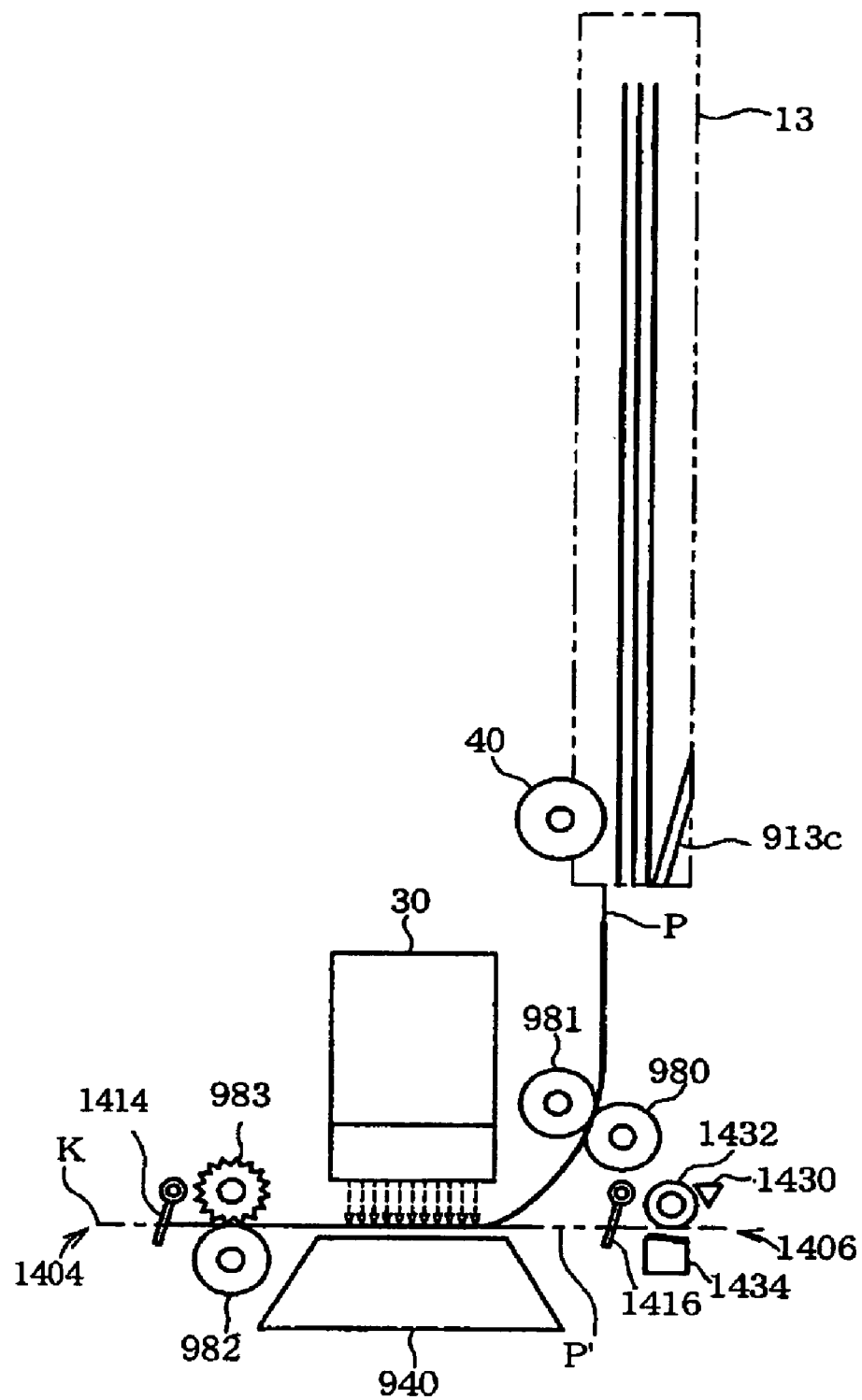
FIG. 36 is a schematic diagram illustrating how a recording medium K is fed from a recording medium holder, in a multifunctional apparatus according to a fifteenth embodiment of the invention.
Figure 37:
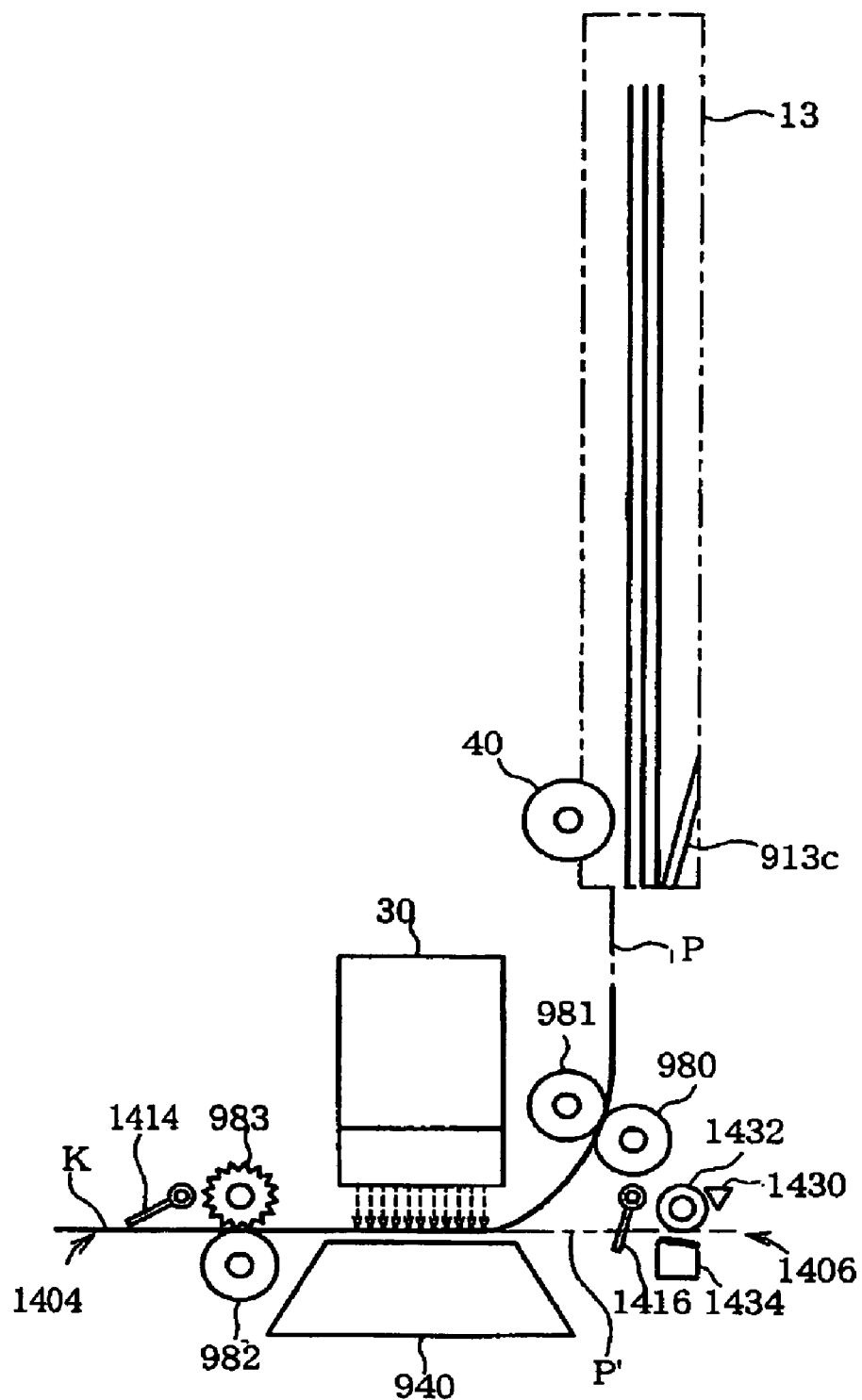
FIG. 37 is another schematic diagram illustrating how the recording medium K is fed.

Since the driving force is not transmitted to the outlet shutoff valve 1414 and the inlet shutoff valve 1416, in a case where an image is recorded on a recording medium K supplied from the recording medium holder 913, a front end of the recording medium K on which the image has been recorded by the line head 30 and nipped between the feeder roller 982 and the gear roller 983 is brought into contact with the outlet shutoff valve 1414 as currently closing the pathway P, as shown in FIG. 36. The recording medium K is further fed by the feeder roller 982 and the gear roller 983 with the front end of the recording medium K in contact with the outlet shutoff valve 1414 to turn the outlet shutoff valve 1414 to the downstream side of the pathway P against the biasing force, as shown in FIG. 37. In this way, the outlet shutoff valve 1414 is changed from the closing state to the open state, and the recording medium K is further fed through the recording medium outlet 1404. After the recording medium K is completely ejected, the outlet shutoff valve 1414 is returned to the closing state from the open state by the biasing force of the biasing member, thereby closing the pathway P.

Figure 38:
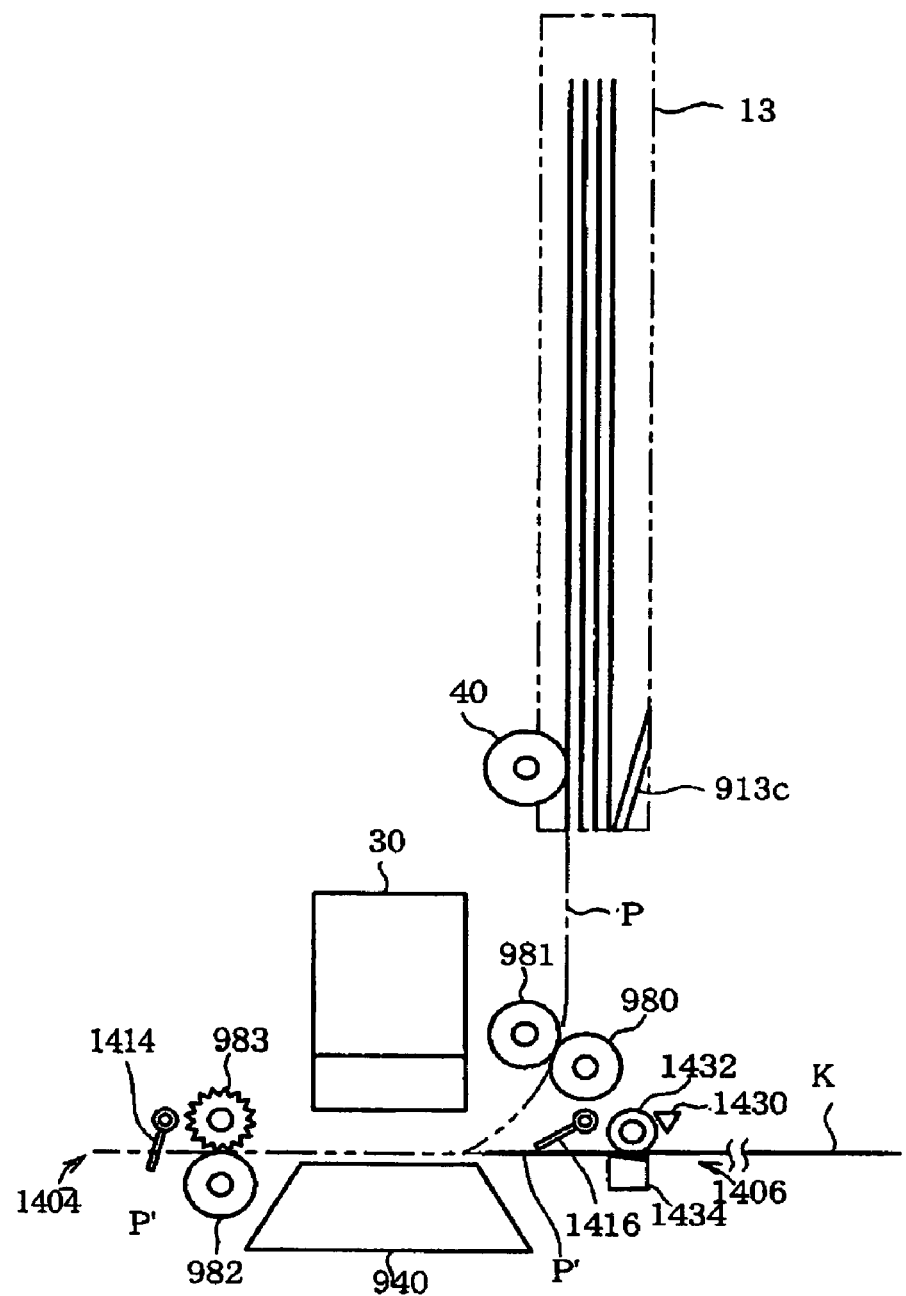
FIG. 38 is a schematic diagram illustrating how a recording medium K manually inserted through a recording medium inlet is fed, in the multifunctional apparatus.

There will be described a case where an image is to be recorded on a recording medium K as manually fed in through the recording medium inlet 1406. Initially, the recording medium K set at the recording medium inlet 1406 is fed into the pathway P' by the feed-in roller 1432, and a front end of the recording medium K is brought into contact with the inlet shutoff valve 1416 currently closing the pathway P'. The recording medium K is further fed by the feed-in roller 1432 so as to push and open the inlet shutoff valve 1416 by its front end, that is, turn the inlet shutoff valve 1416 to the downstream side of the pathway P' against the biasing force. Thus, the position of the inlet shutoff valve 1416 is changed from the closing position to the open position. The recording medium K is then fed onto the platen 940, as shown in FIG. 38.

Figure 39:
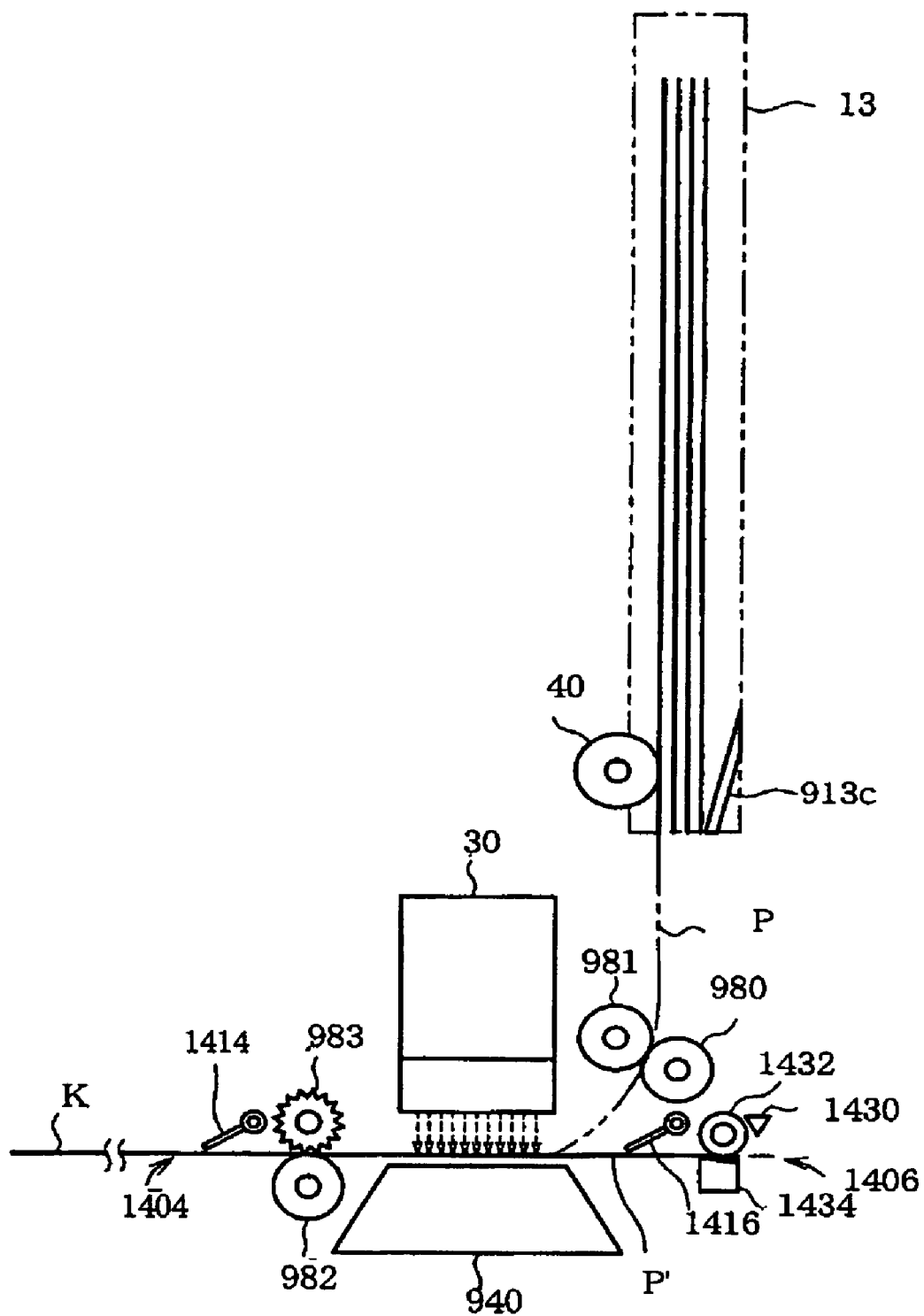
FIG. 39 is another schematic diagram illustrating how the manually inserted recording medium K is fed.

Thereafter, as image recording is performed by the line head 30, the front end of the recording medium K enters a nip between the feeder roller 982 and the gear roller 983, and is brought into contact with the outlet shutoff valve 1414 currently closing the pathway P. As the recording medium K is further fed by the feeder roller 982 and the gear roller 983 with the front end held in contact with the outlet shutoff valve 1414, the front end pushes and opens the outlet shutoff valve 1414, that is, turns the outlet shutoff valve 1414 to the downstream side of the pathway P against the biasing force, in a similar way as described above. Thus, the outlet shutoff valve 1414 is changed from the closing position to the open position, and the recording medium K is ejected through the recording medium outlet 1404, as shown in FIG. 39. At the moment when a rear end of the recording medium K has passed the pathway P', the inlet shutoff valve 1416 is let return to the closing position by the biasing force of the biasing member to close the pathway P', and thereafter when the recording medium K has been ejected to the outside of the apparatus, the outlet shutoff valve 1414 is let return to the closing position by the biasing force of the biasing member to close the pathway P.

In this embodiment where a driving force of a motor is not transmitted to the outlet shutoff valve 1414 and the inlet shutoff valve 1416 and the recording medium K brought into contact with the outlet shutoff valve 1414 or the inlet shutoff valve 1416 is fed on so as to turn the outlet shutoff valve 1414 or the inlet shutoff valve 1416 to the downstream side of the pathway P, P' against the biasing force of the biasing member, the recording medium outlet 1404 is opened only when the recording medium K is to be ejected and the recording medium inlet 1406 is opened only when the recording medium K is fed in, and otherwise the recording medium outlet and inlet 1414, 1416 are kept closed by the outlet shutoff valve 1414 and the inlet shutoff valve 1416, respectively. Thus, introduction of foreign matter into the housing 2a through the recording medium outlet 1404 and the recording medium inlet 1406 is prevented.

In the fourteenth and fifteenth embodiments, each of the outlet shutoff valve 1414 and the inlet shutoff valve 1416 may be replaced with a flexible film elastically deformable, such as one made of synthetic resin, which is disposed to obliquely protrude from a surface defining the pathway P, P' toward the downstream side of the pathway P, P' so that an end of the flexible film contacts a surface defining the pathway P, P' opposite to a side from which the flexible film protrudes. The flexible film is deformable toward the downstream side, but not toward the upstream side. By this arrangement, too, the same operation and effects as described above with respect to the fifteenth embodiment can be obtained. However, a synthetic resin film or the like may be unrecoverably deformed upon insertion of a document or others. Hence, a thin plate member which does not easily deformed by an inserted recording medium, document, or others, like the outlet shutoff valve 1414 and the inlet shutoff valve 1416, is preferably employed as a shutoff valve.

The following is a brief description of the construction common to the fourteenth and fifteenth embodiments, as written in the form similar to the appended claims, and the effects obtained thereby.

An image processing apparatus comprising:

a housing having an opening and a pathway which extends inside the housing from the opening, the opening serving as at least one of an inlet through which one of a recording medium and a document is fed into the housing, and an outlet through which the one of the recording medium and the document is ejected to the outside of the housing; and a pathway shutoff valve changeable in position between a closing position to close the pathway, and an open position to open the pathway.

In the image processing apparatus, the pathway shutoff valve is placed in its closing position to close the opening, so as to prevent introduction of foreign matter such as dust, dirt and insect, into the housing. By placing the pathway shutoff valve in the open position, the opening is opened, thereby allowing passage of said one of the recording medium and the document from or into the pathway through the opening upon ejection or supply of said one of the recording medium and the document.

According to this apparatus, a malfunction due to foreign matter introduced into the housing is prevented, thereby ensuring stable image recording or reading. In an image processing apparatus of the type standing substantially upright, it is often the case that the apparatus is placed on a floor when used or stored. In such an apparatus, the effects of the present arrangement are particularly significant.

There will be now described a multifunction apparatus according to a sixteenth embodiment, by referring to FIGS. 40-50.

Figure 40:
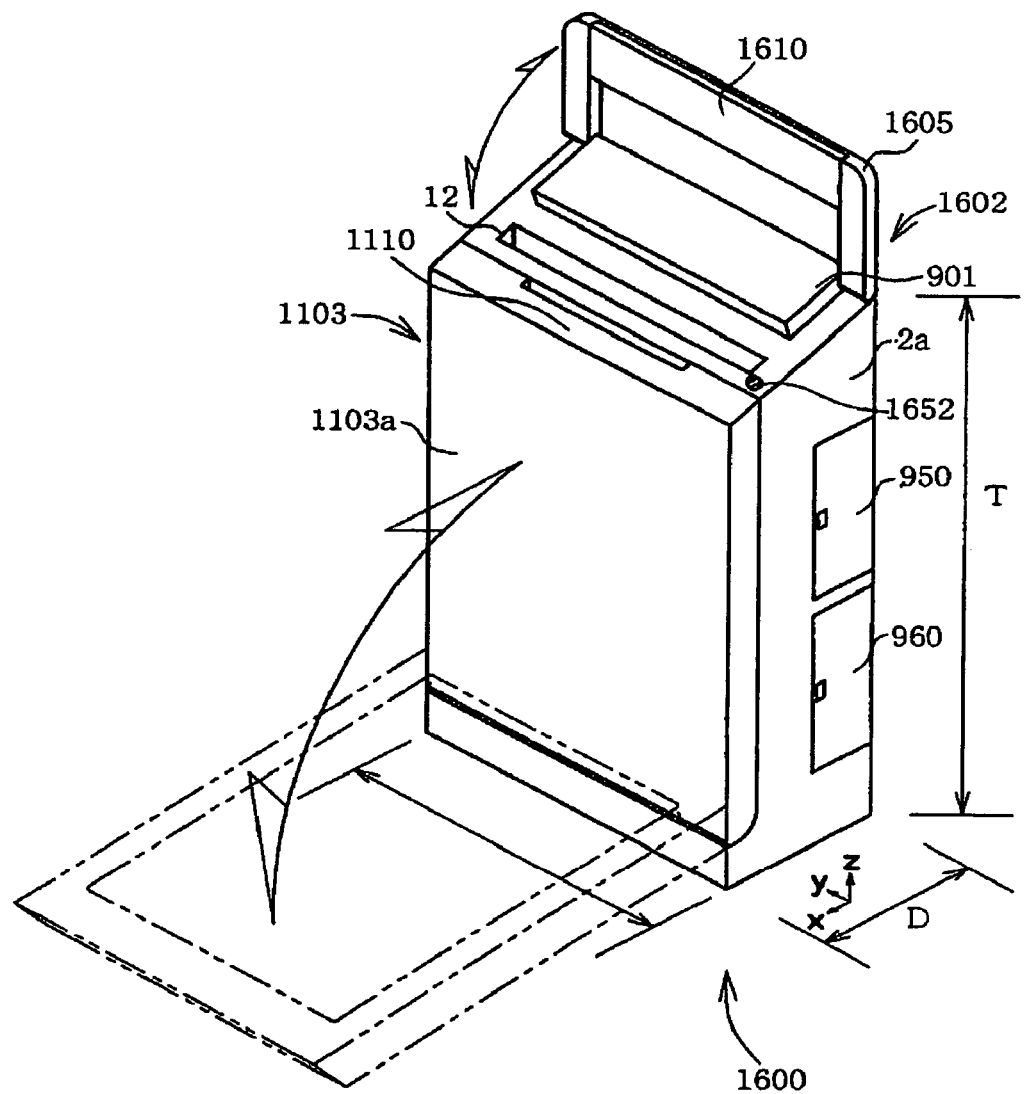
FIG. 40 is an external perspective view of a multifunctional apparatus according to a sixteenth embodiment of the invention.

In FIG. 40, reference numeral 1600 generally denotes a multifunctional apparatus according to the sixteenth embodiment. A general structure of the multifunctional apparatus 1600 is almost the same as that of the multifunctional apparatus 1100 of the eleventh embodiment, and thus only a different part will be described. The reference numerals used for the eleventh embodiment denote the corresponding parts or elements, and description thereof is not provided.

The multifunctional apparatus 1600 has a printer portion 1602 including a housing 2a in which is formed a generally U-shaped pathway along which a recording medium K is fed. The pathway extends from a recording medium holder 913 to a recording medium outlet 12 open in an upper surface of the housing 2a.

A lid member 1605 having a U-like shape is disposed on an upper portion of the printer portion 1602 to be pivotable around an axis provide by two end portions of the U-shaped lid member 1605 so that the lid member 1605 can be folded down onto the upper surface of the housing 2a and raised upright. As has been described with respect to the lid member 5 of the other embodiments, the lid member 1605 is shaped to not interfere with an operator panel 901 which is also disposed on the upper surface of the housing 2a. That is, the operator panel 901 is positioned inside the U-shaped lid member 1605 when the lid member 1605 is folded down. In this way, the operator panel 901 and the lid member 1605 can be arranged in the upper surface of the housing 2a although an area of this upper surface is relatively small since the multifunctional apparatus 1600 is of the type standing substantially upright. When the multifunctional apparatus 1600 is to be used, the lid member 1605 is raised to stand from the upper surface of the housing 2a, as shown in FIG. 40, to serve as a handle to be gripped by a user upon carrying of the apparatus 1600. When the multifunctional apparatus 1600 is not used, the lid member 1605 is turned downward onto the upper surface of the housing 2a, closing the recording medium outlet 12, thereby preventing introduction of foreign matter such as dust and dirt into the housing 2a.

In a surface of the lid member 1605 which is opposed to the upper surface of the housing 2a when the lid member 1605 closes the recording medium outlet 12, there is disposed a screen display 1610 on which information such as ON/OFF state of the multifunctional apparatus 1600, error indication, and data reception is presented. The screen display 1610 may be constituted by a liquid crystal panel or an LED, for instance. By disposing the screen display 1610 in the form of a liquid crystal panel or others in the lid member 1605, a space for the screen display 1610 is made unnecessary in a surface of the housing 2a, thereby enabling to reduce the size of the multifunctional apparatus 1600. In particular, in a multifunctional apparatus of the type where a housing thereof is thin and box-shaped and stands substantially upright, like the multifunctional apparatus 1600, the upper surface of the housing 2a is inevitably small and the effect of the present arrangement is significant. In addition, by disposing the screen display 1610 in the lid member 1605, the operator panel 901 and the screen display 1610 are located near each other, that is, collected around the upper surface of the housing 2a, ensuring a high usability when the multifunctional apparatus 1600 is placed on a floor. Further, when the lid member 1605 is folded down onto the upper surface of the housing 2a, the screen display 1610 is covered and protected by the upper surface of the housing 2a, thereby preventing adhesion of foreign material such as dirt and dust to the screen display 1610 and damage of the screen display 1610.

The multifunctional apparatus 1600 has a scanner portion 1103 capable of functioning as a flat bed scanner. The structure of the scanner portion 1103 and connection between the scanner portion 1103 and the printer portion 1602 are the same as those described above with respect to the eleventh embodiment, and not described here.

Figure 41:
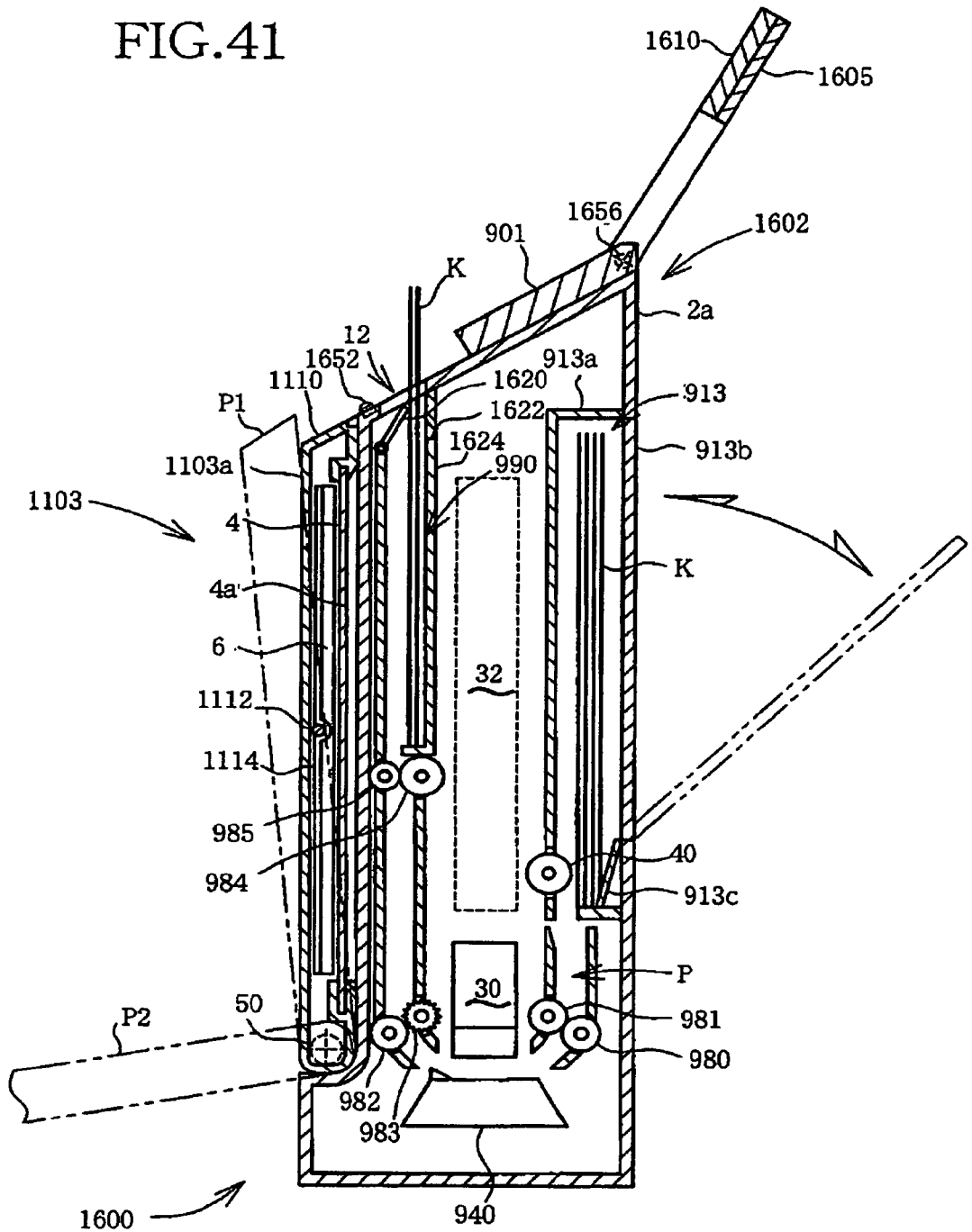
FIG. 41 is a cross-sectional view of an internal structure of the multifunctional apparatus.

FIG. 41 shows an internal structure of the multifunctional apparatus 1600, which is basically the same as that of the eleventh embodiment. However, the multifunctional apparatus 1600 of this embodiment further comprises a pathway shutoff valve 1620.

The pathway shutoff valve 1620 is disposed in a pathway P and in the vicinity of the recording medium outlet 12, as shown in FIG. 41, and switchable between an open position to open the pathway P, and a closing position to close the pathway P. More specifically, the pathway shutoff valve 1620 is a thin plate member having a width substantially the same as that of the pathway P, and disposed at a position in the pathway P near the recording medium outlet 12 and at a side opposed to a catch tray 990, such that the pathway shutoff valve 1620 protrudes to normally close the pathway P by being turned around an axis by being biased toward the upstream side of the pathway P by a biasing member such as a spring (not shown). An end of the pathway shutoff valve 1620 engages a receiving portion 1622 which is a recess formed in a partition plate 1624 of the catch tray 990 opposed to the pathway shutoff valve 1620. That is, the pathway shutoff valve 1620 is normally biased toward the upstream side of the pathway P and received by the receiving portion 1622 to be placed in a closing position to close the pathway P.

Figure 42:
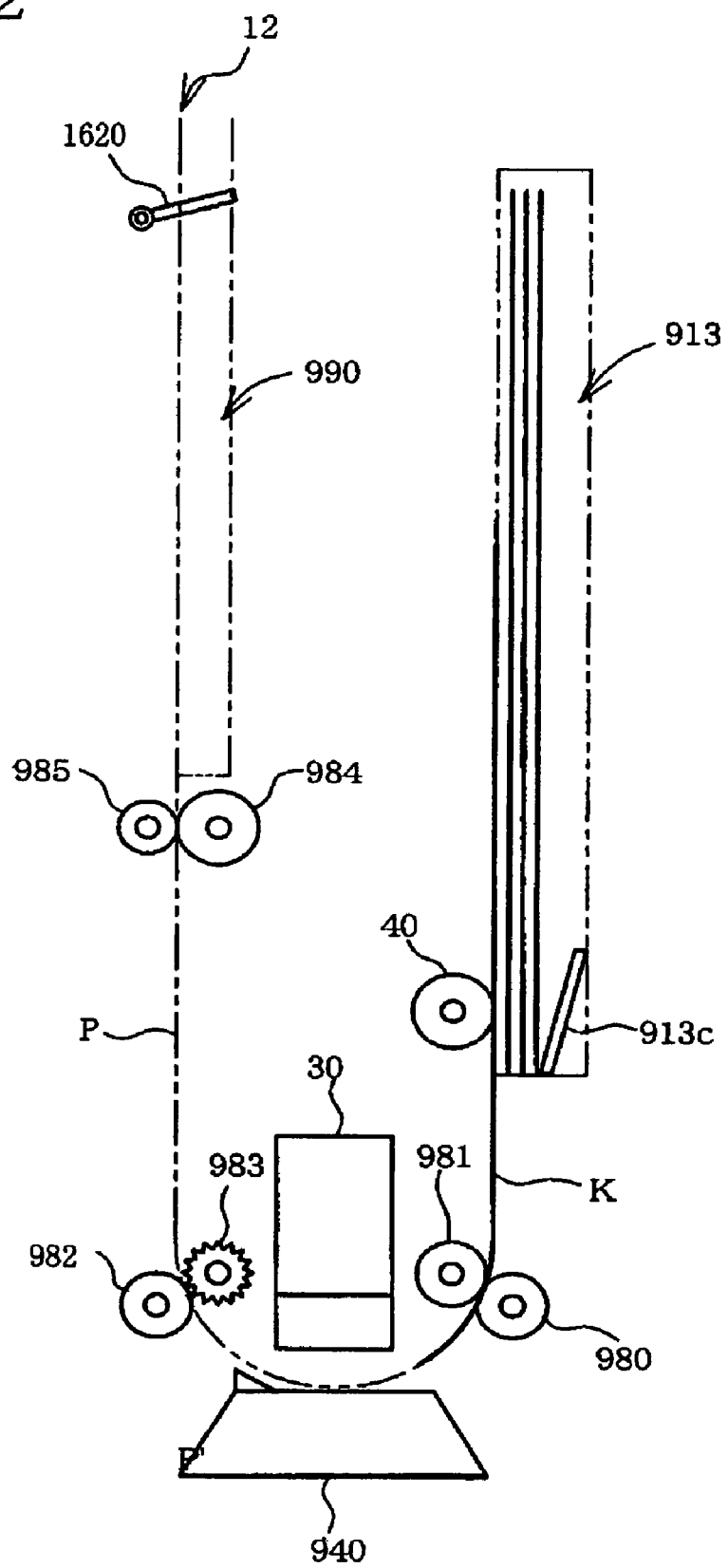
FIGS. 42-46 schematically illustrate how a recording medium is fed along a pathway in the multifunctional apparatus.

The pathway shutoff valve 1620 is placed in its open position when a recording medium K fed along the pathway P is brought into contact with the pathway shutoff valve 1620 and further fed on. More specifically, while a recording medium K is not near the recording medium outlet 12 as an end of the pathway P, as shown in FIG. 42, the pathway shutoff valve 1620 is kept engaged with or received by the receiving portion 1622 to close the pathway P. Hence, even when the lid member 1605 does not close the recording medium outlet 12, the pathway shutoff valve 1620 prevents introduction of foreign matter into the housing 2a through the recording medium outlet 12.

Figure 43:
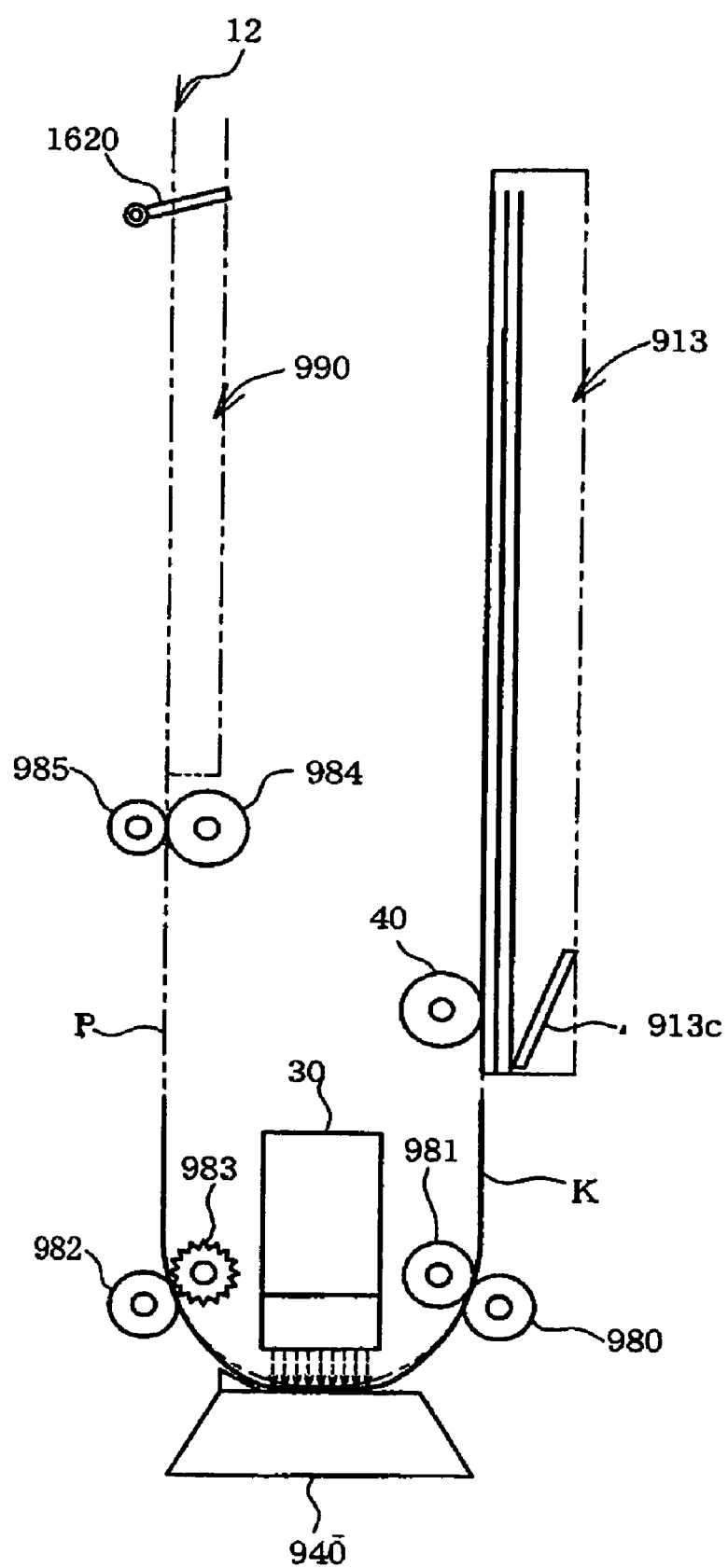
Figure 44:
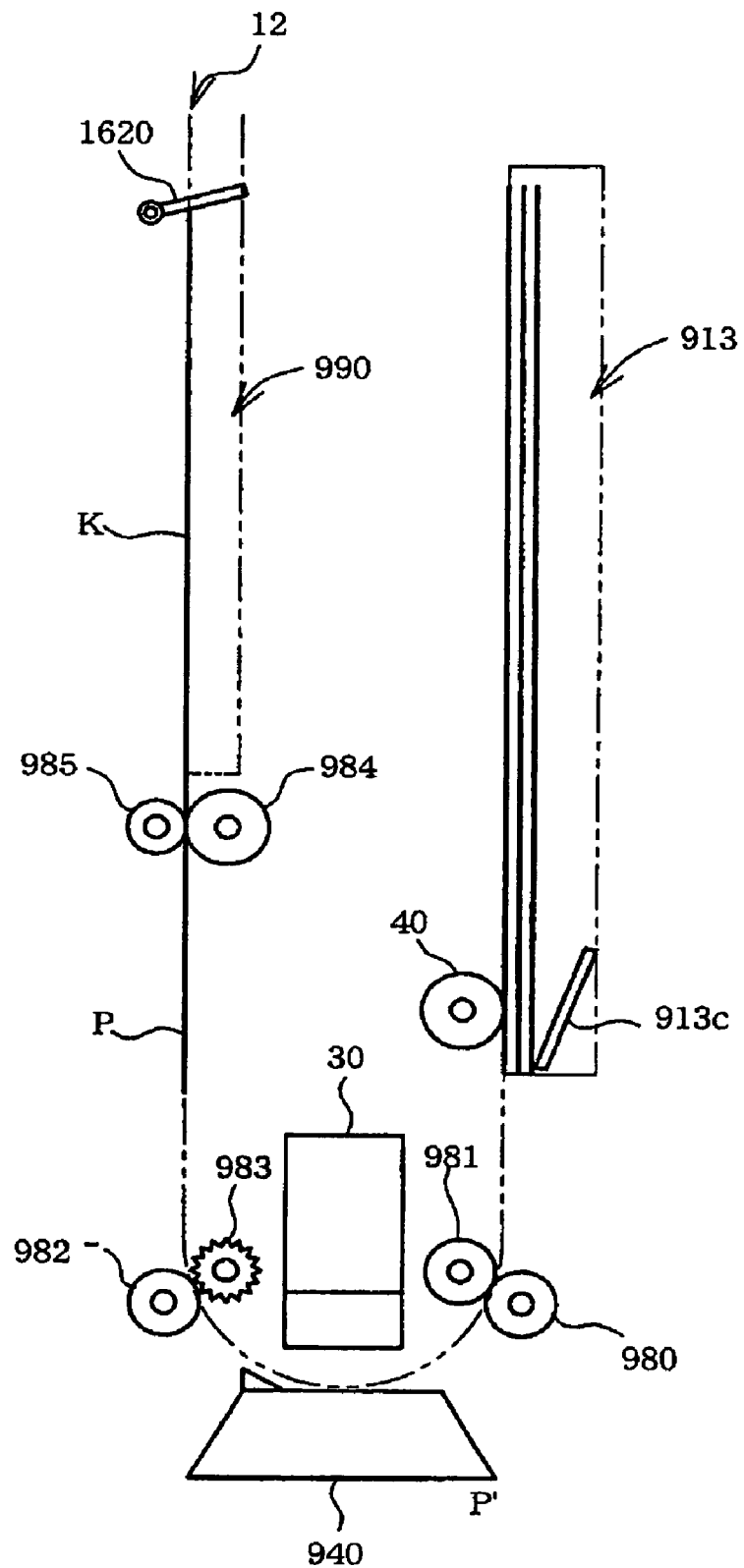
Figure 45:
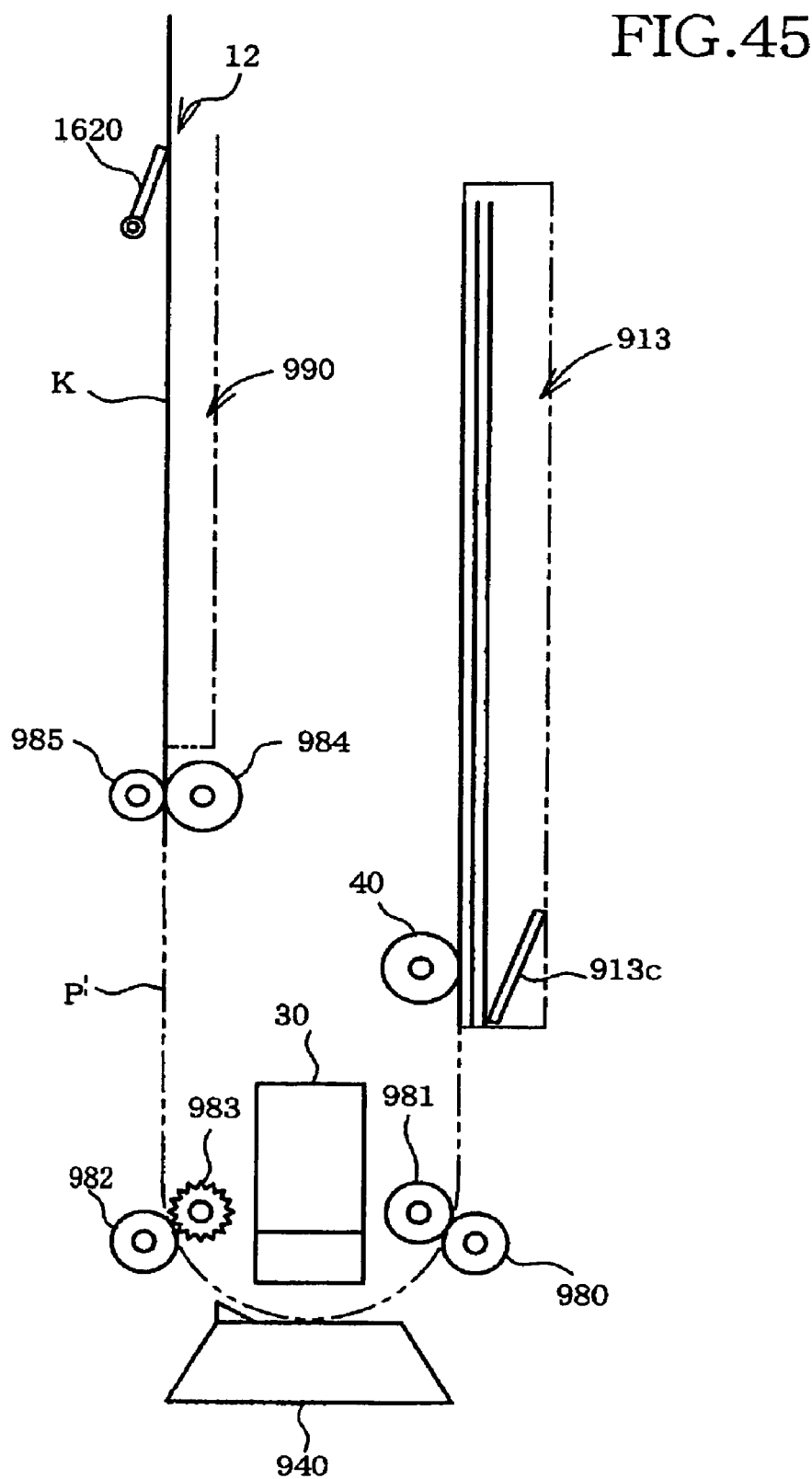
Figure 46:
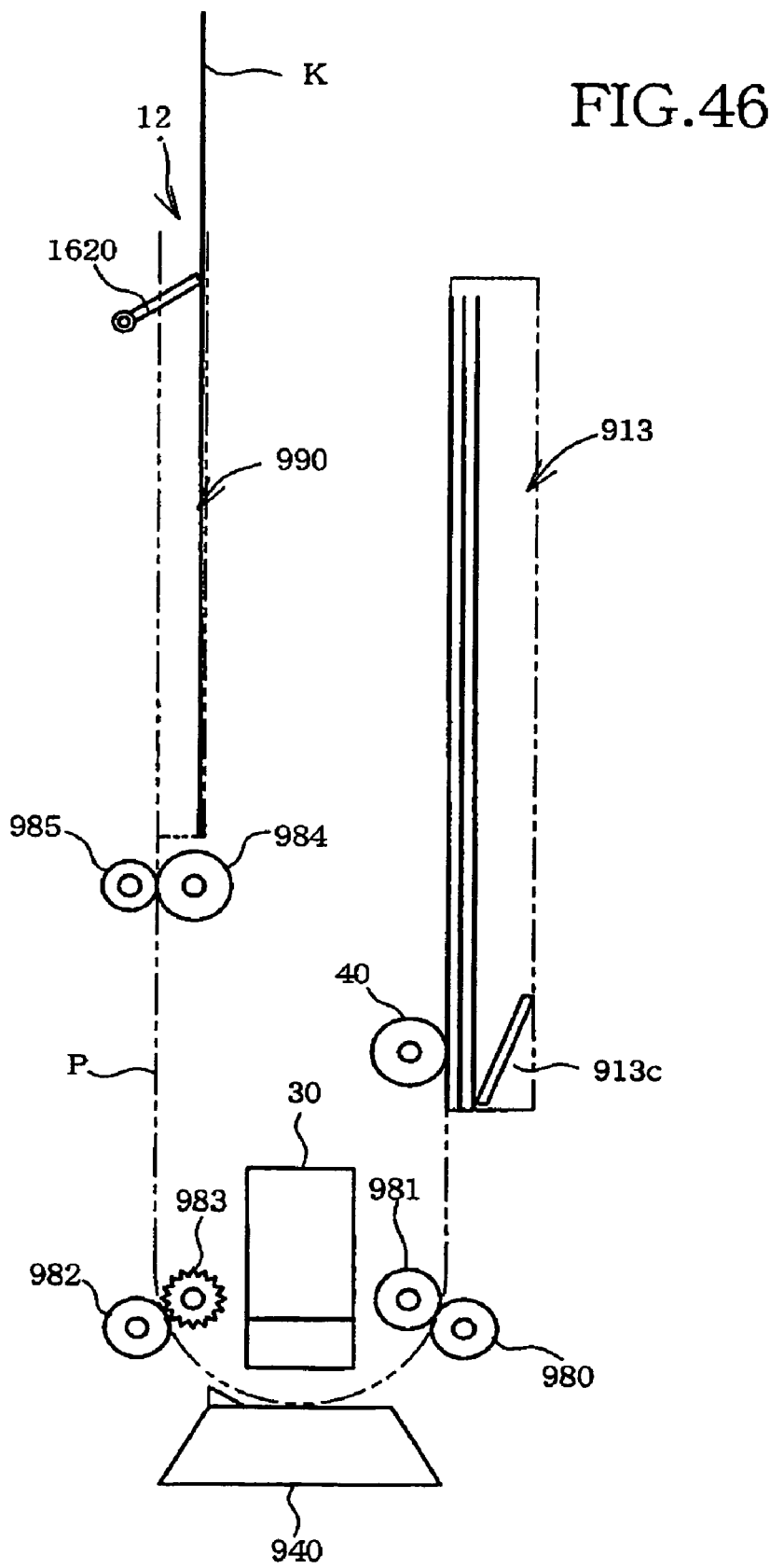

After an image has been recorded on the recording medium K by a line head 30, a feeder roller 982 and a gear roller 983 feed upward the recording medium K in an upright position along the pathway P as shown in FIG. 43, and then a recording-medium ejecting roller 984 and a presser roller 985 feed the recording medium K until a front end portion of the recording medium K projects from the recording medium outlet 12. Before reaching the recording medium outlet 12, the front end of the recording medium K is brought into contact with the pathway shutoff valve 1620 currently closing the pathway P, as shown in FIG. 44. The recording medium K fed by the recording-medium ejecting roller 984 and the presser roller 985 further proceeds with a front end thereof in contact with the pathway shutoff valve 1620, to push and turn the pathway shutoff valve 1620 to the downstream side of the pathway P against the biasing force of the biasing member. Thus, the pathway shutoff valve 1620 is changed in position from the closing position to the open position, and the recording medium K is further fed to and through the recording medium outlet 12.

The recording medium K is fed by the recording-medium ejecting roller 984 and the presser roller 985 until the front end portion of the recording medium K projects from the recording medium outlet 12, and when a rear end of the recording medium K has passed the nip between the recording-medium ejecting roller 984 and the presser roller 985, the recording medium K is pushed into the catch tray 990. Thus, the pushing force from the recording medium K as fed by the recording-medium ejecting roller 984 and the presser roller 985 is eliminated, and the pathway shutoff valve 1620 returns to the upstream side by the biasing force of the biasing member. The recording medium K is moved in the catch tray 990 toward an internal side by being pushed by the pathway shutoff valve 1620, thereby forming a space for accumulating subsequent recording media K coming to the recording medium outlet 12 after an image is recorded thereon. That is, image recording is sequentially performed for respective recording media E and thus the recording media K are sequentially pushed into the catch tray 990 as shown in FIG. 41, to be stacked one by one on an outermost recording medium K or the last stacked medium K, with a side of each recording medium, on which the image is recorded, facing the internal side. Hence, the recording media K are accommodated in an accumulated manner in an order in which the image recording has been performed. This frees the user of the trouble to change the order of the ejected recording media K.

In this way, even when the lid member 1605 does not cover the recording medium outlet 12 while image recording is not performed and a recording medium K is not fed along the pathway P, the pathway shutoff valve 1620 closes the pathway P at the vicinity of the recording medium outlet 12, so as to prevent introduction of foreign matter into the housing 2a through the pathway P. On the other hand, while image recording is performed and a recording medium K is fed along the pathway P, the pathway shutoff valve 1620 is placed in the open position, allowing passage of the recording medium K to the recording medium outlet 12. Therefore, unless a recording medium K passes a portion of the pathway P near the recording medium outlet 12, the pathway shutoff valve 1620 keeps closing the pathway P, assuring that introduction of foreign matter into the housing 2a is prevented. Even if the user erroneously inserts a document into the pathway P through the recording medium outlet 12, instead of a slot or clearance of the scanner portion for inserting a sheet document to be scanned, the pathway shutoff valve 1620 inhibits the insertion of the document, thereby preventing an erroneous operation of the multifunctional apparatus 1600.

In this embodiment, the pathway shutoff valve 1620 may be replaced with a flexible film elastically deformable, such as one made of synthetic resin, which is disposed to obliquely protrude from a surface defining the pathway P toward the downstream side of the pathway P so that an end of the flexible film contacts a surface opposite to the surface from which the flexible film protrudes. The flexible film is deformable toward the downstream side, but not toward the upstream side. By this arrangement, too, the same operation and effect as described above with respect to the sixteenth embodiment can be obtained. However, a synthetic resin film or the like may be unrecoverably deformed upon insertion of a document or others, and thus a thin plate member which does not easily deformed by an inserted recording medium, document, or others, such as the outlet shutoff valve 1414 and the inlet shutoff valve 1416, is preferably employed as a pathway shutoff valve. Alternatively, there may be provided an adsorbing member and/or a recess for collecting the dust or others. The absorbing member adsorbs foreign matter such as dust and dirt accumulated at and around a supporting point or an axis of the pathway shutoff valve. An adsorbing member such as double-faced adhesive tape may be disposed on an upper surface of the pathway shutoff valve, to proactively adsorb foreign matter such as dust and dirt.

According to the sixteenth embodiment, the recording medium K is further fed after brought into contact with the pathway shutoff valve 1620, to turn the pathway shutoff valve 1620 to the downstream side of the pathway P against the biasing force of the biasing member. However, it may be adapted such that when image recording is performed, a driving force of a motor is transmitted to the pathway shutoff valve 1620 so as to turn the pathway shutoff valve 1620 by the driving force to the downstream side against the biasing force, and after the image recording the driving force is cut off to let the pathway shutoff valve 1620 freely turn, thereby returning the pathway shutoff valve 1620 to the upstream side. This arrangement reduces a load imparted on the recording medium K. Further, a change in position of the pathway shutoff valve in both directions, i.e., from the open position to the closing position, and from the closing position to the open position, may be made by a driving force of a motor.

As shown in FIG. 41, the scanner portion 1103 has a structure the same as that of the eleventh embodiment, and is connected to the printer portion 1602 in the same way as in the eleventh or fourteenth embodiment, and therefore description thereof are omitted.

Figure 47:
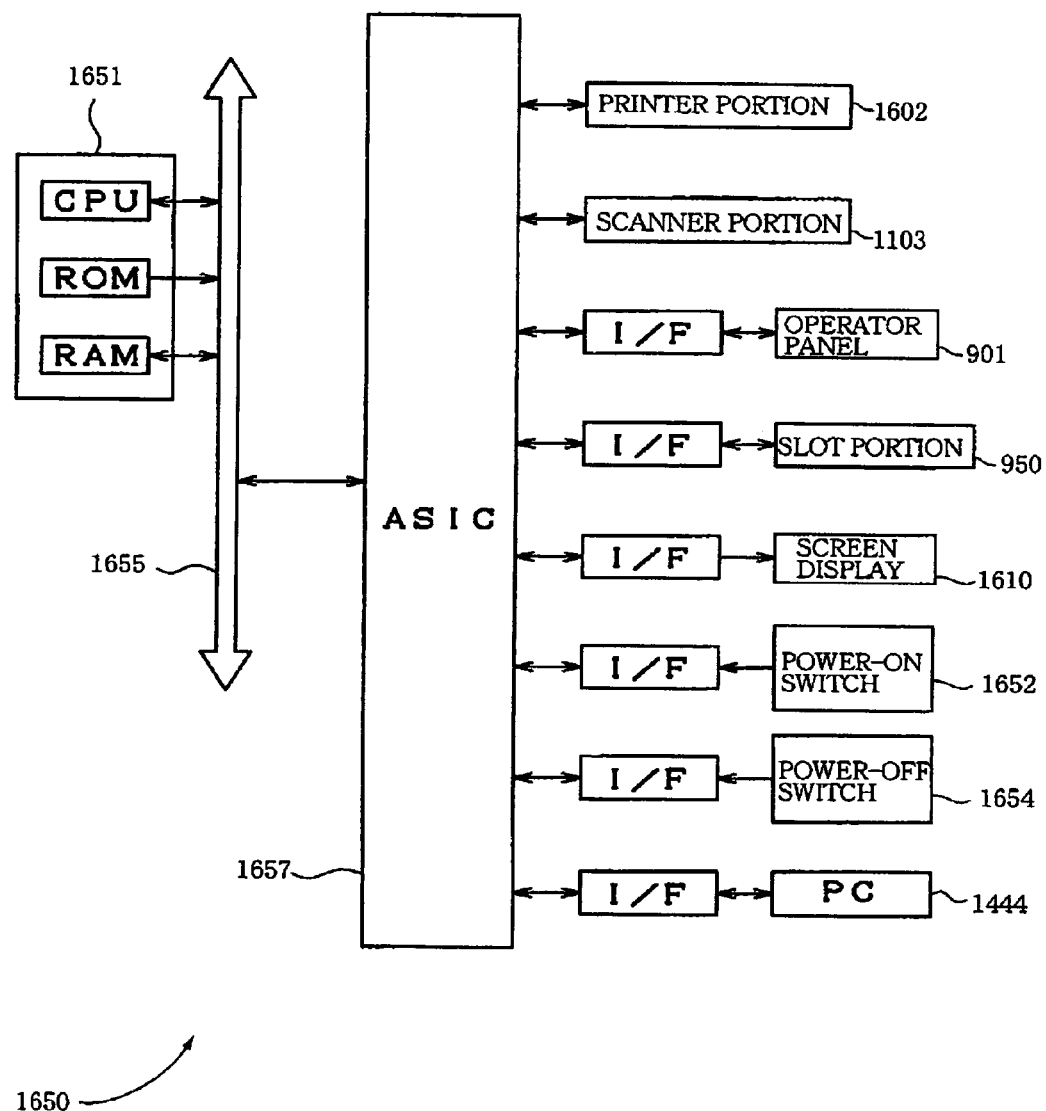
FIG. 47 is a functional block diagram of a control portion of the multifunctional apparatus.

FIG. 47 is a block diagram of a control portion 1650 constituted by the electrical components disposed in the arranging space 32 of the multifunctional apparatus 1400. As shown in FIG. 47, a central processing portion 1651 constituted by a CPU (Central Processing Unit), a ROM (Read Only Memory), a RAM (Random Access Memory) is connected to various sensors in the printer portion 1602 and the scanner portion 1103, motors, operator panel 901, slot portion 950, screen display 1610 and others, to be capable of data transfer, via a bus 1655 and an ASIC (Application Specific Integrated Circuit) 1655.

The central processing portion 1651 receives a detection signal from a power-on switch 1652 and a power-off switch 1654 to regulate the ON/OFF state of the multifunctional apparatus 1600. The power-on switch 1652 is turned ON/OFF in accordance with the position of the lid member 1605, and the power-off switch 1654 is turned ON/OFF in accordance with whether the lid member 1605 is pulled upward while the lid member 1605 is in the raised or open position. These switches 1652, 1654 will be fully described later.

The multifunctional apparatus 1600 is connected to a computer (PC) 1444, so that the apparatus 1600 can record an image or a document on a recording medium based on image data or document data transmitted from the computer 1444, as well as that inputted through the operator panel 901. Hence, the apparatus 1600 comprises an interface (I/F) for data transfer from and to the computer 1444. The construction of the control portion 1650 is described only by way of example, and it is to be understood that details of the control portion 1650 is not limited to those of the present embodiment.

There will be now described how the lid member 1605 operates.

As described above, the lid member 1605 is switchable in position between the closing position, namely, the position where the lid member 1605 is folded down onto the upper surface of the housing 2a to cover the recording medium outlet 12, and the open position where the lid member stands from the upper surface of the housing 2a to open the recording medium outlet 12. Such a change in position of the lid member 1605 is made by the user holding and turning the lid member 1605.

Figure 48:
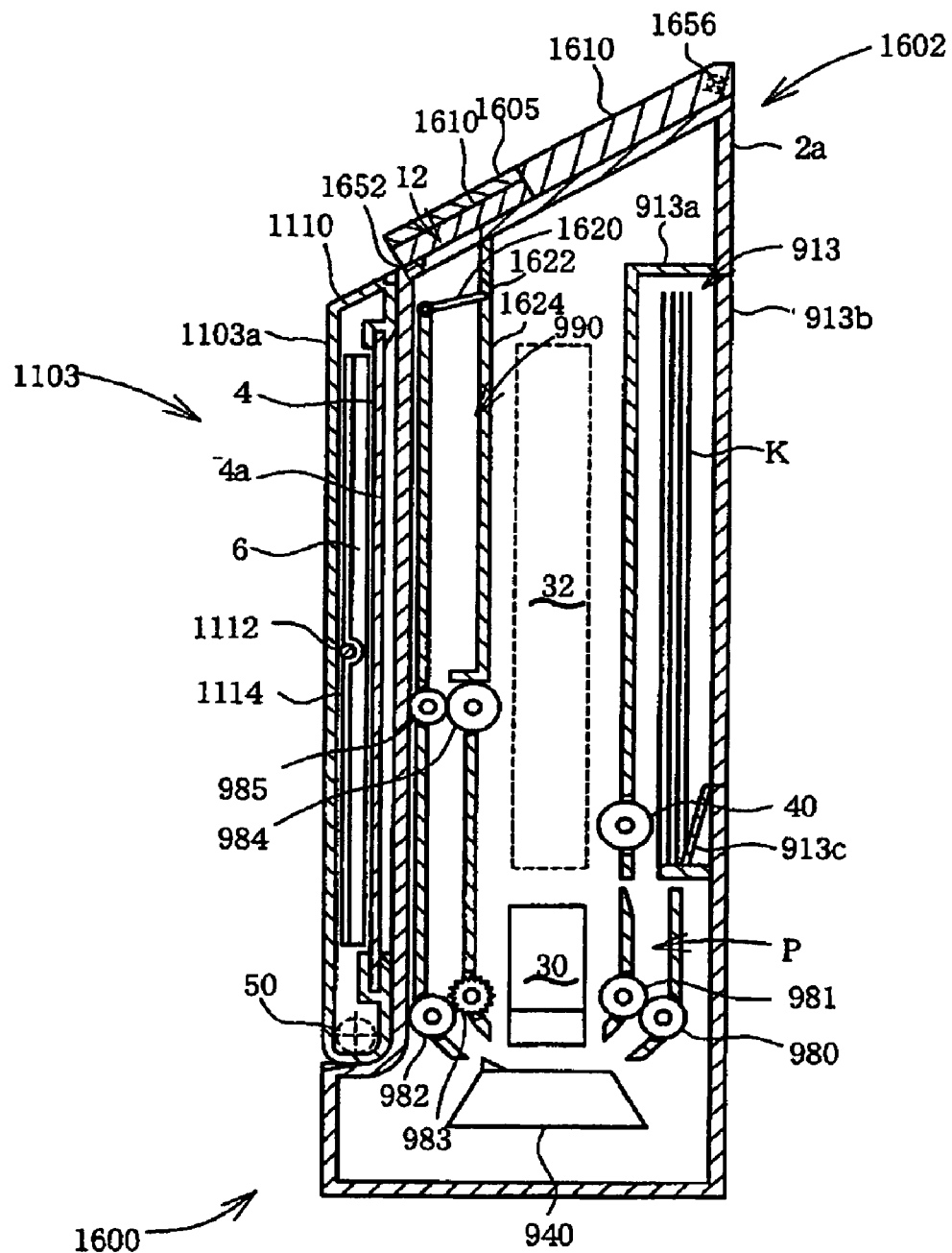
FIG. 48 is a vertical cross-sectional view of the multifunctional apparatus where a lid member is in a closing position.

FIG. 48 shows the multifunctional apparatus 1600 in a state where the lid member 1605 is in the closing position. When the multifunctional apparatus 1600 is not used, the lid member 1605 is held in this closed position. The lid member 1605 is turnable around a shaft 1656 supported at the vicinity of an upper end of the operator panel 901, and the closing position is established when the lid member 1605 is turned downward to the maximum, namely, to contact the upper surface of the housing 2a. In the closing position, the lid member 1605 closes the recording medium outlet 12, thereby preventing introduction of foreign matter into the housing 2a through the recording medium outlet 12. In particular, in a multifunctional apparatus of the type where a recording medium outlet is open in an upper surface of a housing, like the multifunctional apparatus 1600, foreign matter is tend to be introduced through the recording medium outlet 12, and thus the effect of preventing introduction of foreign matter is significant in such an apparatus.

As shown in FIGS. 40, 41 and 48-50, in the upper surface of the housing 2a and at the vicinity of the recording medium outlet 12, there is disposed the power-on switch 1652 which is normally biased to protrude from the upper surface of the housing 2a but retractable into the housing 2a. The power-on switch 1652 outputs a power-on signal to turn the multifunctional apparatus 1600 on, while the power-on switch 1652 protrudes from the upper surface of the housing 2a, and outputs a power-off signal to turn the apparatus 1600 off, while retracted. As shown in FIG. 48, when the lid member 1605 is placed in the closing position, the lid member 1605 pushes the power-on switch 1652 into the housing 2a, thereby outputting the power-off signal. The central processing portion 1651 receives the power-off signal from the power-on switch 1652, and turns off the multifunctional apparatus 1600.

When the user turns upward the lid member 1605 from the closing position to the open position as shown in FIG. 41, the power-on switch 1652 as has been pushed into the housing 2a by the lid member 1605 now protrudes from the upper surface of the housing 2a, thereby outputting the power-on signal. Thus, the central processing portion 1651 receives the power-on signal from the power-on switch 1652, and turns on the multifunctional apparatus 1600. In addition, placing the lid member 1605 in the open position opens the recording medium outlet 12, enabling to eject a recording medium K on which an image has been recorded such that the front end portion of the recording medium K projects from the recording medium outlet 12, as shown in FIG. 41.

In this way, the power-on switch 1652 is turned on/off by a change in position of the lid member 1605. In other words, the position of the lid member 1605 and the ON/OFF state of the multifunctional apparatus 1600 are correlative. Accordingly, it is prevented that image recording be performed with the lid member 1605 undesirably held in the closing position to close the recording medium outlet 12, and that the lid member 1605 is undesirably left in the open position while the multifunctional apparatus 1600 is held powered off. By placing the lid member 1605 in the open position, the recording medium outlet 12 is opened, to allow ejection of the recording medium K, that is, the front end portion of the recording medium K on which an image has been recorded is allowed to project from the recording medium outlet 12 to the outside. On the other hand, by placing the lid member 1605 in the closing position, the recording medium outlet 12 is closed, and introduction of foreign matter such as dust, trash and dirt into the housing 2a is prevented.

In the above-described embodiment, the power-on switch 1652 retractably protruding from the upper surface of the housing 2a functions to correlate the position of the lid member 1605 with the ON/OFF state of the multifunctional apparatus 1600, that is, the lid member 1605 serves as an element of a switch to detect the position of the lid member 1605, that is, the power-on switch 1652 and the lid member 1605 cooperate to function as a switch to detect the position of the lid member 1605. However, this arrangement is not essential. For instance, the power-on switch 1652 may be replaced by a magnet sensor which detects the position of the lid member 1605, and the central processing portion 1651 turns on/off the multifunctional apparatus 1600 based on a detection signal from the magnet sensor. Alternatively, an angle sensor may be disposed on the shaft 1656 to detect the position of the lid member, and the central processing portion 1651 turns on/off the multifunctional apparatus 1600 based on a detection signal from the angle sensor.

Figure 49:
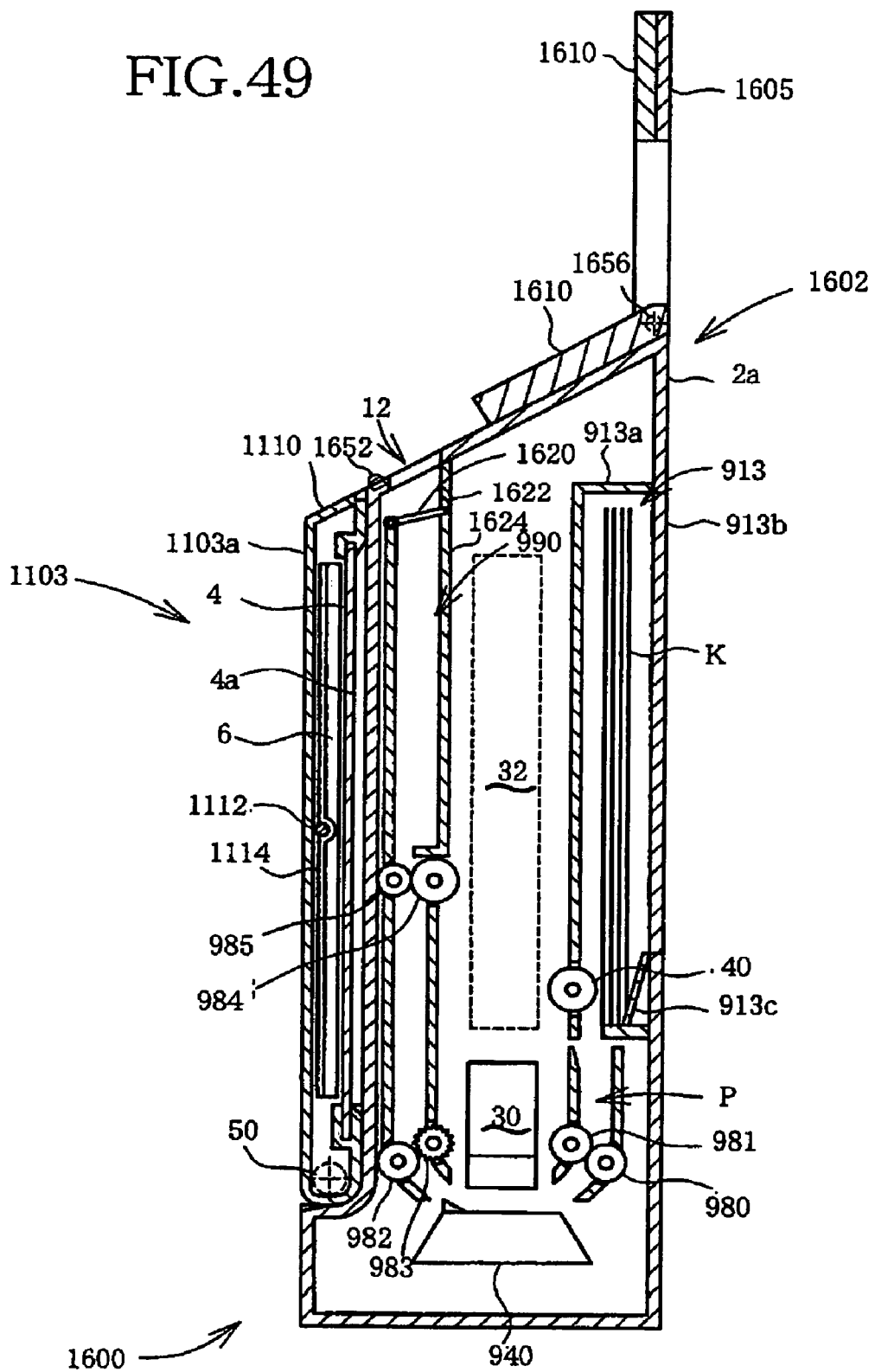
FIG. 49 is a vertical cross-sectional view of the multifunctional apparatus with the lid member in a state to be gripped when the apparatus is carried.

The lid member 1605 can be held at any position between the closing position and the open position, so that the position of the screen display 1610 disposed in the lid member 1605 is adjustable to an optimum angle. For instance, where the multifunctional apparatus 1600 is placed on a floor and the multifunctional apparatus 1600 is manipulated or viewed from an obliquely upper side, the lid member 1605 is turned so that a screen of the screen display 1610 faces obliquely upward, as shown in FIG. 41, in order to facilitate viewing of the screen display 1610 from the obliquely upper side. On the other hand, where the multifunctional apparatus 1600 is placed on a table or the like and manipulated or viewed from the front side, the lid member 1605 is turned so that the screen of the screen display 1610 faces frontward, as shown in FIG. 49, in order to facilitate viewing of the screen display 1610. Any known arrangement where the shaft 1656 is rotated stepwise, or alternatively continuously, and provisionally fixed at a point or points, may be employed as a turning mechanism of the lid member 1605.

The multifunctional apparatus 1600 is the type standing substantially upright and excellent in portability. Provision of the lid member 1605 facilitates carrying of the multifunctional apparatus 1600. When the user holds the lid member 1605 to carry the multifunctional apparatus 1600, the lid member 1605 is turned to vertically rise, as shown in FIG. 49. In the state where the lid member 1605 stands from the upper surface of the housing 2a, the multifunctional apparatus 1600 is powered on. Hence, there can be assumed a case where the user lifts and carries the multifunctional apparatus 1600 while the line head 30 is ejecting ink droplets for image recording or for cleaning, for instance. This may cause problems such as leakage of ink or paper jam and is undesirable. To prevent this, the power-off switch 1654 is provided in order to turn off the multifunctional apparatus 1600 when the lid member 1605 is pulled upward while the lid member 1605 is in the open position.

Figure 50:
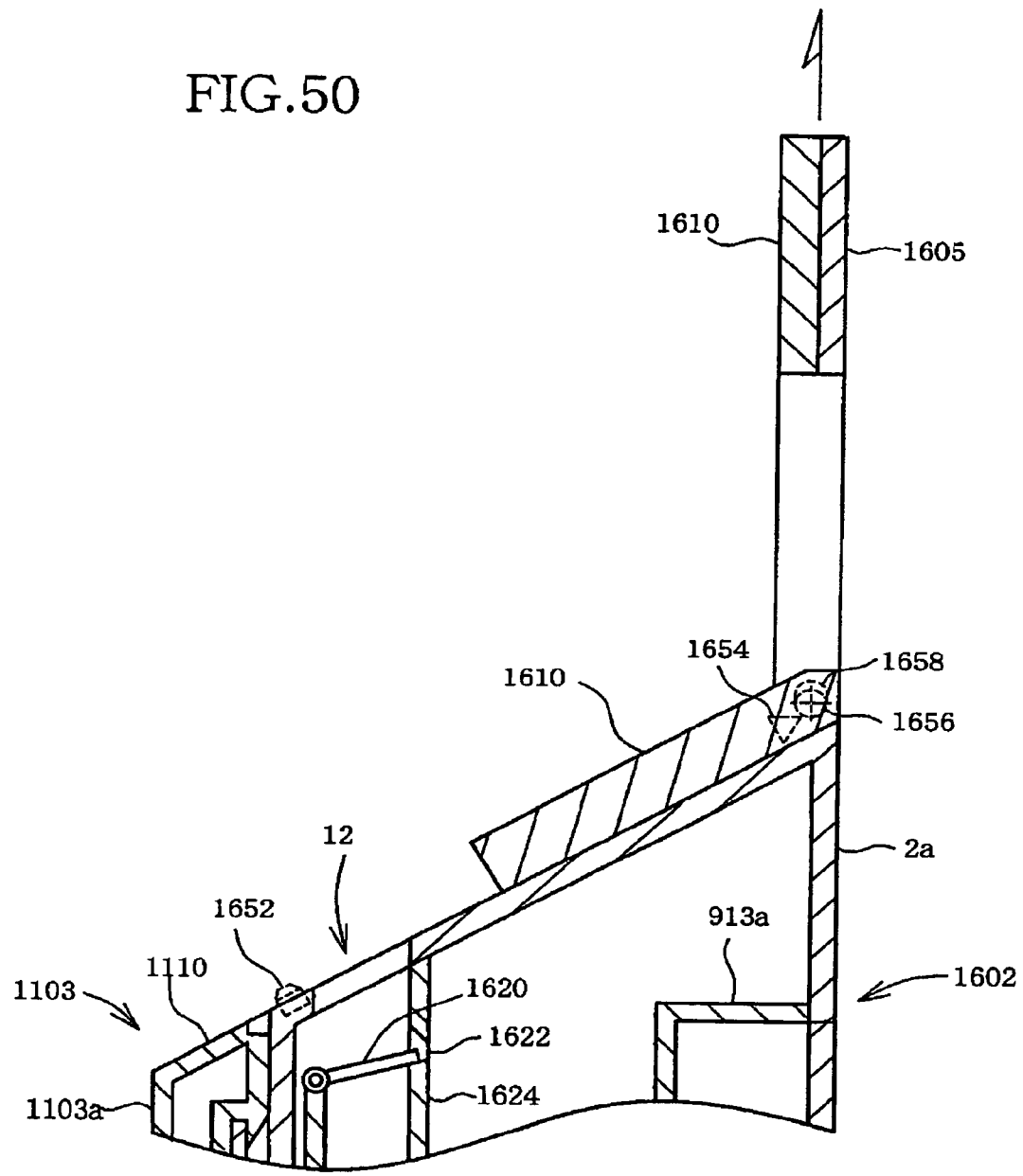
FIG. 50 is an enlarged cross-sectional view showing the lid member in the state of FIG. 49.

More specifically, as shown in FIG. 50, the shaft 1656 of the lid member 1605 is supported by a bearing 1658 disposed in the operator panel 901, such that the lid member 1605 is turnable in an upward and downward direction within a predetermined range. The power-off switch 1654 is disposed in the vicinity of the shaft 1656 to detect rotation of the shaft 1656. When the lid member 1605 is gripped and the multifunctional apparatus 1600 is lifted while the shaft 1656 is placed at a rotational position corresponding to the standing or open position of the lid member 1605 as shown in FIG. 49, the shaft 1656 of the lid member 1605 receives a weight of the multifunctional apparatus 1600, and thus the shaft 1656 moves with the lid member 1605, down to a lower end of the bearing 1658. The power-off switch 1654 detects this movement of the shaft 1656 and the lid member 1605 to the lowermost position, and outputs a power-off signal. The central processing portion 1651 receives the power-off signal from the power-off switch 1654 and turns off the multifunctional apparatus 1600. Thus, the line head 30 and others do not operate during the multifunctional apparatus 1600 is being carried, thereby preventing troubles such as leakage of ink. When the multifunctional apparatus 1600 is placed on a floor or a table after carried, the shaft 1656 moves up to an upper end of the bearing 1658 by the weight of the lid member 1605. This movement of the shaft 1656 is detected by the power-off switch 1654, thereby outputting a signal instructing to turn on the multifunction apparatus 1600 again. The central processing portion 1651 receives this signal from the power-off switch 1654 and turns on the multifunctional apparatus 1600.

The thus constructed lid member 1605 improves the portability of the multifunctional apparatus 1600, while preventing introduction of foreign matter such as dust, trash and dirt when closing the recording medium outlet 12. In the arrangement where an opening such as the recording medium outlet 12 is formed in the upper surface of the apparatus, foreign matter tends to be introduced into the apparatus. Hence, the effect of preventing introduction of foreign matter offered by this embodiment is particularly significant in such an arrangement.

There will be described a modification of the sixteenth embodiment. In the sixteenth embodiment, the position of the lid member 1605 and the ON/OFF state of the multifunctional apparatus 1600 are correlated by having the lid member 1605 turn on/off the power-on switch 1652. In the present modification, on the other hand, when the multifunctional apparatus 1600 is turned off, the lid member 1605 is automatically placed in the closing position, and when the multifunctional apparatus 1600 is powered on, the lid member is switched to the open position from the closing position. In other words, in the present modification of the sixteenth embodiment, the lid member 1605 is not manually turned by the user, but automatically turned to open/close the recording medium outlet 12 upon powering on/off of the multifunctional apparatus 1600.

Although not explicitly shown, a power-on switch 1652 which can be turned on/off by a manipulation of a user is disposed in the operator panel 901 of the multifunctional apparatus 1600, for instance, in place of the power-on switch 1652. Further, a driving force of a motor is transmitted to the shaft 1656 of the lid member 1605 to displace the lid member 1605. The central processing portion 1651 operates to control the powering on/off of the multifunctional apparatus 1600 and the position of the lid member 1605 by correlating the powering on/off with the position of the lid member 1605.

More specifically, when the user turns on the multifunctional apparatus 1600 through the operator panel 901, the control portion 1650 drives a motor to turn upward the lid member 1605 so as to raise the lid member 1605 from the upper surface of the housing 2a. Thus, the lid member 1605 is placed in the open position to open the recording medium outlet 12, as well as enable the user to view the screen display 1610. On the other hand, when the user turns off the multifunctional apparatus 1600, the central processing portion 1650 drives the motor to turn the lid member 1605 downward to fold the lid member 1605 down onto the upper surface of the housing 2a. Thus, the lid member 1605 is placed in the closing position to close the recording medium outlet 12, as well as to cover and protect the screen display 1610 by the upper surface of the housing 2a. In this way, the central processing portion 1650 controls the powering on/off of the multifunctional apparatus 1600 and the position of the lid member 1605 such that the powering on/off and the position of the lid member 1605 are correlated, thereby preventing recording of an image while the lid member 1605 is held in the closing position, and the lid member 1605 being held in the open position while the multifunctional apparatus 1600 is powered off.

A timer is provided in the control portion 1650, so as to count a time period for which image recording has not been performed since the lid member 1605 was placed in the open position. When the time period exceeds a threshold, the central processing portion 1651 drives the motor to turn the lid member 1605 into the closing position, and set the multifunctional apparatus 1600 in a suspended state. It is noted that the term "suspended state" refers to a state where the central processing portion 1651 does not start recording of an image immediately after a signal requesting start of the image recording is inputted through the operator panel 901 or from the computer, but initially changes the position of the lid member 1605 to the open position and then starts the recording. It is preferable that the suspended state corresponds to a power-saving mode in which power consumption of the multifunctional apparatus 1600 is reduced by not presenting any information on the screen display 1610, or otherwise. According to this arrangement, it is prevented that the recording medium outlet 12 is kept open for a relatively long time, thereby reliably preventing introduction of foreign matter into the housing 2a through the outlet 12.

Where the signal requesting to start recording of an image is inputted through the operator panel 901 or from the computer while the apparatus 1600 is in the suspended state, the central processing portion 1651 first drives the motor to turn the lid member 1605 currently in the closing position, into the open position, and then operates the printer portion 1602 to start feeding a recording medium K to perform recording. Thus, it is prevented that the recording medium outlet 12 is left open for a relatively long time while the multifunction apparatus 1600 is on, thereby reliably preventing introduction of foreign matter through the recording medium outlet 12 into the housing 2a. By setting the power-saving mode during the suspended state is established, even where image recording is not performed for a relatively long time, power consumed by the apparatus 1600 can be reduced without the user powering off the apparatus 1600. Further, when recording of an image is required, the image recording is immediately started without the user powering on the multifunctional apparatus 1600.

Although in the multifunctional apparatus 1600 the recording medium outlet 12 is formed in the upper surface of the housing 2a, the recording medium outlet 12 may be formed at other positions. For instance, the recording medium outlet 12 may be open upward in the vicinity of an upper end of a front surface or a back surface of the housing 2a When such an arrangement is employed, the lid member 1605 for closing the recording medium outlet 12 is configured to cover at least a part of the recording medium outlet 12 in a lateral direction. Further, the pathway P which is generally U-shaped in this embodiment may be otherwise shaped. For instance, a recording medium inlet for manually inserting a recording medium therethrough may be formed on a rear side of the line head 30, so that a pathway P extends from this recording medium and under side of the line head 30 and then turns upward. That is, the pathway P may be generally L-shaped.

In the sixteenth embodiment, an opening formed in an upper portion of the housing 2a of the multifunctional apparatus 1600 is the recording medium outlet 12 through which a recording medium K is ejected. However, the opening may not be limited to such a recording medium outlet, but may be an opening for other purposes, such as a recording medium inlet through which a recording medium K is manually inserted. Where the opening is a recording medium inlet, the recording medium inlet is similarly closed/opened by a change in the position of the lid member, and the same effects as the sixteenth embodiment can be obtained.

Alternatively, the opening may be a document inlet for inserting a document with an image to be read by the scanner portion thereon.

Hereinafter, there will be described a multifunctional apparatus according to a seventeenth embodiment of the invention, by referring to FIGS. 51 and 52, in which a document inlet as well as a recording medium outlet are closable by a lid member. That is, the multifunctional apparatus of the seventeenth embodiment is constructed similarly to the sixteenth embodiment, except that the opening closed by the lid member is not only a recording medium outlet but also a document inlet. The parts or elements corresponding to those of the sixteenth embodiment will be denoted by using the same reference numerals and description thereof is omitted.

Figure 51:
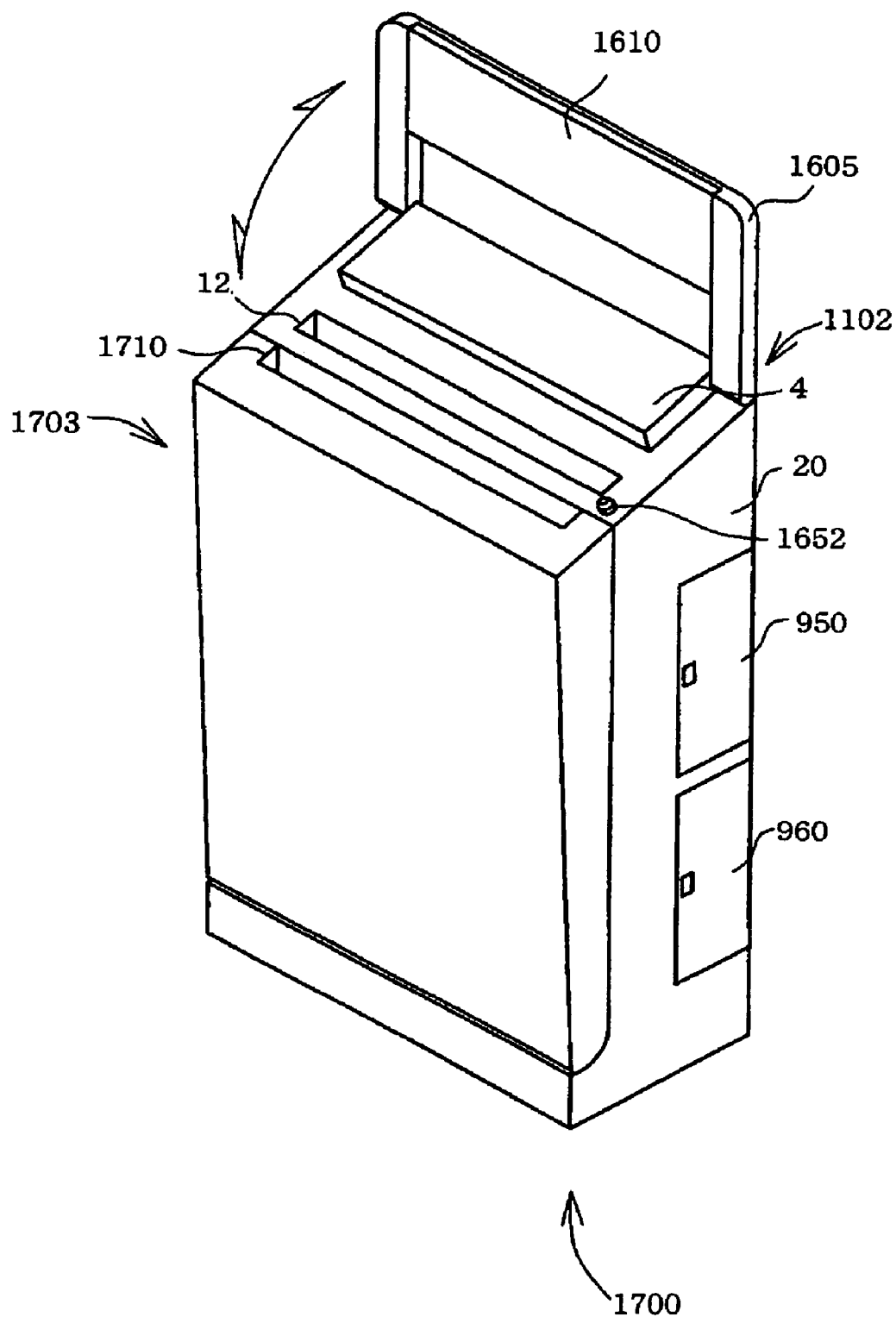
FIG. 51 is an external perspective view of a multifunctional apparatus according to a seventeenth embodiment.
Figure 52:
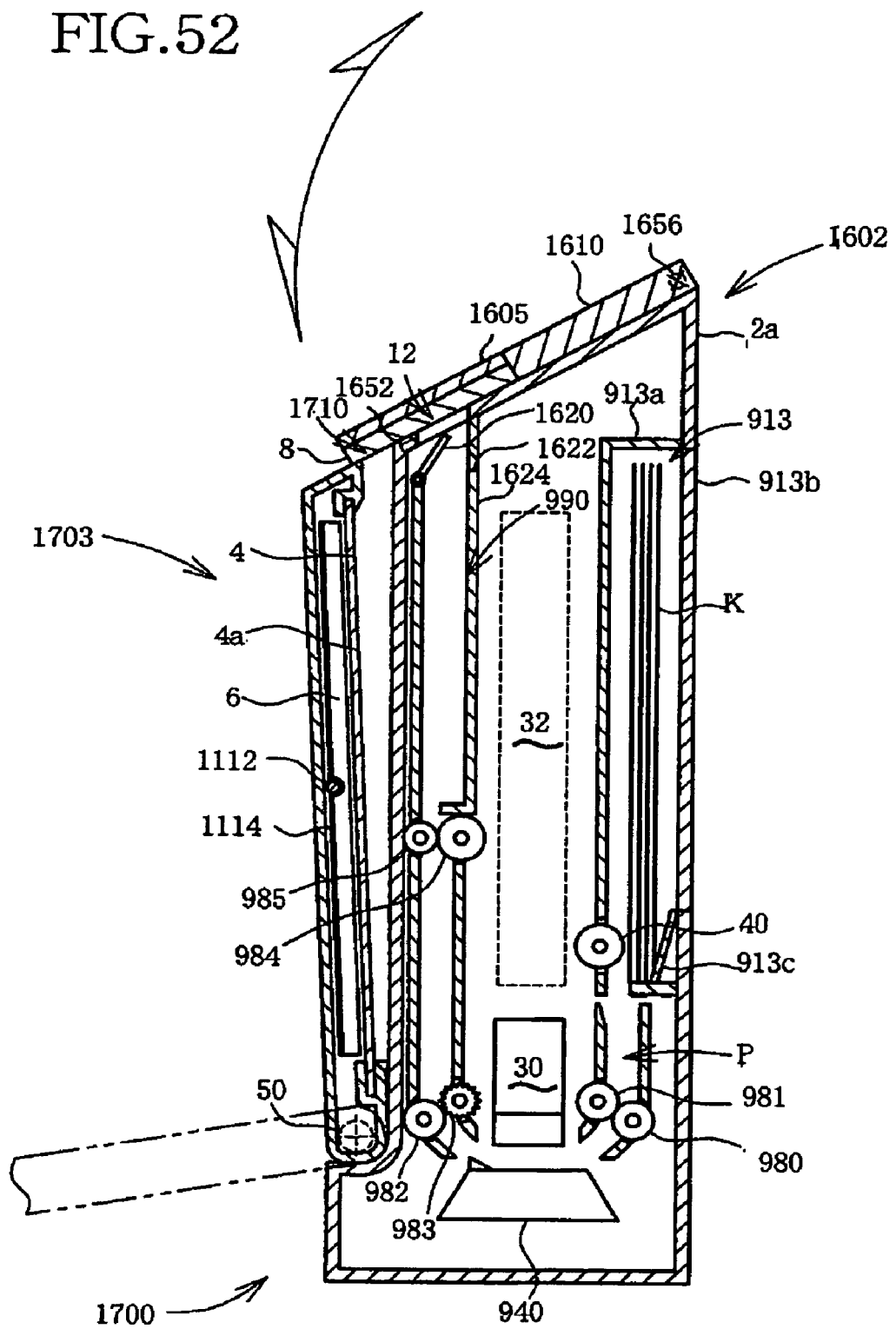
FIG. 52 is a vertical cross-sectional view of an internal structure of the multifunctional apparatus.

In FIG. 51, reference numeral 1700 generally denotes the multifunctional apparatus according to the seventeenth embodiment. A document inlet 1710 for therethrough feeding a document to a reading surface (not shown) is formed in an upper surface of a scanner portion 1703, as shown in FIG. 51, and the document inlet 1710 as well as a recording medium outlet 12 are closed by the lid member 1605 as folded down, thereby preventing adhesion of foreign matter such as trash and dirt to a platen 940.

The scanner portion 1703 and a connecting structure thereof with a printer portion 1602 are the same as those of the thirteenth embodiment. That is, a document inlet 1710 is formed between the upper surface of the housing 2a of the printer portion 1602 and the upper surface of the scanner portion 1703. The scanner portion 1703 is closable/openable with respect to the printer portion 1602, that is, changeable in position between an inclined position corresponding to the substantially upright position, and an open position corresponding to the substantially horizontal position, as described with respect to the thirteenth embodiment by referring to FIGS. 25-27.

In the multifunctional apparatus 1700, the recording medium outlet 12 and the document inlet 1710 are open upward in the upper surface of the multifunctional apparatus 1700, as shown in FIG. 51. When the lid member 1605 is folded down as shown in FIG. 52 to be placed in the closing position, the recording medium outlet 12 and the document inlet 1710 are both closed by the lid member 1605, thereby preventing introduction of foreign matter such as trash and dirt into the housing 2a through the recording medium outlet 12 or the document inlet 1710 and adhesion thereof to the platen 940.

The following is a brief description of the construction common to the sixteenth and seventeenth embodiments, as written in the form similar to the appended claims, and the effects obtained thereby.

An image processing apparatus normally placed in a substantially upright position, comprising:

a flat box-shaped housing having an opening formed in a surface of the housing to open upward; and a handle member disposed to be changeable in position between a closing position where the handle member is folded down onto the surface in which the opening is formed to close the opening, and an open position where the handle member stands above the surface to open the opening.

By provision of the handle member, the portability of the image processing apparatus is enhanced. Where the opening is a recording medium outlet through which a recording medium on which an image has been recorded is ejected, the ejection of a recording medium is allowed when the opening is opened while the handle member is in the open position. Where the opening is a recording medium inlet through which a recording medium is fed into the housing, a recording medium is allowed to be fed in through the recording medium inlet when the opening is opened while the handle member is in the open position. On the other hand, when the handle member is in the closing position, the opening is closed and introduction of foreign matter such as trash, dirt and dust into the apparatus is prevented. The same applies to the case where the opening is a document inlet or outlet through which a sheet document is inserted into or ejected from the housing of the apparatus. The opening may be one serving any other functions.

Hereinafter, there will be described a multifunctional apparatus according to an eighteenth embodiment of the invention, by referring to FIGS. 53-55. A general structure of the multifunctional apparatus 1800 according to the present embodiment is the same as that of any one of the multifunction apparatuses 900-1700 according to the ninth to seventeenth embodiments, and thus corresponding parts or elements will be denoted by like reference numerals or symbol, and description thereof is omitted.

In one of two opposite lateral sides of a printer portion 1802, there are formed a slot portion 950 as a media loading portion where various small memory cards as external memory media are loaded or inserted, and a cartridge holder portion 960. Each of the slot portion 950 and the cartridge holder portion 960 has a cover which is closed when the slot portion 950 or the cartridge holder portion is not used, so as to prevent introduction of foreign matter such as dust. When the cover of the slot portion 950 is opened, a first slot 950a, a second slot 950b, and a third slot 950c are exposed in the lateral side of the printer portion 1802, as shown in FIG. 53. A small memory card can be inserted into and removed from each slot 950a, 950b, 950c, in a lateral direction. In FIG. 53, the covers closing the slot portion 950 and the cartridge holder portion 960 are not presented for convenience of illustration.

The slots 950a, 950b, 950c connect small memory cards of respective standards inserted therein with the multifunctional apparatus 1800 such that data transfer therebetween is possible. The standards may be SD memory card, CompactFlash (registered trademark), SmartMedia (registered trademark), and Memory Stick (registered trademark), for instance. Aligned vertically, the slots 950a, 1806b, 180960c are open in the lateral side. The number of the slots formed in the slot portion 950 may not be three, but may be smaller or larger than three.

In a small memory card, data of a still image taken by a digital camera, data of a moving image taken by a digital video camera, or other data is recorded, for instance. The memory card is inserted or loaded into one of the slots 950a, 950b, 950c depending on the standard of the memory card, and the multifunctional apparatus 1800 reads the image data recorded in the memory card and representative of at least one image, so as to record a desired image among the at least one image, on a recording medium by the printer portion 1802.

Since a plurality of slots 950a, 950b, 950c corresponding to small memory cards of respective standards are formed in the slot portion 950 in a lateral side of the printer portion 1802 of the standing multifunctional apparatus 1800, the memory cards of all kinds the apparatus 1800 handle ca be loaded on a single lateral side of the multifunctional apparatus 1800, thereby enhancing the usability of the apparatus 1800. Further, this arrangement leaves a space in an upper surface and a front surface of the printer portion 1802 for arranging other operating members such as a scanner portion 1103 and an operator panel 901. Since the slots 950a, 950b, 950c are arranged in a vertical row in the lateral side of the printer portion 1802, the thickness of the printer portion 1802, and accordingly the thickness of the multifunctional apparatus 1800 as a whole can be reduced. These effects are particularly significant when a multifunctional apparatus is of the type standing substantially upright and having a housing which has a thin box-like shape. In the present embodiment, the slot portion 950 is located in the left side of the multifunctional apparatus 1800, but to obtain the same effects, the slot portion 950 may be located in the right side instead.

In the lateral side of the printer portion 1802 where the slot portion 950 is formed, there is also formed the cartridge holder portion 960 where ink cartridges for respective colors, namely, cyan (C), magenta CM), yellow (Y), and block (K), are inserted. Unless any spent ink cartridge is replaced with a new one, the cover is kept closed to prevent introduction of foreign matter such as dust. As shown in FIG. 53, when the cover of the cartridge holder portion 960 is opened, four cartridge holders 960y, 960m, 960c, 960k for the four ink cartridges of respective colors are exposed so that the ink cartridges are inserted into the respectively corresponding cartridge holders 960y, 960m, 960c, 960k in a lateral direction, for replacement. In this way, the cartridge holder portion 960 and the slot portion 950 are disposed in a same lateral side of the printer portion 1802, thereby enabling replacement of the ink cartridges and attaching/removal of the small media cards of all kinds in a single lateral side of the multifunctional apparatus 1800. Thus, the usability of the multifunctional apparatus 1800 is enhanced.

The relative position between the slot portion 950 and the cartridge holder portion 960 may be determined as desired. However, it is preferable that the cartridge holder portion 960 is located below the slot portion 950, as shown in FIG. 53, to prevent contamination of electronic components of the memory card and the slot portion 950 in the case of leakage of ink from the cartridge holder portion 960.

Figure 54:
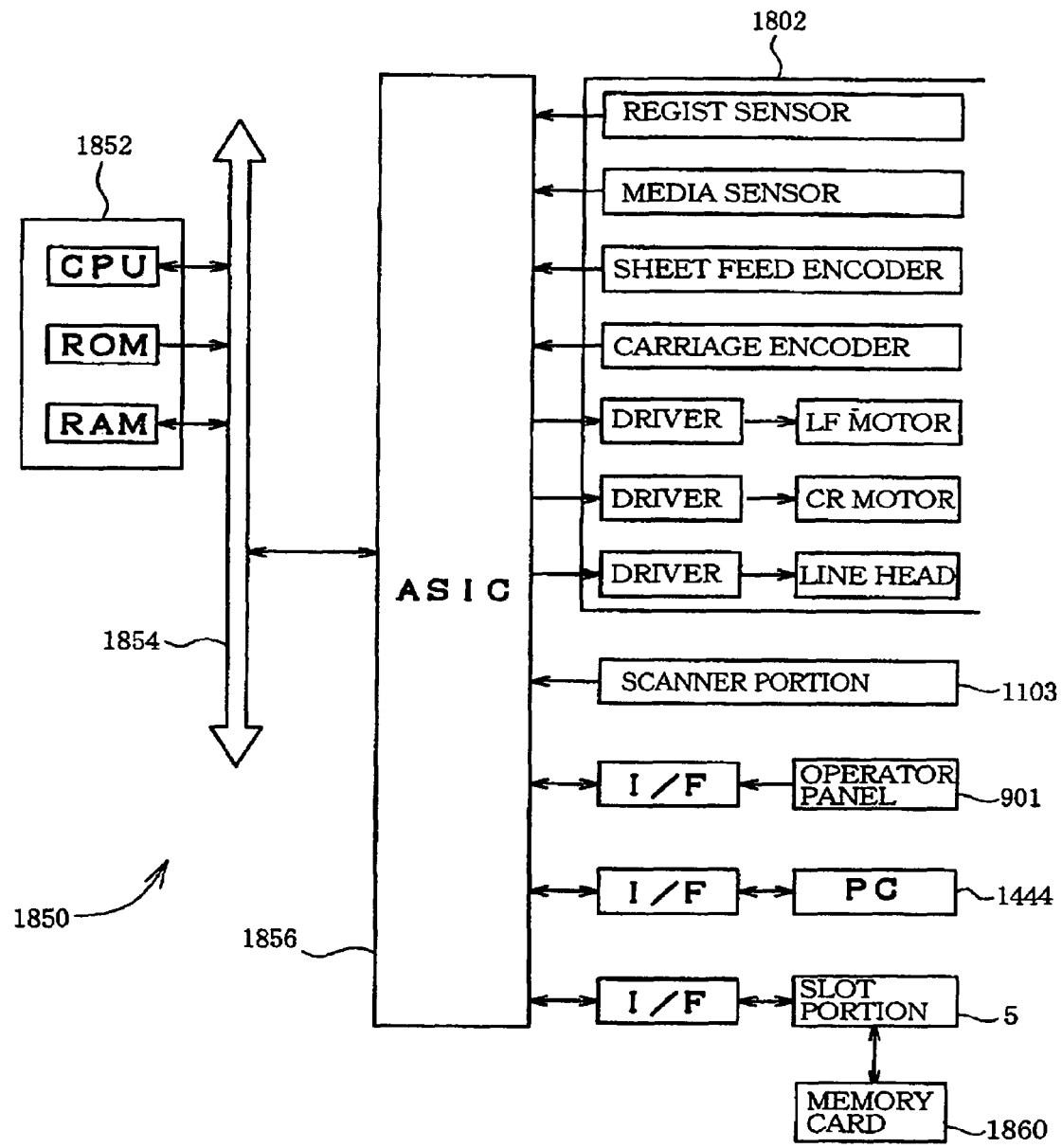
FIG. 54 is a block diagram of a control portion comprising electrical components disposed in an arranging space of the multifunctional apparatus.

FIG. 54 is a functional block diagram of a control portion 1850 comprising electrical components disposed in an arranging space 32 of the multifunctional apparatus 1800. As shown in FIG. 54, a central processing portion 1852 compris-ing a CPU (Central Processing Unit), a ROM (Read Only Memory), and a RAM (Random Access Memory) is connected to various sensors of the printer portion 1802 and the scanner portion 1103, motors, an operator panel 901, the slot portion 950, and others, via a bus 1854 and an ASIC (Application Specific Integrated Circuit) 1856, to be capable of data transfer. The multifunctional apparatus 1800 is connected to a computer (PC) 1444, so that the apparatus 1800 can record an image or a document on a recording medium based on image data or document data sent from the computer 1444 or inputted through the operator panel 901. Hence, an interface (I/F) for data transfer to/from the computer 1444 is also provided.

When the multifunctional apparatus 1800 records an image based on image data recorded in a small memory card 1860 loaded in the slot portion 950, the central processing portion 1852 reads the image data recorded in the memory card 1860 and temporarily stores the image data in the RAM. Then, based on a control program stored in the ROM, the image data temporarily stored in the RAM is presented in a liquid crystal display of the operator panel 901 in a preview format. A user selects an image between/among at least one image represented by the image data, so that data representative of the selected image is converted into print data based on which relevant motors in the printer portion 1802, a line head and others are operated in accordance with a print processing program to record the image. The construction of the control portion 1850 and the control method according to which image data is read from the memory card 1860 and recorded in the present embodiment are described by way of example only. It is to be understood that the control implemented in the multifunctional apparatus of the invention is not limited to that of the present embodiment.

Figure 55:
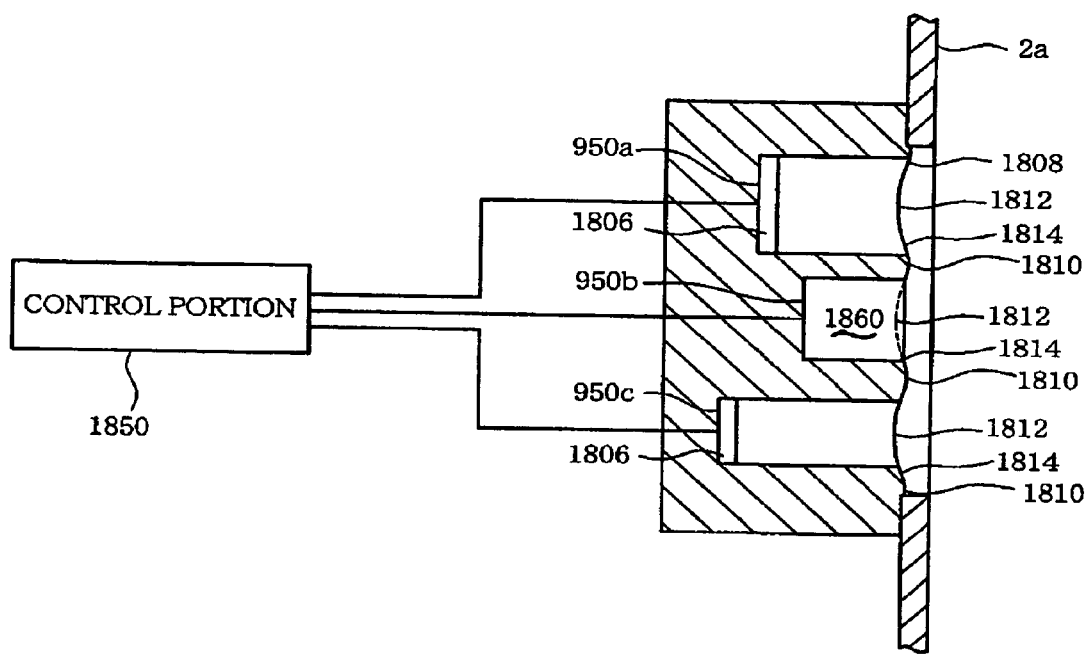
FIG. 55 is a vertical cross-sectional view of a media loading portion of the multifunctional apparatus.

FIG. 55 is a cross-sectional view of the slot portion 960, in a state where a small memory card 1860 is inserted or loaded in the corresponding slot 950b. As shown in FIG. 55, the slots 950a, 950b, 950c in the slot portion 950 are open toward a lateral side of the printer portion 1802, so that small memory cards of respective standards can be inserted into the respectively corresponding slots 950a, 950b, 9500 in a lateral direction of the multifunctional apparatus 1800. Each of the slots 950a, 950b, 950c has a contact 1806 at a bottom thereof, 80 that when the contact 1806 and a contact (not shown) of the inserted memory card are brought into contact with each other, so that the memory card is electrically connected to the central processing portion 1852, allowing transfer of image data therebetween.

An external surface 1808 of the slot portion 950 in which the slots 950a, 950b, 950c are open is waved, or smoothly dented at a place where the slot 950a, 950b, 950c is formed. That is, the external surface 1808 is repeatedly dented and raised in a wavelike fashion in a vertical direction with outermost portions 1810 protruding on both of two opposite vertical sides of each slot 950a, 950b, 950c, as shown in FIG. 55. That is, an open end of each slot 950a, 950b, 950c is elongate in the vertical direction, and the outermost portion 1810 is armed at the side of each of two longitudinal opposite ends of the open end of each slot 950a, 950b, 950c, and a recess 1812 is formed substantially at a center, in the vertical direction, of each open end. The outermost portions 1810 and the recesses 1812 are continuous to constitute a smoothly curved surface. Thus, the external surface of the slot portion 950 around the open ends of the slots 950a, 950b, 950c is sequentially dented and raised in the vertical direction.

Figure 53:
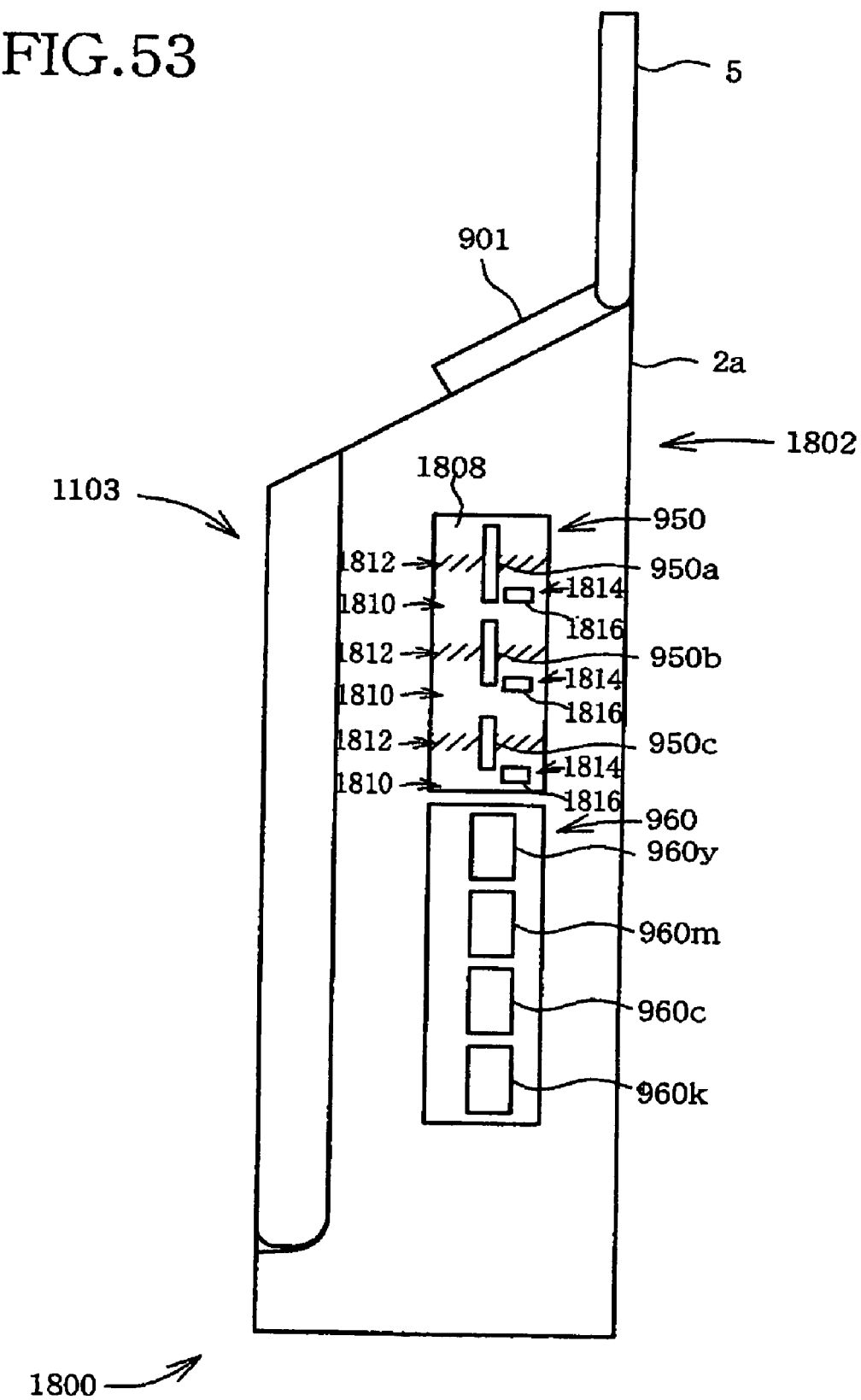
FIG. 53 is a left side view of a multifunctional apparatus according to an eighteenth embodiment of the invention.

Accordingly, the waved external surface of the slot portion 950 includes three slants 1814 facing obliquely upward (hereinafter referred to as "the upward slants"), at each of which a mark 1816 indicating the kind of memory card which is loadable in the corresponding slot 950a, 950b, 950c, is put as shown in FIG. 53. Each upward slant 1814 is a part of a continuous curved surface extending between a recess 1812 and an outermost portion 1810 adjacent to and below that recess 1812. The mark 1816 is a visually recognizable indication printed on the upward slant 1814, in the forms of characters, symbol, or sign, for instance. Marks 1816 for SD memory card, CompactFlash (registered trademark), and Memory Stick (registered trademark) may be respectively "SD", "CF", and "m", for example. In this way, the marks 1816 on the upward slants 1814 are made easily seeable from the obliquely upper side or the lateral side of the multifunctional apparatus 1800.

In particular, in a multifunctional apparatus of the type standing substantially upright, like the multifunctional apparatus 1800, it may be often the case that the apparatus is used while placed on a floor, not on a table. If the external surface of the slot portion 950 around the open ends of the slots 950a, 950b, 950c is flat and perpendicular to the floor, the user should bend down or lower the head 80 as to place the eyes at the same level as the slots 950a, 950b, 950c, in order to determine which one of the slots 950a, 950b, 950c corresponds to the memory card to be inserted, even when the marks indicating the kinds of memory cards loadable in the slots 950a, 950b, 950c are put in the vicinity thereof On the other hand, in the multifunctional apparatus 1800, the marks 1816 indicating the kinds of loadable memory cards are put on the upward slants 1814, and therefore even when the multifunctional apparatus 1800 is placed on a floor, the user does not need to bend down to put the eyes at the same level as the slots 950a, 950b, 950c, but can see the marks 1816 by looking obliquely down at the multifunctional apparatus 1800 and easily and quickly determine into which slot 950a, 950b, 950c the memory card is to be inserted. Further, the thickness of the printer portion 1802 and accordingly the thickness of the multifunctional apparatus 1800 can be reduced by arranging the slots 950a, 950b, 950c in a vertical line in a side face of the housing 2a of the printer portion 1802. Thus, usability of the apparatus 1800 is enhanced.

Sine the recesses 1812 are formed substantially at the vertical center of the open end of each slot 950a, 950b, 950c, the user can insert/remove a memory card into/from the slot 950a, 950b, 950c by holding a substantially vertically central portion of the memory card. More specifically, as shown in FIG. 55, the memory card 1860, which has a thin plate-like shape, is inserted in the slot 950b in an orientation such that major surfaces of the memory card 1860 are parallel to a longitudinal direction of the slot 950b. While the memory card 1860 is connected to the contact 1806 (not shown) inside the slot 950b, an end surface of the memory card 1860 on the side of the open end of the slot 950b is substantially flush with the external surface of the slot portion 950, with a substantially vertically central portion of an end portion of the memory card 1860 on the side of the open end of the slot is exposed to the outside of the printer portion 1802, by the presence of the recess 1812. Hence, the user holds the exposed substantially vertically central portion of the memory card 1860 and pulls the memory card 1860 in the lateral direction out of the slot 950b. When inserting the memory card 1860 into the slot 950b, too, the user holds the substantially vertically central portion of the end portion of the memory card 1860 and pushes the memory card 1860 into the slot 950b. Thus, the recess 1812 facilitates insertion and removal of a memory card into and from the slot 950a, 950b, 950c. In addition, it is not required to provide in the slot 950a, 950b, 950c a biasing mechanism for biasing a memory card in a direction to push the memory card out of the slot 950a, 950b, 950c in order to facilitate removal of the memory cards. Accordingly, the slot portion 950 is simplified in structure, contributing to downsizing the apparatus.

According to the multifunctional apparatus 1800, the external surface of the slot portion 950 around the open ends of the slots 950a, 950b, 950c is formed to wave in the vertical direction such that on the vertically opposite sides of each slot, there is an outermost portion 1810 protruding toward the external side of the printer portion 1802, and the marks 1816 indicating the kinds of memory cards loadable into the respective slots 950a, 950b, 950c are put on the upward slants 1814. Thus, the marks 1816 are easily seeable from both of the obliquely upper side and the lateral side of the multifunctional apparatus 1800, thereby making it possible to easily and quickly determine in which slot a memory card can be inserted.

In the present embodiment, the slot portion 950 has the three kinds of slots 950a, 950b, 950c, whose open ends are all vertically long. However, the number of the slots in the media loading portion may not be three and may be increased or decreased. Further, it is not essential that the open ends of all of the slots in the media loading portion are long in the vertical direction. For instance, one or more slots among all of the slots in the slot portion 950 may have a shape horizontally long to receive a memory card having a relatively small width.

The following is a brief description of the construction of the eighteenth embodiment, as written in the form similar to the appended claims, and effects obtained thereby.

An image processing apparatus comprising:

a housing in which a recording medium is fed so that an image is recorded on the recording medium;

a media loading portion formed in a lateral side of the housing, and having a plurality of slots into which at least two kinds of external recording media are respectively removably inserted in a lateral direction, the media loading portion having an external surface around open ends of the slots, the external surface being waved in a vertical direction to be dented at a place where each of the slots are formed, with an outermost portion protruding toward an external side of the housing being formed on each of two opposite vertical sides of the each slot, thereby providing a obliquely upward slant corresponding to the each slot; and a mark put on each of the slants to indicate which external recording medium can be inserted in the slot.

According to this apparatus, the marks put on the obliquely upward slants are easily seeable from both of an obliquely upper side and a lateral side of the apparatus, thereby enabling to easily and quickly determine in which slot an external recording medium can be inserted. Thus, the usability of the apparatus is enhanced. Where the slots are aligned vertically, the thickness of the apparatus can be reduced by reducing the thickness of the housing. In particular, in a case where the housing is flat box-shaped and normally placed in a substantially upright position, the effects of this arrangement is significant.

Hereinafter, there will be described a multifunctional apparatus according to a nineteenth embodiment of the invention, by referring to FIGS. 56-58. A general structure of the multifunctional apparatus 1900 of this embodiment is the same as that of any one of the multifunction apparatuses 900-1800 according to the ninth to eighteenth embodiments. Corresponding parts or elements will be denoted by like reference numerals, and description thereof is not provided.

In a lateral surface of a printer portion 1902, there are disposed a slot portion 950 as a media loading portion where various small memory cards as external recording media can be inserted into corresponding slots, and an ink cartridge holder portion 960, as in the above eighteenth embodiment. General structures and functions of these portions 950, 960 are the same as those in the eighteenth embodiment, and description thereof is omitted.

The cartridge holder portion has four ink cartridge holders 960y, 960m, 960c, 960k for respective colors, which are arranged in a vertical line. The four colors of inks respectively accommodated in the ink cartridges inserted in the ink cartridge holders 960y, 960m, 960c, 960k are yellow, magenta, cyan, and black, that are lighter in this order. The ink cartridge holders 960y, 960m, 960c, 960k are arranged in this order from top down, with the ink cartridge holder 960y in which the ink cartridge (not shown) accommodating the ink of yellow, which is the lightest among the four colors, located at the top of the row of the ink cartridge holders.

By thus arranging the ink cartridge holders 960y, 960m, 960c, 960k corresponding to the four ink cartridges in a vertical line in the cartridge holder portion 960 disposed in the lateral side of the printer portion 1902 of the multifunctional apparatus 1900, which is of the type standing substantially upright, easiness of replacement of the ink cartridges is enhanced, and the thickness of the printer portion 1902 is reduced, enabling to reduce the overall size and thickness of the multifunctional apparatus 1900. Further, this leaves a space for arranging a scanner portion 1103, an operator panel 901, and others, in an upper surface and a front surface of the printer portion 1902. The ink cartridge holders 960y, 960m, 960c, 960k are all disposed in a same lateral side of the printer portion 1902, and further the ink cartridge holders 960y, 960m, 960c, 960k and the slot portion 950 are disposed in a same lateral side of the printer portion 1902. Thus, replacement of all the ink cartridges and insertion/removal of all the recording media, i.e., memory cards, can be done in a single lateral side of the multifunctional apparatus 1900. This enhances the usability of the multifunctional apparatus 1900. In the present embodiment, the slot portion 950 and the cartridge holder portion 960 are disposed in the left side of the multifunctional apparatus 1900. However, the same effects can be obtained even where these are disposed in the right face.

Figure 57:
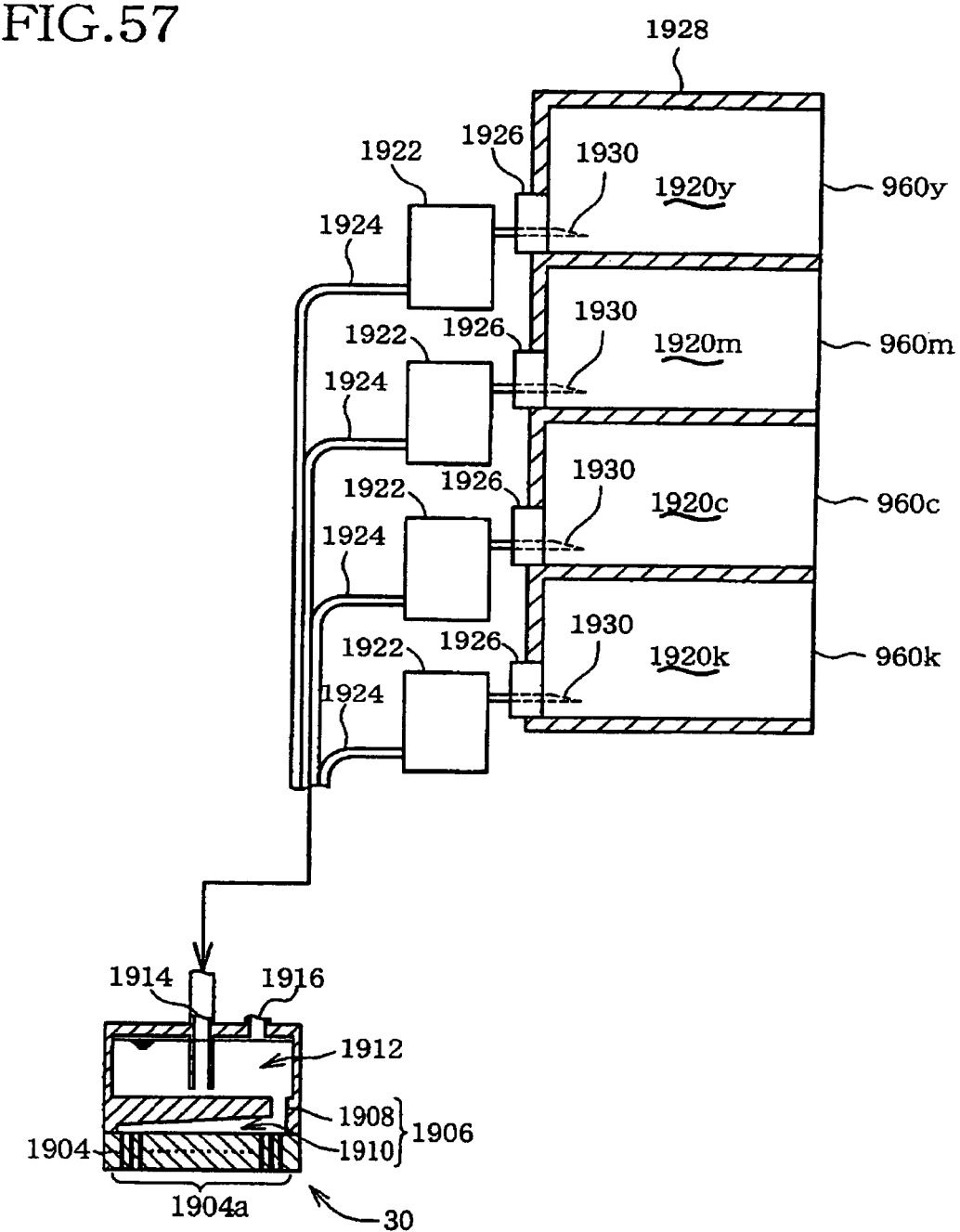
FIG. 57 is a schematic view of an ink supply channel from ink cartridges to a line head in the multifunctional apparatus.

As shown in FIG. 57, a line head 30, which is of inkjet type in this embodiment, has nozzles 1904 arranged in a row for each of the four color inks, such that each of the rows extends along the direction of feeding of the recording medium, and an ink ejection opening 1904a as an open end of each nozzle faces downward. The pitch and number of the ink ejection openings 1904a in each row parallel to the feeding direction is suitably determined taking account of a resolution of the image to be recorded and other conditions. The number of rows of the ink ejection openings 1904a may be changed depending on the number of color inks used.

As shown in FIG. 57, on an upper side of the nozzles 1904, there is formed four manifolds 1906 each extending across the nozzles 1904 of a corresponding one of the four colors. More specifically, each manifold 1906 comprises a supply passage 1908 formed at an end of the corresponding row of the nozzles 1904, and a manifold chamber 1910 formed across all the nozzles 1904 of the row, so that the ink supplied through the supply passage 1908 is distributed to the nozzles 1904 of the row via the manifold chamber 1910. The nozzles 1904 eject droplets of the ink distributed from the manifold 1906, through the ink ejection openings 1904a by deforming side walls defining the nozzles 1904 and formed of a piezo-electric material. The mechanism of ejecting ink droplets may not be this one, but any other known mechanisms may be employed instead.

A buffer tank 1912 is disposed above each manifold 1906, that is, one buffer tank 1912 is provided for each of the four color inks, like the row of the nozzles 1904 and the manifold 1906. The buffer tank 1912 receives, through an ink supply port 1914, ink from a corresponding ink cartridge 1920y, 1920m, 1920c, 1920k via a sub ink tank 1922 and a tube 1924. By storing the ink in the buffer tank 1912 before supplying the ink into the nozzles 1904, bubbles generated during in the tube 1924 or others are caught and not introduced into the nozzles 1904. The bubbles caught in the buffer tank 1912 are sucked and removed to the outside by a pump mechanism (not shown) through a bubble outlet.

The buffer tank 1912 is in communication with the manifold chamber 1910 via the supply passage 1908, and thus the color inks supplied from the ink cartridges 1920y, 1920m, 1920c, 1920k are flowed into the nozzles 1904 via the buffer tank 1912 and the manifold 1906. In this way, the line head 30 can eject the inks of four colors in the form of ink droplets through the ink ejection openings 1904a.

Each of the ink cartridges 1920y, 1920m, 1920c, 1920k comprises a rectangular hollow housing, an ink accommodating chamber and an air chamber (not shown) both of which are formed in the rectangular housing, and a sealing portion 1926 of a rubber material such as silicone disposed on an internal side as the ink cartridge 1920y, 1920m, 1920c, 1920k is inserted in the ink cartridge holder 960y, 960m, 960c, 960k. The sealing portion 1926 serves as a partition wall between the ink accommodating chamber and the outside.

Figure 56:
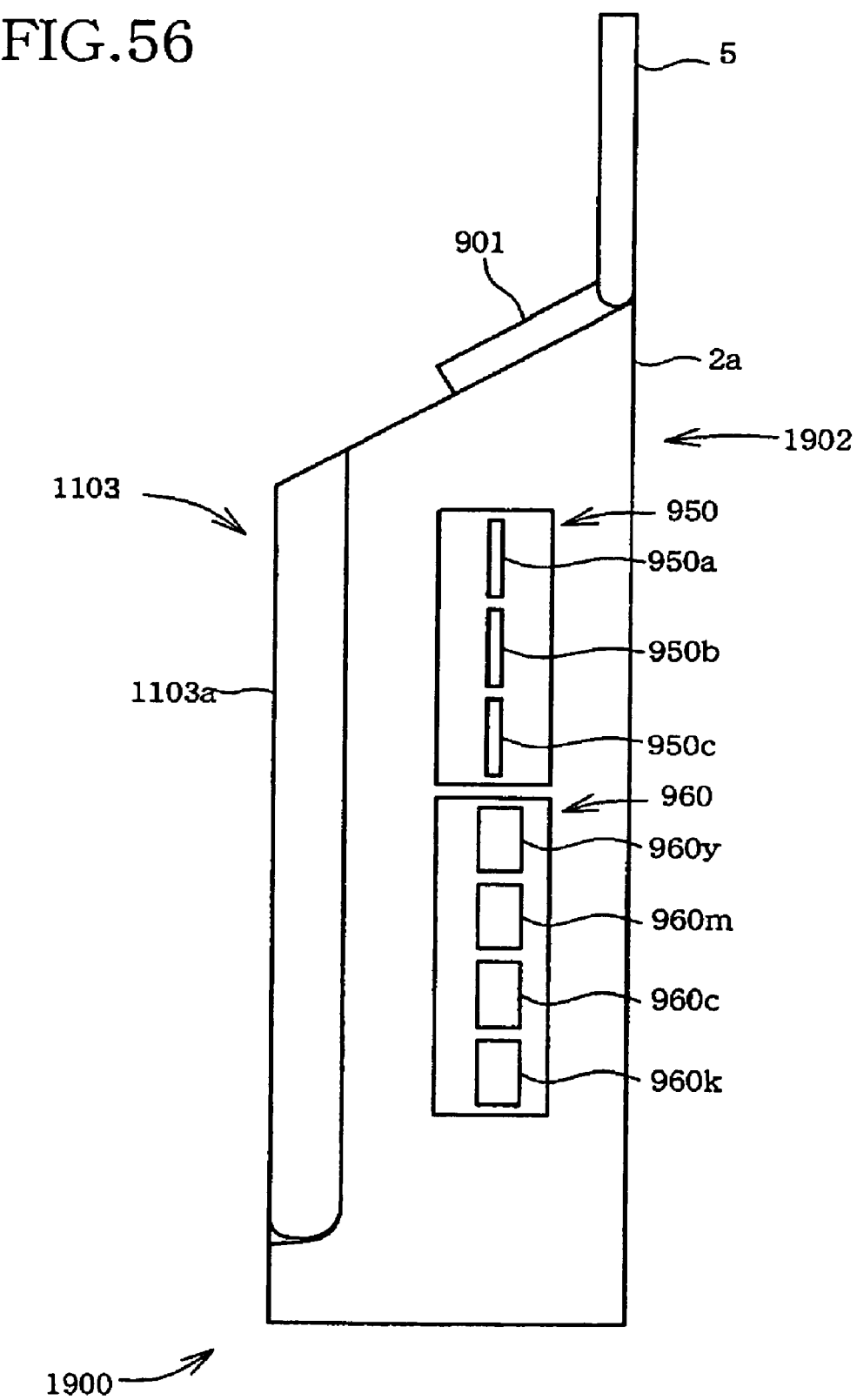
FIG. 56 is an external view of a multifunctional apparatus according to a nineteenth embodiment of the invention as seen from the left side.

Each of the ink cartridge holders 960y, 960m, 960c, 960k in which the ink cartridge 1920y, 1920m, 1920c, 1920k is inserted has a space defined by a partition plate 1928 in a housing 2a of the printer portion 1902, so that the ink cartridge 1920y, 1920m, 1920c, 1920k can be accommodated in the space, which is open in an exterior, lateral surface of the printer portion 1902, as shown in FIGS. 56 and 57.

On the other hand, on the internal side of the space inside each ink cartridge holder 960y, 960m, 960c, 960k, a hollow ink needle 1930 is disposed at a place corresponding to the sealing portion 1926 of the ink cartridge 1920y, 1920m, 1920c, 1920k as inserted. Each needle is disposed to extend from the internal side of the space inside the ink cartridge holder toward the open side of the space such that an end of the needle 1930 protrudes into the space. A base end of each needle 1930 is connected to the sub ink tank 1922. The sub ink tank 1922 holds the ink supplied from the ink cartridge 1920y, 1920m, 1920c, 1920k before the ink is supplied into the tube 1924, so as to filter out dirt or other foreign materials in the ink. Each sub ink tank 1922 is connected to the line head 30 through the tube 1924 which is flexible.

When the ink cartridge 1920y, 1920m, 1920c, 1920k is inserted into the space of the corresponding ink cartridge holder 960y, 960m, 960c, 960k, the sealing portion 1926 disposed on the internal side of the ink cartridge 1920y, 1920m, 1920c, 1920k is brought into contact with the needle 1930. When the ink cartridge 1920y, 1920m, 1920c, 1920k is further pushed into the space, the needle 1930 pierces the sealing portion 1926 so that an end portion of the needle 1930 enters the ink accommodating chamber (not shown) of the ink cartridge, as presented in FIG. 57. Thus, each ink cartridge 1920y, 1920m, 1920c, 1920k and the corresponding sub ink tank 1922 are connected to each other via the needle 1930. Each color ink is delivered from the sub ink tank 1922 into the line head 30 via the tube 1924. It is noted that the structure of the line head 30 and that of the ink supply channel extending from each ink cartridge 1920y, 1920m, 1920c, 1920k have been described by way of example only. In the present embodiment, the inkjet line head 30 and the ink supply channel may have any other known structures.

Figure 58:
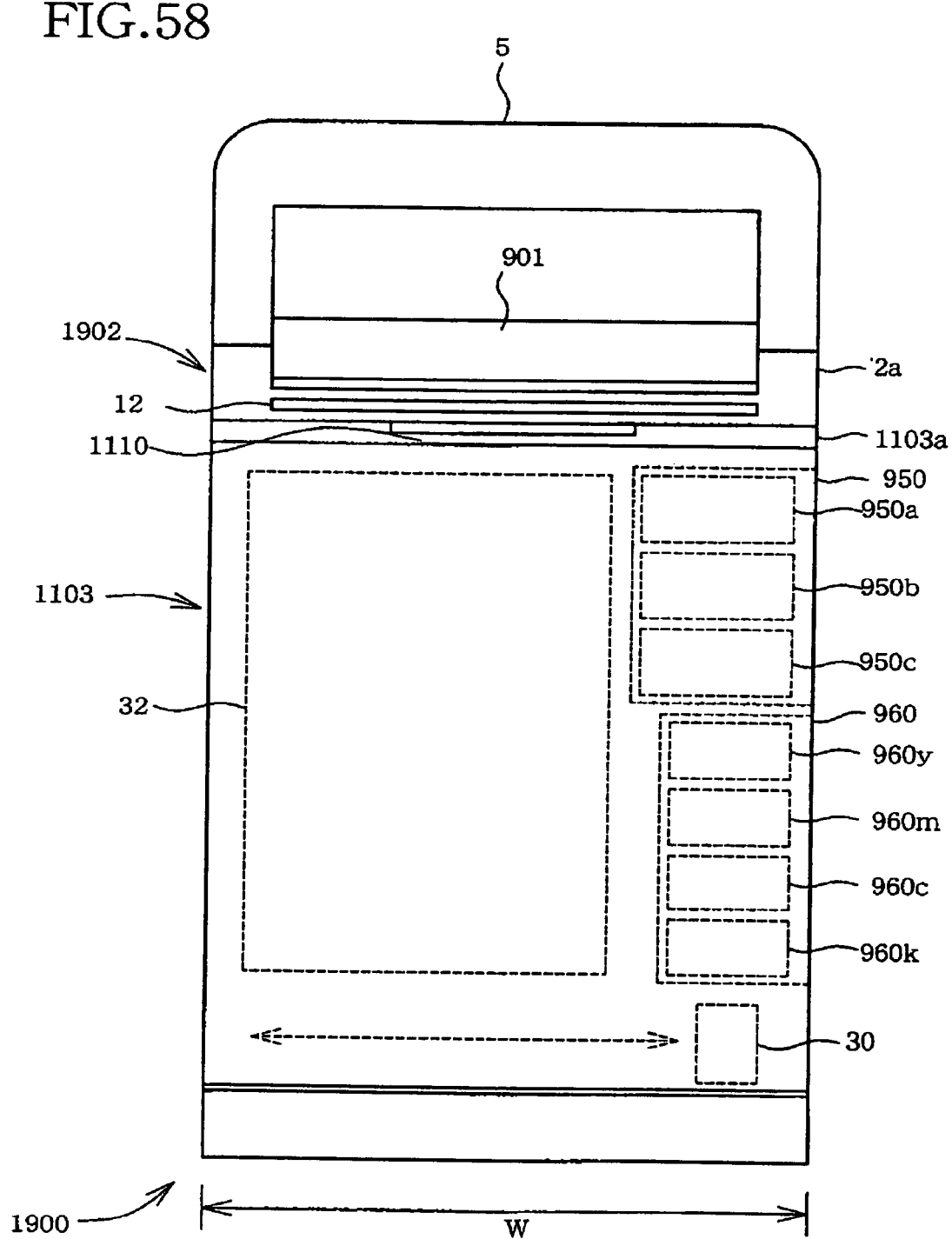
FIG. 58 is a front view of the multifunctional apparatus, showing arrangement of a media loading portion, a cartridge holder portion, a line head, and others.

FIG. 58 shows arrangement of the slot portion 950, the cartridge holder portion 960, the line head 30, and an arranging space 32 where electrical components and others are disposed, in the multifunctional apparatus 1900.

As shown in FIG. 58, the cartridge holder portion 960 is disposed above a space in which the line head 30 moves when scanning. A width W (as shown in FIG. 19) of the printer portion 1902 of the multifunctional apparatus 1900 is determined in view of a width of a recording medium of A4 size, which is a maximum size in terms of the recording capability of the multifunctional apparatus 1900. That is, the width W is larger than the width of A4 size. The width of scanning of the line head 30 is necessarily larger than the width of A4 size. Thus, if the cartridge holder portion 960 is disposed on a lateral side of the line head 30, the width W of the printer portion 1902 becomes larger than a sum of the width of the space in which the line head 30 moves while scanning, and the width of the cartridge holder portion 960. However, in the present embodiment, the cartridge holder portion 960 is disposed above the space in which the line head 30 moves while scanning, thereby minimizing the width W of the printer portion 1902 to a value required for operation of the line head 30.

The cartridge holder portion 960 is disposed below the slot portion 950, in view of the following. As described above, the ink cartridges 1920y, 1920m, 1920c, 1920k are inserted in the ink cartridge holders 960y, 960m, 960c, 960k for respective colors which constitute the cartridge holder portion 960 as shown in FIG. 57, and a small amount of ink may leak upon insertion or removal of the ink cartridge 1920y, 1920m, 1920c, 1920k. To cope with this ink leakage, it is common to arrange such that an ink absorbing member is provided in the ink cartridge holders 960y, 960m, 960c, 960k so that the leaking ink does not seep into or outside the printer portion 1902. However, it may happen that ink leaks in an amount which the ink absorbing member can not completely absorb due to an error upon replacement of an ink cartridge or for other reasons. According to the present embodiment, even when such an ink leakage in an unexpectedly large volume occurs at the cartridge holder portion 960, the slot portion 950 and the small memory card disposed above the cartridge holder portion 960 are not contaminated by the ink leaking from the cartridge holder portion 960.

Among the ink cartridge holders 960y, 960m, 960c, 960k for respective color inks, the ink cartridge holder 960y in which the ink cartridge 1920y storing ink of yellow which is the lightest color among the four colors YMCK, is located at the top, below which the ink cartridge holders 960m, 960c, 960k for magenta, cyan, and black are arranged in this order from the upper side, in accordance with the order of the lightness, of the colors. Hence, even when the ink leakage as mentioned above occurs such that the lightest, yellow ink mixes with any other color inks, i.e., magenta, cyan, and black inks, supplied from the ink cartridges 1920m, 1920c, 1920k disposed below the ink cartridge 1920y, an adverse effect of the color mix on the recorded image is relatively small, since magenta, cyan, and black are darker than yellow.

By disposing the cartridge holder portion 960 in the lateral surface of the printer portion 1902, easiness in replacement of the ink cartridge is enhanced, while the overall size and the thickness of the multifunctional apparatus 1900 are reduced. In particular, where there is no space for arranging an operator panel and others in a front face of a printer portion of a multifunctional apparatus due to presence of a scanner portion in the front side of the printer portion, like in the present multifunctional apparatus 1900, such a space for the operator panel and other operational members is left in the upper surface or the front side of the printer portion 1902 by disposing the cartridge holder portion in a lateral side of the printer portion, thereby making the above effect of the embodiment more significant.

By disposing both the slot portion 950 and the cartridge holder portion 960 in a same lateral side of the printer portion 1902, replacement of the ink cartridge 1920y, 1920m, 1920c, 1920k and insertion/removal of a small memory card can be all made in one of two lateral sides of the multifunctional apparatus 1900, thereby enhancing the usability. Further, the multifunctional apparatus 1900 can be placed at the side of a wall such that the other lateral sides without the slot portion 950 and the cartridge holder portion 960 is alongside a surface of the wall, thereby saving space in an office or other places.

Since the ink cartridge holders 960y, 960m, 960c, 960k for respective colors are disposed in a concentrated manner in one of two lateral sides of the printer portion 1902, the usability is enhanced. Since the ink cartridge holders 960y, 960m, 960c, 960k are arranged in a line extending in a longitudinal direction of the printer portion 1902, the thickness of the printer portion 1902 can be reduced.

The following is a brief description of the construction of the nineteenth embodiment, as written in the form similar to the appended claims, and the effects obtained thereby.

An image processing apparatus comprising:

a flat box-shaped housing normally placed in a substantially upright position, in which a pathway is formed;

a feeding mechanism disposed in the housing to feed a recording medium along the pathway;

a recording device disposed in the housing to scan while ejecting ink droplets onto the recording medium fed along the pathway; and a cartridge holder portion disposed in a lateral side of the housing, an ink cartridge which accommodates ink to be supplied to the recording device via a channel being removably inserted in a lateral direction into the cartridge holder portion.

By disposing the cartridge holder portion in a lateral side of the housing in an image processing apparatus normally placed in a substantially upright position, easiness in replacing the ink cartridge to another is enhanced, while the overall size and the thickness of the apparatus is reduced. Further, a space for arranging elements other than the cartridge holder portion is left in an upper side and a front side of the housing.

Arranging elements including the cartridge holder portion in a lateral side of the housing by efficiently utilizing the space, the overall size and thickness of the apparatus are reduced, while the usability is enhanced.

Where a media loading portion where a memory medium is removably inserted is disposed in the image processing apparatus, it is desirable that the cartridge holder portion and the media loading portion are both disposed in a same lateral side of the housing, such that the media loading portion is located above the cartridge holder portion.

Although the presently preferred embodiments of the invention have been described, it is to be understood that the invention is not limited to the details of the embodiments, but may be embodied with various modifications, without departing from the scope and spirit of the invention.

For instance, the recording medium holder may or may not be incorporated in the housing 2a of the printer portion.

For example, the recording medium holder takes the form of a cassette removably attachable to an external surface of the housing. When the recording medium is to be fed into the housing 2a irrespective of the posture the multifunctional apparatus assumes, the cassette may be attached in a vertical posture or a slightly inclined posture so that each recording medium in an upright or inclined posture is fed into the housing 2a or the pathway therein. When such a cassette is employed as the recording medium holder, the depth of the housing 2a without the cassette is further reduced, while the space the multifunctional apparatus occupies when the cassette is removed is made relatively small.

Alternatively, the recording medium holder may take the form of a cassette removably set inside the housing 2a by being slid into the housing 2a. According to this arrangement, the profile of the multifunctional apparatus is simplified while carrying of the multifunctional apparatus is facilitated, compared to an arrangement where the recording medium holder is attached to an external surface of the housing 2a.

In each of the above-described embodiments, the supporting structure where the scanner portion is supported pivotally around a support shaft to be openable/closable relatively to the housing of the printer potion may be modified as long as the glass plate of the scanner portion faces upward when the scanner portion is open. For instance, the scanner portion and the housing of the printer portion may be connected by a hinge or other arrangements.

In each of the multifunctional apparatuses described above, the liquid crystal display or panel in the operator panel is disposed in the upper surface of the housing. However, the liquid crystal panel may be disposed in an under surface of the handle portion of the lid member. When such an arrangement is employed, the liquid crystal panel faces the user when the lid member is opened, facilitating viewing of the screen of the liquid crystal panel.

In each of the above-described embodiments except the sixteenth embodiment, a screen display on which information such as ON/OFF state of the multifunctional apparatus, error indication, and data reception is presented may be disposed in an under surface of the lid member, which is to be opposed to the upper surface of the housing of the printer portion when the lid member is folded down, similarly to the sixteenth embodiment.

In each of the embodiments where the structure of the ink cartridge portion does not matter, the line head may or may not be of inkjet type. When the line head is of inkjet type, any known inkjet head may be employed. For instance, a side wall of each channel is formed of a piezoelectric material and an ink droplet is ejected when the piezoelectric material is deformed.

In each of the above-described embodiments, the multifunctional apparatus includes a scanner portion as an image reading portion. However, the techniques not directly related to the scanner portion are applicable to an apparatus only having a printer function.

What is claimed is:

1. An image processing apparatus comprising:
    an image reading portion including:
        a box-shaped first housing having a reading surface; and
        a scanning device disposed inside the first housing and configured to move along the reading surface, the image reading portion reading a first image on a document by displacing the document and the scanning device relatively to each other;
    an image recording portion including:
        a recording medium supply device which accommodates a recording medium;
        a feeding mechanism which feeds the recording medium fed out of the recording medium supply device;
        a recording device which records a second image on the recording medium fed by the feeding mechanism; and
    a second housing which incorporates at least the feeding mechanism and the recording device, wherein
    the apparatus is configured to be placed on a rest surface in a substantially upright position, and
    the image reading portion is configured to pivot relative to the image recording portion between an upright position in which the image reading portion reads the first image on the document with the reading surface of the first housing opposing the image recording portion, and a horizontal position in which the image reading portion reads the first image on the document with the reading surface of the first housing facing upward.

2. The image processing apparatus according to claim 1, wherein the reading surface extends substantially upright when the image reading portion is in the upright position, and the reading surface extends substantially horizontally when the image reading portion is in the horizontal position.

3. The image processing apparatus according to claim 1, wherein the image reading portion is connected at an end portion thereof to the image recording portion such that the image reading portion can turn around a substantially horizontal axis.

4. The image processing apparatus according to claim 3, wherein the image reading portion has a support leg disposed at a position remote from the end portion of the image reading portion so as to support the image reading portion when the image reading portion is in the horizontal position.

5. The image processing apparatus according to claim 1, wherein the feeding mechanism feeds the recording medium to the outside of the apparatus along a U-shaped feed pathway via a recording position at which the image on the document is recorded.

6. The image processing apparatus according to claim 1, wherein the feeding mechanism feeds the recording medium to the outside of the apparatus along an L-shaped feed pathway via a recording position at which the image on the document is recorded.

7. The image processing apparatus according to claim 1, wherein the first housing and the second housing constitute a main body of the apparatus, and the document is a sheet document, the apparatus further comprising:
    a document inlet formed in an upper portion of the main body in a state where the image reading portion is in the upright position, the sheet document being fed in through the document inlet to be fed to the reading surface;
    a document outlet formed in a lower portion of the main body in a state where the image reading portion is in the upright position, the sheet document being ejected to the outside of the main body through the document outlet at a lateral side of the apparatus;
    an L-shaped feed pathway which extends between the document inlet and the document outlet and along which the sheet document is fed; and
    a document ejecting device which ejects the sheet document through the document outlet to the outside of the main body.

8. The image processing apparatus according to claim 1, wherein the first housing and the second housing constitute a main body of the apparatus, and the document is a sheet document, the apparatus further comprising:
    a document inlet formed in an upper portion of the main body in a state where the image reading portion is in the upright position, the sheet document being fed in through the document inlet to be fed to the reading surface; and a document ejecting device which ejects the sheet document as has been fed in through the document inlet and fed to the reading surface, to the outside of the main body again through the document inlet.

9. The image processing apparatus according to claim 8, wherein the document ejecting device is capable of ejecting, through the document inlet, any sheet document having a size within a range the image reading portion can read the image on the sheet document, after the sheet document is read.

10. The image processing apparatus according to claim 9, wherein the document ejecting device comprises:
   an ejecting roller disposed at a position to be capable of ejecting the sheet document of a minimum size which the image reading portion can read;
   a maximum-size responsive controller operative when a sheet document of a maximum size which the image reading portion can read is fed in, so as to rotate the ejecting roller in a first direction to feed the sheet document of the maximum size to a reading position for the sheet document of the maximum size, and then in a second direction opposite to the first direction to eject the sheet document of the maximum size through the document inlet; and
   a minimum-size responsive controller operative when a sheet document of a minimum size which the image reading portion can read is fed in, so as to rotate the ejecting roller in a first direction to feed the sheet document of the minimum size to a reading position for the sheet document of the minimum size, and then in a second direction opposite to the first direction to eject the sheet document of the minimum size through the document inlet.

11. The image processing apparatus according to claim 9, wherein the document ejecting device comprises:
   a stopper disposed at a position to limit entrance of at least a sheet document having a maximum size which the image reading portion can read; and
   an ejecting roller disposed at a position to be capable of ejecting even a sheet document of a minimum size which the image reading portion can read, the ejecting roller being switchable between a position for allowing passage of the sheet document of the maximum size to the stopper, and a position for ejecting the sheet document of the minimum size.

12. The image processing apparatus according to claim 1, wherein the scanning device disposed inside the first housing moves along the reading surface of the first housing when the image reading portion is in the horizontal position.

* * * * *

UNITED STATES PATENT AND TRADEMARK OFFICE
CERTIFICATE OF CORRECTION

PATENT NO. : 7,800,788 B2  
APPLICATION NO. : 11/231373  
DATED : September 21, 2010  
INVENTOR(S) : Hiroaki Yazawa et al.

Page 1 of 1

It is certified that error appears in the above-identified patent and that said Letters Patent is hereby corrected as shown below:

On the cover page, References Cited section (56), U.S. Patent Documents:
  Please insert the following:
--5,534,894    7/1996      Hirano et al.
2003/0151649  8/2003      Matsuzaki et al.--

On the cover page, References Cited section (56), Foreign Patent Documents:
  Please insert the following:
--EP    1445105      8/2004--

On the cover page, References Cited section (56), Other Publications:
  Please insert the following:
--Office Action issued July 31, 2009 in corresponding European Patent Application No. 08020500.8.--

Signed and Sealed this
Second Day of August, 2011

David J. Kappos
*Director of the United States Patent and Trademark Office*